US012674283B2

(12) United States Patent
Jeannot et al.

(10) Patent No.: US 12,674,283 B2
(45) Date of Patent: Jul. 7, 2026

(54) CORELESS ROLLS OF A TISSUE PAPER PRODUCT AND METHODS OF MANUFACTURING CORELESS ROLLS

(71) Applicant: Essity Hygiene and Health Aktiebolag, Gothenburg (SE)

(72) Inventors: Sébastien Jeannot, Kunheim (FR); Nicolas Weisang, Kunheim (FR)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 0 days.

(21) Appl. No.: 18/013,735

(22) PCT Filed: Jul. 2, 2021

(86) PCT No.: PCT/IB2021/000458
§ 371 (c)(1),
(2) Date: Dec. 29, 2022

(87) PCT Pub. No.: WO2022/003423
PCT Pub. Date: Jan. 6, 2022

(65) Prior Publication Data
US 2023/0250591 A1 Aug. 10, 2023

(30) Foreign Application Priority Data
Jul. 3, 2020 (WO) .................. PCT/IB2020/000595

(51) Int. Cl.
*D21H 27/00* (2006.01)
*A47K 10/16* (2006.01)
(Continued)

(52) U.S. Cl.
CPC ........... *D21H 27/005* (2013.01); *A47K 10/16* (2013.01); *B31F 1/07* (2013.01); *B31F 1/36* (2013.01);
(Continued)

(58) Field of Classification Search
CPC ...... D21H 27/005; D21H 27/02; D21H 27/38; D21H 27/32
(Continued)

(56) References Cited

U.S. PATENT DOCUMENTS

| | | | |
|---|---|---|---|
| 2,177,490 A | 10/1939 | Kieffer | |
| 3,337,388 A | 8/1967 | Wosaba | |

(Continued)

FOREIGN PATENT DOCUMENTS

| | | |
|---|---|---|
| CA | 2049552 A1 | 2/1992 |
| CA | 2096140 A1 | 10/1993 |

(Continued)

OTHER PUBLICATIONS

International Search Report & Written Opinion for International Application No. PCT/IB2020/000595; International Filing Date: Jul. 3, 2020; Date of Mailing: Apr. 7, 2021; 17 pages.
(Continued)

*Primary Examiner* — Tahseen Khan
(74) *Attorney, Agent, or Firm* — CANTOR COLBURN LLP

(57) ABSTRACT

Disclosed is a coreless roll of a tissue paper product made of a spirally wound continuous web having a first end and second end and an outer diameter in the range of 95 to 150 mm, the web of tissue paper product being wound to define an inner hole centrally positioned relative to the coreless roll such that the first end is located on the outer side of the coreless roll and the second end is located at the inner hole, a diameter of the inner hole being 20 to 50 mm, a density of the coreless roll being 80 to 150 kg/m$^3$, and a caliper ratio of the roll being 10% to 80%, the tissue paper product including between two and four ply-bonded plies, at least one ply being Conventional Wet Press, and at least one ply being a structured ply.

26 Claims, 11 Drawing Sheets

(51) Int. Cl.

| | |
|---|---|
| *B31F 1/07* | (2006.01) |
| *B31F 1/36* | (2006.01) |
| *B32B 3/30* | (2006.01) |
| *B32B 7/05* | (2019.01) |
| *B32B 7/12* | (2006.01) |
| *B32B 29/00* | (2006.01) |
| *B32B 29/06* | (2006.01) |
| *B32B 29/08* | (2006.01) |
| *B65H 18/28* | (2006.01) |
| *D21H 27/02* | (2006.01) |
| *D21H 27/32* | (2006.01) |
| *D21H 27/38* | (2006.01) |
| *D21H 27/40* | (2006.01) |

(52) U.S. Cl.
CPC ................. *B32B 3/30* (2013.01); *B32B 7/05* (2019.01); *B32B 7/12* (2013.01); *B32B 29/005* (2013.01); *B32B 29/06* (2013.01); *B32B 29/08* (2013.01); *B65H 18/28* (2013.01); *D21H 27/004* (2013.01); *D21H 27/02* (2013.01); *D21H 27/32* (2013.01); *D21H 27/38* (2013.01); *D21H 27/40* (2013.01); *B31F 2201/0764* (2013.01); *B31F 2201/0774* (2013.01); *B32B 2250/26* (2013.01); *B32B 2307/54* (2013.01); *B32B 2307/718* (2013.01); *B32B 2307/72* (2013.01); *B32B 2307/732* (2013.01); *B32B 2307/7376* (2023.05); *B65H 2301/5126* (2013.01); *B65H 2701/18422* (2013.01); *B65H 2701/1924* (2013.01)

(58) Field of Classification Search
USPC ........................................................ 428/154
See application file for complete search history.

(56) References Cited

U.S. PATENT DOCUMENTS

| | | | |
|---|---|---|---|
| 3,414,459 A | 12/1968 | Wells | |
| 3,556,907 A | 1/1971 | Nystrand | |
| 3,738,905 A | 6/1973 | Thomas | |
| 3,867,225 A | 2/1975 | Nystrand | |
| 3,953,638 A | 4/1976 | Kemp | |
| 3,998,690 A | 12/1976 | Lyness et al. | |
| 4,181,068 A | 1/1980 | Pollock | |
| 4,284,465 A | 8/1981 | Walbrun | |
| 4,320,162 A | 3/1982 | Schulz | |
| 4,339,088 A | 7/1982 | Niedermeyer | |
| 4,376,671 A | 3/1983 | Schulz | |
| 4,487,378 A | 12/1984 | Kobayashi | |
| 4,671,983 A | 6/1987 | Burt | |
| 5,468,323 A | 11/1995 | McNeil | |
| 5,685,954 A | 11/1997 | Marinack et al. | |
| 5,779,860 A | 7/1998 | Hollenberg | |
| 5,900,114 A | 5/1999 | Brown et al. | |
| 5,922,439 A | 7/1999 | Bredenick et al. | |
| 6,077,390 A | 6/2000 | Salman et al. | |
| 6,080,276 A | 6/2000 | Burgess | |
| 6,102,313 A | 8/2000 | Salzsauler et al. | |
| 6,544,386 B1 | 4/2003 | Krzysik et al. | |
| 6,551,691 B1 | 4/2003 | Hoeft et al. | |
| 6,599,614 B1 | 7/2003 | Roussel et al. | |
| 6,610,173 B1 | 8/2003 | Lindsay et al. | |
| 6,746,558 B2 | 6/2004 | Hoeft et al. | |
| 6,805,766 B1 | 10/2004 | Roussel et al. | |
| 6,913,673 B2 | 7/2005 | Baggot et al. | |
| 7,026,037 B2 | 4/2006 | Lefebvre et al. | |
| 7,166,189 B2 | 1/2007 | Burazin et al. | |
| 7,291,379 B2 | 11/2007 | Biagiotti | |
| 7,785,696 B2 | 8/2010 | Boatman et al. | |
| 7,827,907 B2 | 11/2010 | Koivukunnas et al. | |
| 7,829,177 B2 | 11/2010 | Russell et al. | |
| 7,842,163 B2 | 11/2010 | Nickel et al. | |

| | | | | |
|---|---|---|---|---|
| 7,967,951 B2 | 6/2011 | Suzuki et al. | | |
| 7,971,526 B2 | 7/2011 | Blenke et al. | | |
| 7,992,818 B2 | 8/2011 | Maddaleni et al. | | |
| 8,158,047 B2 | 4/2012 | Schulz et al. | | |
| 8,425,730 B2 | 4/2013 | Biagiotti | | |
| 8,535,780 B2 | 9/2013 | Wojcik et al. | | |
| 8,597,469 B2 | 12/2013 | Biagiotti | | |
| 8,708,020 B2 | 4/2014 | Schutz | | |
| 8,920,905 B2 | 12/2014 | Sauter et al. | | |
| 8,974,892 B2 | 3/2015 | Nencioni et al. | | |
| 9,034,478 B2 | 5/2015 | Weisang et al. | | |
| 9,090,040 B2 | 7/2015 | Sauter et al. | | |
| 9,284,147 B2 | 3/2016 | Techlin | | |
| 9,365,376 B2 | 6/2016 | Wojcik et al. | | |
| 9,375,116 B2 | 6/2016 | Graff et al. | | |
| 9,458,574 B2 | 10/2016 | Myangiro et al. | | |
| 9,637,862 B2 | 5/2017 | Saas et al. | | |
| 9,663,900 B2 | 5/2017 | Jeannot et al. | | |
| 10,213,066 B2 | 2/2019 | Weisang et al. | | |
| 10,280,567 B2 | 5/2019 | Vogt et al. | | |
| 10,350,850 B2 | 7/2019 | Roesch et al. | | |
| 10,463,204 B2 | 11/2019 | Barredo | | |
| 10,654,239 B2 | 5/2020 | Stefani | | |
| 10,696,004 B2 | 6/2020 | Dettori et al. | | |
| 10,814,587 B2 | 10/2020 | Kleinwaechter et al. | | |
| 11,090,900 B2 | 8/2021 | Kraus et al. | | |
| 11,280,051 B2 | 3/2022 | Satake Neto et al. | | |
| 11,346,058 B2 | 5/2022 | Pleyber et al. | | |
| 11,491,699 B2 | 11/2022 | Yoshimura | | |
| 11,987,030 B2 | 5/2024 | Dwiggins | | |
| 12,018,439 B2 | 6/2024 | Satake Neto et al. | | |
| 12,071,730 B2 | 8/2024 | Pleyber et al. | | |
| 2002/0088596 A1 | 7/2002 | Lamb | | |
| 2002/0197346 A1 | 12/2002 | Papadopoulos | | |
| 2003/0026953 A1 | 2/2003 | Müller | | |
| 2003/0111169 A1 | 6/2003 | Baggot et al. | | |
| 2003/0118784 A1 | 6/2003 | Hollmark | | |
| 2003/0129363 A1 | 7/2003 | Hoeft et al. | | |
| 2004/0028935 A1 | 2/2004 | Hauke | | |
| 2004/0166290 A1 | 8/2004 | Sembritzki et al. | | |
| 2005/0069679 A1 | 3/2005 | Stelljes et al. | | |
| 2005/0098281 A1 | 5/2005 | Schulz et al. | | |
| 2005/0178513 A1* | 8/2005 | Russell ................. D21H 27/02 | |
| | | | 162/123 |
| 2006/0065382 A1 | 3/2006 | Burazin et al. | | |
| 2006/0070714 A1 | 4/2006 | Perini | | |
| 2006/0130985 A1 | 6/2006 | Beuther et al. | | |
| 2006/0222819 A1 | 10/2006 | Gambini | | |
| 2006/0283538 A1 | 12/2006 | Schulz et al. | | |
| 2007/0003736 A1 | 1/2007 | Saarvali et al. | | |
| 2007/0062658 A1 | 3/2007 | Wiwi et al. | | |
| 2007/0092700 A1 | 4/2007 | Maddaleni et al. | | |
| 2007/0093157 A1 | 4/2007 | Shannon et al. | | |
| 2007/0137813 A1 | 6/2007 | Nickel et al. | | |
| 2007/0184246 A1 | 8/2007 | Nencioni et al. | | |
| 2007/0218248 A1 | 9/2007 | Mansson et al. | | |
| 2008/0183708 A1 | 7/2008 | Chen et al. | | |
| 2009/0162597 A1 | 6/2009 | Barredo et al. | | |
| 2009/0226670 A1 | 9/2009 | Schuetz | | |
| 2009/0255640 A1 | 10/2009 | Morin et al. | | |
| 2009/0297781 A1 | 12/2009 | Huss et al. | | |
| 2010/0021696 A1 | 1/2010 | Hill et al. | | |
| 2010/0028621 A1 | 2/2010 | Byrne et al. | | |
| 2010/0183350 A1 | 7/2010 | Sauter et al. | | |
| 2010/0183850 A1 | 7/2010 | Sauter et al. | | |
| 2010/0224338 A1 | 9/2010 | Harper et al. | | |
| 2010/0229738 A1 | 9/2010 | Hirota et al. | | |
| 2010/0239825 A1 | 9/2010 | Sheehan et al. | | |
| 2010/0295214 A1 | 11/2010 | Boatman et al. | | |
| 2011/0079671 A1 | 4/2011 | Wojcik et al. | | |
| 2011/0123773 A1 | 5/2011 | Lofink et al. | | |
| 2011/0311345 A1 | 12/2011 | McNeil | | |
| 2012/0152445 A1 | 6/2012 | Barredo et al. | | |
| 2012/0156447 A1 | 6/2012 | Hein et al. | | |
| 2012/0164426 A1 | 6/2012 | Barredo et al. | | |
| 2012/0244241 A1 | 9/2012 | McNeil | | |
| 2012/0255671 A1 | 10/2012 | Wallstabe et al. | | |
| 2013/0216789 A1 | 8/2013 | Kraus et al. | | |
| 2013/0327876 A1 | 12/2013 | Wojcik et al. | | |

(56)     References Cited

U.S. PATENT DOCUMENTS

| | | |
|---|---|---|
| 2014/0224919 A1 | 8/2014 | Bixler et al. |
| 2015/0184342 A1 | 7/2015 | Saas et al. |
| 2015/0225903 A1 | 8/2015 | Jeannot et al. |
| 2015/0298420 A1 | 10/2015 | Gungner et al. |
| 2017/0274616 A1 | 9/2017 | Greenfield |
| 2017/0280946 A1 | 10/2017 | Weisang et al. |
| 2017/0328011 A1 | 11/2017 | Sealey et al. |
| 2018/0014699 A1 | 1/2018 | Barredo |
| 2018/0104928 A1 | 4/2018 | Dwiggins |
| 2018/0142422 A1 | 5/2018 | Baum et al. |
| 2018/0187377 A1 | 7/2018 | Ziegenbein |
| 2018/0216398 A1 | 8/2018 | Veerasamy |
| 2019/0061302 A1 | 2/2019 | Barnholtz et al. |
| 2019/0063004 A1 | 2/2019 | Barnholtz |
| 2019/0078263 A1 | 3/2019 | Glass et al. |
| 2019/0136457 A1 | 5/2019 | Lindsay et al. |
| 2019/0301099 A1 | 10/2019 | Montagnani et al. |
| 2020/0011014 A1* | 1/2020 | Pleyber ............... D21H 27/30 |
| 2020/0156891 A1 | 5/2020 | Kurosaki |
| 2020/0263361 A1 | 8/2020 | Weisang |
| 2020/0277737 A1 | 9/2020 | Weisang |
| 2020/0298525 A1 | 9/2020 | Dwiggins |
| 2020/0324506 A1 | 10/2020 | Picchi et al. |
| 2020/0384718 A1 | 12/2020 | Picchi et al. |
| 2021/0070005 A1 | 3/2021 | Kumar et al. |
| 2021/0122561 A1 | 4/2021 | Lemke et al. |
| 2021/0180260 A1 | 6/2021 | Satake Neto et al. |
| 2021/0292972 A1 | 9/2021 | Lecount et al. |
| 2021/0310197 A1 | 10/2021 | Lecount et al. |
| 2021/0381172 A1 | 12/2021 | Goulet et al. |
| 2022/0010498 A1 | 1/2022 | Pleyber et al. |
| 2022/0112642 A1 | 4/2022 | Giurlani et al. |
| 2022/0154409 A1 | 5/2022 | Curley et al. |
| 2022/0168925 A1 | 6/2022 | Giurlani et al. |
| 2022/0275584 A1 | 9/2022 | Satake Neto et al. |
| 2023/0146893 A1 | 5/2023 | Pieroni et al. |
| 2023/0249431 A1 | 8/2023 | Barredo et al. |
| 2023/0265617 A1 | 8/2023 | Weisang et al. |
| 2023/0287630 A1 | 9/2023 | Weisang et al. |
| 2023/0295878 A1 | 9/2023 | Arnoul-Jarriault et al. |
| 2023/0295880 A1 | 9/2023 | Jeannot |
| 2024/0117566 A1 | 4/2024 | Skarius et al. |
| 2024/0209575 A1 | 6/2024 | Bailey et al. |
| 2024/0229362 A1 | 7/2024 | Kientz et al. |
| 2025/0250743 A1 | 8/2025 | Weisang et al. |
| 2025/0250744 A1 | 8/2025 | Weisang et al. |

FOREIGN PATENT DOCUMENTS

| | | |
|---|---|---|
| CA | 2776477 C | 11/2018 |
| CL | 200501067 | 4/2006 |
| CL | 200803570 | 12/2009 |
| CL | 2014000030 A1 | 7/2014 |
| CL | 202101610 | 6/2021 |
| CL | 202203775 | 12/2022 |
| CL | 202300009 | 1/2023 |
| CL | 202300010 | 1/2023 |
| CN | 1326523 A | 12/2001 |
| CN | 102143837 A | 8/2011 |
| CN | 102574354 A | 7/2012 |
| CN | 104136683 A | 11/2014 |
| CN | 104302471 A | 1/2015 |
| CN | 104520506 A | 4/2015 |
| CN | 107250013 A | 10/2017 |
| CN | 108431316 A | 8/2018 |
| CN | 207954831 U | 10/2018 |
| CN | 109310794 A | 2/2019 |
| CN | 110268116 A | 9/2019 |
| CN | 110914037 A | 3/2020 |
| CN | 210362711 U | 4/2020 |
| CN | 111148876 A | 5/2020 |
| CN | 111727288 A | 9/2020 |
| CN | 112218985 A | 1/2021 |
| CN | 115735031 A | 3/2023 |
| CN | 118541524 A | 8/2024 |

| | | |
|---|---|---|
| CO | 5031318 A1 | 4/2001 |
| CO | 5031322 A1 | 4/2001 |
| CO | 5200825 A1 | 9/2002 |
| CO | 5650179 A2 | 6/2006 |
| CO | 2017008071 A2 | 10/2017 |
| CO | 2018010262 A2 | 12/2018 |
| DE | 10137116 A1 | 2/2003 |
| DE | 20313418 U1 | 10/2003 |
| DE | 102005055707 A1 | 5/2007 |
| EP | 0264676 A1 | 4/1988 |
| EP | 338792 A2 | 10/1989 |
| EP | 426288 A2 | 5/1991 |
| EP | 499942 A2 | 8/1992 |
| EP | 668152 A1 | 8/1995 |
| EP | 739708 A2 | 10/1996 |
| EP | 0701641 B1 | 9/1997 |
| EP | 0668152 B1 | 12/1998 |
| EP | 934738 A1 | 8/1999 |
| EP | 1081284 A1 | 3/2001 |
| EP | 1208965 A2 | 5/2002 |
| EP | 0813382 B1 | 6/2002 |
| EP | 1321570 A2 | 6/2003 |
| EP | 1321576 A2 | 6/2003 |
| EP | 1338412 A1 | 8/2003 |
| EP | 1400199 A | 3/2004 |
| EP | 1464263 A1 | 10/2004 |
| EP | 1907199 A1 | 4/2008 |
| EP | 1996395 A1 | 12/2008 |
| EP | 2044264 A1 | 4/2009 |
| EP | 2095935 A1 | 9/2009 |
| EP | 2261420 A1 | 12/2010 |
| EP | 2292840 A1 | 3/2011 |
| EP | 2353859 B1 | 8/2011 |
| EP | 2360015 A1 | 8/2011 |
| EP | 2664451 A1 | 11/2013 |
| EP | 2692948 A1 | 2/2014 |
| EP | 2754553 A2 | 7/2014 |
| EP | 2884001 A1 | 6/2015 |
| EP | 2998436 A1 | 3/2016 |
| EP | 3143203 A1 | 3/2017 |
| EP | 3436087 A1 | 2/2019 |
| EP | 2925202 B1 | 7/2019 |
| EP | 4166314 A2 | 4/2023 |
| EP | 4176125 B1 | 9/2024 |
| EP | 4077808 B1 | 1/2025 |
| EP | 4176124 B1 | 1/2025 |
| ES | 2295354 T3 | 4/2008 |
| ES | 2339668 T3 | 5/2010 |
| ES | 2578830 A2 | 8/2016 |
| ES | 2990036 T3 | 11/2024 |
| GB | 1259521 A | 1/1972 |
| GB | 2255745 A | 11/1992 |
| IT | MI951197 A1 | 12/1996 |
| IT | 201800006097 A1 | 12/2019 |
| JP | 2006045690 A | 2/2007 |
| JP | 2007136861 A | 6/2007 |
| JP | 2008094067 A | 4/2008 |
| JP | 2008138310 A | 6/2008 |
| JP | 4649118 B2 | 3/2011 |
| JP | 2012110407 A | 6/2012 |
| JP | 2015074098 A | 4/2015 |
| JP | 2019188021 A | 10/2019 |
| JP | 2020072992 A | 5/2020 |
| MX | 2014012792 A | 3/2015 |
| WO | 9406623 A1 | 3/1994 |
| WO | 9711228 A1 | 3/1997 |
| WO | 9720107 A1 | 6/1997 |
| WO | 9733043 A1 | 9/1997 |
| WO | 9743483 A1 | 11/1997 |
| WO | 9743484 A1 | 11/1997 |
| WO | 9821410 A1 | 5/1998 |
| WO | 9847706 A1 | 10/1998 |
| WO | 9915332 A1 | 4/1999 |
| WO | 9923290 A1 | 5/1999 |
| WO | 9923299 A1 | 5/1999 |
| WO | 9936253 A1 | 7/1999 |
| WO | 9945205 A1 | 9/1999 |
| WO | 9953140 A1 | 10/1999 |
| WO | 9959511 A2 | 11/1999 |

(56) References Cited

FOREIGN PATENT DOCUMENTS

| WO | 0061358 | A1 | 10/2000 | | |
| WO | 0125537 | A1 | 4/2001 | | |
| WO | 0147699 | A1 | 7/2001 | | |
| WO | 0148314 | A2 | 7/2001 | | |
| WO | 0202869 | A2 | 1/2002 | | |
| WO | 02072340 | A2 | 9/2002 | | |
| WO | 02103112 | A1 | 12/2002 | | |
| WO | 03043806 | A2 | 5/2003 | | |
| WO | 03045681 | A1 | 6/2003 | | |
| WO | 03059139 | A1 | 7/2003 | | |
| WO | 03072344 | A1 | 9/2003 | | |
| WO | 2004042142 | A1 | 5/2004 | | |
| WO | 2004094726 | A1 | 11/2004 | | |
| WO | 2005064044 | A1 | 7/2005 | | |
| WO | 2005080677 | A2 | 9/2005 | | |
| WO | 2005095100 | A1 | 10/2005 | | |
| WO | 2006133389 | A2 | 12/2006 | | |
| WO | 2007030592 | A2 | 3/2007 | | |
| WO | 2007046124 | A1 | 4/2007 | | |
| WO | 2007070129 | A1 | 6/2007 | | |
| WO | 2007071734 | | 6/2007 | | |
| WO | 2007078363 | A1 | 7/2007 | | |
| WO | 2007103433 | A2 | 9/2007 | | |
| WO | 2008048151 | A1 | 4/2008 | | |
| WO | 2008069147 | A1 | 6/2008 | | |
| WO | 2010009769 | A1 | 1/2010 | | |
| WO | 2010023616 | A2 | 3/2010 | | |
| WO | 2010086837 | A2 | 8/2010 | | |
| WO | 2010135074 | A1 | 11/2010 | | |
| WO | 2010139759 | A1 | 12/2010 | | |
| WO | 2011078755 | A1 | 6/2011 | | |
| WO | 2013126531 | A1 | 8/2013 | | |
| WO | 2013179109 | A2 | 12/2013 | | |
| WO | 2014020424 | A1 | 2/2014 | | |
| WO | 2015175281 | A1 | 11/2015 | | |
| WO | 20150186052 | A1 | 12/2015 | | |
| WO | 2016132168 | A1 | 8/2016 | | |
| WO | 2016159966 | A1 | 10/2016 | | |
| WO | 2017019421 | A1 | 2/2017 | | |
| WO | 2017037273 | A1 | 3/2017 | | |
| WO | 2017134846 | A1 | 8/2017 | | |
| WO | 2017168195 | A1 | 10/2017 | | |
| WO | 2017196516 | A1 | 11/2017 | | |
| WO | 2017197405 | A1 | 11/2017 | | |
| WO | 2017209738 | A1 | 12/2017 | | |
| WO | 201873985 | A1 | 4/2018 | | |
| WO | 2018166572 | A1 | 9/2018 | | |
| WO | 2018217599 | A1 | 11/2018 | | |
| WO | 2018217602 | A1 | 11/2018 | | |
| WO | 2018229676 | A1 | 12/2018 | | |
| WO | 201904225 | A1 | 1/2019 | | |
| WO | 201959180 | A1 | 3/2019 | | |
| WO | 2019064045 | A1 | 4/2019 | | |
| WO | 2019064046 | A1 | 4/2019 | | |
| WO | WO-2019064044 | A1 * | 4/2019 | ............. | A47K 10/38 |
| WO | WO-2019203699 | A1 * | 10/2019 | ............. | A47K 10/16 |
| WO | 2019219168 | A1 | 11/2019 | | |
| WO | 2020068839 | A1 | 4/2020 | | |
| WO | 2020128551 | A1 | 6/2020 | | |
| WO | 2021126026 | A1 | 6/2021 | | |
| WO | 2022003383 | A1 | 1/2022 | | |
| WO | 2024226558 | A1 | 10/2024 | | |

OTHER PUBLICATIONS

International Search Report & Written Opinion for International Application No. PCT/IB2021/000458; International Filing Date: Jul. 2, 2021; Date of Mailing: Nov. 2, 2021; 19 pages.
U.S. Appl. No. 18/012,956, filed Dec. 26, 2022; Non-Final Office Action mailed Jun. 23, 2023; 186 pages.
U.S. Appl. No. 18/012,956, filed Dec. 26, 2022; Notice of Allowance dated Sep. 20, 2023; 8 pages.
CN Office Action with English Translation; CN Application No. 202180047021.7; Date Mailed: Feb. 24, 2024; pp. 1-7.

Chilean Application No. 202203662; CL Office Action with English translation dated Mar. 21, 2024; 20 pages.
Chinese Application No. 202080102548.0; First Office Action dated Apr. 3, 2024; 25 pages.
International Preliminary Report on Patentability for International Application No. PCT/IB2020/000586; International Filing Date: Jul. 3, 2020; Date of Mailing: Sep. 29, 2022; 25 pages.
International Search Report & Written Opinion for International Application No. PCT/IB2020/000583; International Filing Date: Jul. 3, 2020; Date of Mailing: Feb. 24, 2021; 13 pages.
International Search Report & Written Opinion for International Application No. PCT/IB2020/000586; International Filing Date: Jul. 3, 2020; Date of Mailing: Mar. 9, 2021; 12 pages.
International Search Report & Written Opinion for International Application No. PCT/IB2020/000588; International Filing Date: Jul. 3, 2020; Date of Mailing: Feb. 22, 2021; 11 pages.
International Search Report & Written Opinion for International Application No. PCT/IB2020/000592; International Filing Date: Jul. 3, 2020; Date of Mailing: Feb. 26, 2021; 15 pages.
Written Opinion of the International Preliminary Examining Authority for International Application No. PCT/IB2020/000586; International Filing Date: Jul. 3, 2020; Date of Mailing: May 19, 2022; 8 pages.
Mexican Application No. MX/E/2023/050579; Third Party Observation dated Jul. 17, 2023; 100 pages.
Mexican Application No. MX/E/2023/050580; Third Party Observation dated Jul. 17, 2023; 50 pages.
Chinese Application No. 202080102451.X; First Office Action dated Dec. 23, 2023; 29 pages.
Chinese Application No. 202080102393.0; Office Action with English translation dated Sep. 20, 2023; 11 pages.
Chinese Application No. 202080102449.2; Chinese Office Action with English translation dated Sep. 7, 2023; 20 pages.
Chinese Application No. 202180047021.7; Chinese Office Action with English translation dated Sep. 22, 2023; 28 pages.
Chinese Application No. 202080102390.7; Chinese Office Action with English translation dated Aug. 1, 2023; 18 pages.
Chilean Application No. 202203663; CL Office Action with English translation dated Jan. 8, 2024; 19 pages.
Chinese Application No. 202080102449.2; Chinese Office Action with English translation dated Feb. 3, 2024; 38 pages.
U.S. Appl. No. 18/545,976, filed Dec. 19, 2023; Non-Final Office Action mailed Jul. 2, 2024; 56 pages.
Chinese Application No. 202080102451.X; Office Action with English dated Jul. 11, 2024; 31 pages.
Chinese Application No. 202080102647.9; Office Action with English dated Jul. 23, 2024; 26 pages.
Colombian Application No. NC2022/0017942; Office Action with English dated May 20, 2024; 32 pages.
Colombian Application No. NC2023/0001171; Office Action with English dated Jul. 24, 2024; 52 pages.
European Application No. 20753412.4; Communication pursuant to Article 94(3) EPC dated Jun. 12, 2024; 6 pgs.
International Search Report & Written Opinion for International Application No. PCT/IB2020/000589; International Filing Date: Jul. 3, 2020; Date of Mailing: Feb. 24, 2021; 11 pages.
U.S. Appl. No. 18/012,956, filed Dec. 26, 2022; Notice of Allowance mailed Mar. 18, 2024; 97pages.
Chilean Application No. 202203662; CL Office Action with English translation dated Aug. 16, 2024; 18 pages.
Chinese Application No. 202080102548.0; Office Action with English translation dated Sep. 12, 2024; 28 pages.
U.S. Appl. No. 18/012,956; Non-Final Office Action dated Sep. 28, 2024; 22 pages.
Chilean Application No. 202203775; Office Action with English dated Sep. 5, 2024; 35 pages.
U.S. Appl. No. 18/012,966; Non-Final Office Action dated Aug. 29, 2024; 68 pages.
U.S. Appl. No. 18/013,667; Restriction Requirement dated Sep. 17, 2024; 8 pages.
U.S. Appl. No. 18/013,667; Non-Final Office Action dated Dec. 17, 2024; 112 pages.

(56) References Cited

OTHER PUBLICATIONS

U.S. Appl. No. 18/013,703; Restriction Requirement dated Dec. 18, 2024; 53 pages.

U.S. Appl. No. 18/545,976; Final Office Action dated Dec. 4, 2024; 37 pages.

Colombian Office Action NC2023/0001170; Office Action with English translation dated Aug. 20, 2024; 19 pages.

Colombian Patent Office, Office Action issued in CO NC2019/0010000 dated Aug. 9, 2021 with partial English Translation (15 apges).

International Searching Authority, Search Report and Written Opinion issued in International Application No. PCT/EP2017/055795 mailed Nov. 9, 2017 (14 pages).

National Intellectual Property Administration (CNIPA) of the People's Republic of China, Office Action issued in App. No. 201780086232.5 dated Nov. 19, 2021 with English Translation (17 pages).

U.S. Appl. No. 16/491,006; Notice of Allowance dated Feb. 4, 2022; 34 pages.

U.S. Appl. No. 18/012,955; Non-Final Office Action dated Nov. 5, 2024; 204 pages.

U.S. Appl. No. 18/013,817; Non-Final Office Action dated Jan. 13, 2025; 107 pages.

Chilean Application No. 202300008; Office Action with English translation dated Nov. 20, 2024; 25 pages.

Chilean Application No. 202300009; Office Action with English translation dated Nov. 12, 2024; 34 pages.

Chilean Application No. 202300010; Office Action with English translation dated Nov. 14, 2024; 31 pages.

Chinese Application No. 20208010245IX; Office Action with English translation dated Jan. 15, 2025; 31 pages.

Chinese Application No. 2020801025480; Office Action with English translation dated Jan. 3, 2025; 21 pages.

Colombian Application No. NC2022/0017942; Office Action with English translation dated Oct. 30, 2024; 29 pages.

Colombian Application No. NC2022/0018141; Office Action with English translation dated Oct. 30, 2024; 15 pages.

Colombian Application No. NC2023/0001168; Office Action with English translation dated Sep. 12, 2024; 24 pages.

Colombian Patent Application No. NC2023/0001172; Office Action with English translation dated Aug. 27, 2024; 16 pages.

Ukraine Application No. 22546/3A/24; Office Action with English translation dated Nov. 13, 2024; 13 pages.

U.S. Appl. No. 18/012,956; Final Office Action dated Feb. 14, 2025; 30 pages.

Chinese Application No. 202080102451X; Decision of Rejection dated Jan. 15, 2025; 31 pages.

Colombian Application No. NC2022/0018141; Office Action with English translation dated Feb. 25, 2025; 20 pages.

U.S. Appl. No. 18/545,976; Final Office Action dated Mar. 18, 2025; 15 pages.

U.S. Appl. No. 18/012,966; Final Office Action dated Apr. 16, 2025; 22 pages.

U.S. Appl. No. 18/724,456; Final Office Action dated Sep. 25, 2025; 70 pages.

U.S. Appl. No. 18/012,966; Non-Final Office Action dated Sep. 10, 2025; 38 pages.

Chemical Technology of Pulp and Papermaking, 3rd edition, vol. 2, edited by J.P. Kathy (US), Light Industry Press, Mar. 1988, pp. 365-366; With English Translation; 33 pages.

Chinese Application No. 202080102451.X; Office Action with English translation dated Jul. 21, 2025; 39 pages.

Papermaking II, Drying, by (Finland) Komanku et al., China Light Industry Press, Jul. 2018, pp. 128-130; 13 pages.

Ukraine Application No. a 2022 04975; Office Action with English translation dated Jun. 23, 2025; 13 pages.

U.S. Appl. No. 18/013,817; Non-Final Office Action dated Aug. 11, 2025; 16 pages.

Singapore Application No. 11202261481U; Office Action dated Apr. 29, 2025; 5 pages.

U.S. Appl. No. 18/013,817; Final Office Action dated May 5, 2025; 18 pages.

U.S. Appl. No. 18/724,456; Non-Final Office Action dated May 5, 2025; 264 pages.

U.S. Appl. No. 18/012,956; Final Office Action dated Apr. 22, 2025; 27 pages.

Chilean Application No. 202300011; Office Action dated Apr. 7, 2025; 36 pages.

Chinese Application No. 202080102647.9; Office Action dated May 1, 2025; 26 pages.

Singapore Application No. 11202261586X; Written Opinion dated Apr. 29, 2025; 5 pages.

U.S. Appl. No. 18/545,976, filed Dec. 19, 2023; Notice of Allowance mailed Jun. 6, 2025; 14 pages.

U.S. Appl. No. 18/013,703; Non-Final Office Action dated Jun. 9, 2025; 130 pages.

U.S. Appl. No. 18/012,956, filed Dec. 26, 2022; Notice of Allowance dated Jul. 8, 2025; 14 pages.

U.S. Appl. No. 18/545,976, filed Dec. 19, 2023; Notice of Allowance mailed Jul. 8, 2025; 13 pages.

Colombian Patent Application No. NC2022/0017941; Office Action with English translation dated Sep. 22, 2025; 10 pages.

Columbian Office Action, Application No. PCT/IB2020/000588, mailed Sep. 30, 2025; with English translation, 30 pages.

Papermaking II, Drying, by (Finland) Komanku et al., China Light Industry Press, Jul. 2018, pp. 128-130; 22 pages.

Columbian Office Action, Application No. NC2023/0001172, mailed Oct. 1, 2025, with English Translation, 23 pages.

Mexican Office Action, Application No. MX/a/2024/008090, mailed Janury 8, 2026, with English Translation, 34 pages.

National Intellectual Property Administration (Cnipa) of the People's Republic of China, Application No. 202180105263.7 mailed Jan. 15, 2026, with English Translation, 13 pages.

US Final Office Action, U.S. Appl. No. 18/013,817, mailed Mar. 12, 2026, 30 pages.

* cited by examiner

CORELESS ROLLS OF A TISSUE PAPER PRODUCT AND METHODS OF MANUFACTURING CORELESS ROLLS

CROSS REFERENCE TO RELATED APPLICATIONS

This application is a National Stage application of PCT/IB2021/000458, filed Jul. 2, 2021, which claims priority to PCT/IB2020/000595, filed Jul. 3, 2020, both of which are incorporated by reference in their entirety herein.

TECHNICAL FIELD

The present disclosure relates to coreless rolls of a tissue paper product, such as toilet paper, made of a spirally wound continuous web of tissue paper product. The disclosure also relates to tissue paper products. Moreover, the disclosure relates to methods of manufacturing coreless rolls of a tissue paper product, such as toilet paper, as well as to methods of manufacturing tissue paper products.

TECHNICAL BACKGROUND

In the following, a "tissue paper product" relates to an absorbent paper based on cellulose wadding. The latter is also referred to as a tissue paper base-sheet in this field of technology.

Fibres contained in a tissue paper product are mainly cellulosic fibres, such as pulp fibres from chemical pulp (e.g. Kraft or sulphite), mechanical pulp (e.g. ground wood), thermo-mechanical pulp, chemo-mechanical pulp and/or chemo-thermo-mechanical pulp (CTMP). Pulps derived from both deciduous (hardwood) and coniferous (softwood) can be used. Fibres may also come from non-wood plants, e.g., cereal, bamboo, jute, and sisal. The fibres or a portion of the fibres may be recycled fibres, which may belong to any or all of the above categories. The fibres can be treated with additives, e.g. fillers, softeners, such as, but not limited to, quaternary ammonium compounds and binders, conventional dry-strength agents, temporary wet strength agents or wet-strength agents, in order to facilitate the original paper making or to adjust the properties thereof. The tissue paper product may also contain other types of fibres, e.g., regenerated cellulosic fibres or synthetic fibres for enhancing, for instance, strength, absorption, smoothness or softness of the tissue paper product.

Whenever reference is made to the "softness" of a tissue paper product in this text, reference is made to the property of softness as determined through an evaluation by panel members. A panel of ten members was used in this case. Panel lists are used to rank products in terms of softness. Softness Panel values are used as comparative values enabling a comparison between tested samples. The softer the product/tissue paper product is, the higher the rated value. The softness scale was in the present case set from 0 to 2.5 (2.5 being the highest value). Each sample is composed of one product, i.e., a tissue paper product. Alternatively, each sample is a ply. Samples are first conditioned for a minimum of two hours in a controlled area at 23° C. and 50% relative humidity. Then, evaluation by the panel members takes place.

Tissue paper products may be used for personal and household use as well as for commercial and industrial use. They may be adapted to absorb fluids, remove dust, and for other cleaning purposes. If tissue paper is to be made out of pulp, the process essentially comprises a forming step that includes a headbox- and a forming wire section, and a drying section, either through air drying or conventional drying on a Yankee cylinder. The production process may also include a crepe and, finally, typically a monitoring and winding step.

Several plies may be combined together by a combining operation of a chemical nature (e.g., by adhesive bonding), or of a mechanical nature (e.g., by knurling or so-called edge-embossing), or a combination of both.

Further, the processing to finished tissue product may involve, e.g., longitudinal cut, cross cut, etc. Moreover, individual tissue products may be positioned and brought together to form stacks, which may be individually packaged. Such processing steps may also include application of substances like scents, lotions, softeners or other chemical additives.

When several plies are combined together using adhesive bonding, a film of adhesive is deposited over some or all of the surface of at least one of the plies, then the adhesive-treated surface is placed in contact with the surface of at least one other ply.

When several plies are combined together using mechanical bonding, the plies may be combined by knurling, by compression, by edge-embossing, union embossing and/or ultrasonic. Additionally or as an alternative thereto, at least some bonding can also be carried out using water instead of some other adhesive.

Mechanical and adhesive bonding may also be combined to combine several plies.

The processing step from the base tissue to a finished tissue paper product occurs in processing machines (converting machines) which include operations such as unwinding the base tissue, calendaring of the tissue, laminating, printing or embossing together to form a multi-ply product.

Embossing can be used to change the shape of a ply from flat to shaped, so that there are areas that are raised and/or recessed from the rest of the surface. It therefore constitutes a deformation of the previously flat sheet, and results in a ply having a particular relief. The thickness of the ply or of the multiple plies is increased after embossing compared with its initial thickness.

An embossing process is carried out between an embossing roll and a counter roll. The embossing roll can have protrusions or depressions on its circumferential surface leading to embossed protrusions/depressions in the paper web. Counter rolls may be softer than the corresponding embossing roll and may consist of rubber, such as natural rubber, or plastic materials, paper or steel. If the counter roll is made of a softer material like rubber, a contact area/nip can be formed between the embossing roll (e.g., steel roll) and the counter roll by the deformation of the softer roll.

By embossing, a pattern can be applied to a tissue paper fulfilling a decorative and/or functional purpose. A functional purpose may be to improve the properties of the hygiene paper product, that is, the embossment may improve the product thickness, absorbency, bulk, softness, etc. A functional purpose may also be to provide a joint to another ply in a multi-ply product.

Another type of embossment is referred to herein as a "pre-embossment". A pre-embossment could preferably be applied to a web or ply prior to its joining to the other plies of a multi-ply tissue product.

Such pre-embossment may be made for a functional purpose e.g. as laid out in the above to increase the thickness of the ply, the absorbency, bulk and/or softness.

"Micro-embossment" is used herein for an embossment pattern with a dense configuration. Typically, the micro-embossment may comprise dots in the range of 25 to 120 dots per cm². A micro-embossment may advantageously be a pre-embossment. The micro-embossed dots may have different relatively simple surface shapes such as circles, ovals, squares, rectangles or diamonds.

It has become known to produce rolls of tissue paper products, such as toilet paper, without a core (e.g., without an additional cardboard core), so-called coreless rolls. This is appealing as a reduction of waste is achieved (as the cores of used rolls were a waste product). However, the coreless rolls are not always as satisfying for customers as rolls with a core, e.g., due to a reduced stability in comparison to the rolls with a core.

There is, hence, a need for improved coreless rolls, improving customer satisfaction while nevertheless allowing to reduce waste (by avoiding, in particular, the need of providing cores which usually end up as waste). Specifically, such coreless rolls should address at least one of the above-mentioned shortcomings. Moreover, there is a need for manufacturing methods for improved coreless rolls that address at least one of the above-mentioned shortcomings.

In addition, although the multi-ply tissue paper products and methods for production thereof proposed in the past may be very useful in many applications, there is still a need for improvements. Such improvements would be desirable particularly with respect to the thickness, the strength, the softness, the bulkiness, and/or the absorption capacity of the multi-ply tissue products.

SUMMARY

One aspect of the above-mentioned object is achieved by a coreless roll of a tissue paper product, such as toilet paper, with two plies, in accordance with the present disclosure. The coreless roll is made of a spirally wound continuous web of tissue paper product having a first end and a second end. The web of tissue paper product is wound such as to define an axially extending inner hole centrally positioned relative to the coreless roll and such that the first end is located on the outer side of the coreless roll and the second end is located at the inner hole.

The coreless roll has an outer diameter in the range of 95 to 150 mm. A diameter of the inner hole is in the range of 20 to 50 mm. The diameter of the inner hole, as referred to in this text, is to be understood to be an "average diameter" obtained by dividing the perimeter of the inner hole by $\pi$ ($\pi$ may, of course, be approximated, e.g., by 3.14). The actual distance between opposing surfaces of the inner hole may vary as one moves along the perimeter, as the inner hole does not need to have a round cross-sectional shape, but will typically vary a bit (depending, e.g., on the orientation which the roll had during transportation etc.). A density of the coreless roll is in a range of 80 to 150 kg/m³. The roll density is defined (throughout this text) as the ratio between the weight of the roll and the volume of tissue paper product. The expression "volume of the tissue paper product" is used to refer to the difference between the external volume of the coreless roll and the volume of the inner cylinder defined by the inner hole.

A caliper ratio of the roll is in a range of 30% to 80%. If the caliper ratio is lower than 30%, the radial compression strength of the coreless roll may not be satisfactory. If the caliper ratio is higher than 80%, the embossing load needed to manufacture the coreless roll may have a negative impact on the tensile strength of the tissue paper product.

The caliper ratio $(c_s - c_t)/c_t$ is obtained by dividing a difference between a standard caliper $c_s$ of the tissue paper product as defined by the standard ISO-12625-3:2014 and a theoretical caliper $c_t$ of the tissue paper product by the theoretical caliper $c_t$. The theoretical caliper $c_t$ is defined as a ratio between a grammage (e.g., in g/m²) of the tissue paper product and the density of the roll (e.g., in kg/m³).

Whenever reference is made to the "caliper" or "thickness" in this text, reference is made to the thickness as obtained in accordance with the norm ISO 12625-3:2014 using the Frank Thickness Gauge equipment (Model 16502) or the like. The tissue paper sheet to be measured is cut into pieces of minimum 80 mm in any direction and the pieces are conditioned at 23° C., 50% RH (Relative Humidity) for at least 2 hours. During measurement a sample piece is placed between a fixed bottom plate and a pressure foot. The pressure foot is then lowered at a speed of 2.0 mm/s. The thickness value for the sheet is then read after the pressure value is stabilized. The Essity Internal diameter of the pressure foot is 35.7 mm. The lower plate dimension is minimum 20% bigger. The pressure applied is 2.0 kPa during the measurement.

The tissue paper product comprises two plies: a first ply and a second ply. In other words, a total number of plies of the tissue paper product is two. Put differently, the tissue paper product consists of two plies. However, the latter statement does not imply that the tissue paper product cannot comprise other constituents (other than plies), such as adhesive, additives, etc. It means only that the number of plies is two. At least one of the two plies may be an embossed ply. However, both plies may be embossed plies.

The first ply is made of Conventional Wet Press (CWP paper). The second ply is a structured ply, such as a ply made of TAD, UCTAD, eTAD, Atmos, or NTT.

Producing a ply from paper-making fibers according to "Conventional Wet Paper" (CWP) processing may, e.g., rely on the manufacturing of "Dry Creped Tissue" or "Wet Crepe Tissue" and is to be distinguished from a "Process for Structured Tissue" such as the Through Air Drying (TAD) manufacturing method, the manufacture of un-creped through-air dried (UCTAD) tissue, or alternative manufacturing methods, e.g. the Advanced Tissue Molding System (ATMOS) of the company Voith, or Energy Efficient Technologically Advanced Drying eTAD of the company Georgia Pacific, or Structured Tissue Technology SST of the company Metso Paper. Moreover, hybrid processes like NTT (New Textured Tissue of the company Metso Paper), which are alternations of the conventional processes, can be used.

The first ply has been embossed with a heated embossing roll. This may promote higher tensile strength, and/or larger caliper of the tissue paper product without (or while hardly) lowering the softness of the tissue paper product as compared to a reference product manufactured analogously but without heat-embossing (i.e., embossing without a heated embossing roll).

Any heated or heatable embossing roll, as referred to in this text, may be heatable from the inside or outside by a heating means. The heating means may comprise heat carrying fluid and/or rely on induction and/or infrared heating. However, the heating means may comprise any type of heating system, there is in this respect no particular limitation.

Any heated or heatable embossing roll, as referred to in this text, may be heatable to a surface temperature in the range of 80° C. to 170° C., optionally 100° C. to 165° C., or 110° C. to 165° C., or 120° C. to 160° C., or 130° C. to 155° C. These temperature ranges may to an increasing degree with narrower ranges promote the manufacturing of a tissue paper product with good shape memory and/or large thickness, high machine direction (MD) and/or cross direction (CD) tensile strength, and good absorption properties.

The references to the temperatures of any heated embossing roll(s), as referred to in this text, are references, in particular, to surface temperatures of the embossing roll. These may be measured, for example, using an infrared thermometer. Moreover, the temperature values refer to temperatures in the steady state of the manufacturing apparatus, i.e., not while running and while plies are in contact with the embossing rolls. In particular, the surface temperature of the heatable embossing roll may drop during manufacturing, due to various effects such as heat conduction to the ply in contact with the roll, etc. For example, a surface temperature of 170° C. might be measured in the steady state (when the embossing roll is not in contact with a ply), and this temperature might decrease to a temperature in the range of 100° C. to 130° C. during manufacturing, etc.

The two plies are ply-bonded. According to some embodiments, they may be ply-bonded with an adhesive, such as lamination glue, and/or through mechanical bonding, such as edge embossing.

The grammage of the tissue paper product may be in a range of 24 g/m² to 50 g/m², optionally 30 g/m² to 45 g/m².

The coreless rolls with a tissue paper product made of two plies described above may have lower densities than comparative products manufactured without using a heated embossing roll to emboss any of the plies (and keeping the other manufacturing parameters the same). The caliper ratio is nevertheless comparatively high, so that the coreless rolls described above are robust, for example, in terms of their handling and storage properties.

The coreless rolls with a tissue paper product made of two plies described above may have a particularly high radial compression strength. Specifically, the radial compression strength of such rolls may be 20 N or more, or even 25N or more, or even 30N. These are robust and meet the requirements, e.g., for toilet paper rolls. Thus, they may achieve customer satisfaction.

Whenever reference is made to the radial compression strength in this document, reference is made to the radial compression strength measured as follows. A sample coreless roll is inserted into a standard dynamometer with two parallel plates, a top plate and a bottom plate (which are large enough to sandwich a coreless roll and to apply pressure to contact surfaces), the plates, e.g., being metallic plates. The coreless roll is put on the bottom plate, a plastic mandrel is inserted (e.g., a mandrel with a diameter in range of 15 mm to 40 mm) in the inside hole of the coreless roll. The bottom plate and the top plate are then moved towards each other, usually by moving the upper plate towards a lower plate that is fixed and not moveable (using a compression speed of 60 mm/min and, for example, using a dynamometer with a cell of, e.g., 200 N), and it is measured how much pressure (in Newton) needs to be exerted onto the coreless roll until the inside of the coreless roll exerts pressure onto the mandrel. The pressure exerted onto the coreless roll at which in turn the exertion of pressure by the inside of the coreless roll onto the mandrel starts, is the radial compression strength of the coreless roll. A minimum number of five serial measurements may be required in order to obtain a statistically significant result/measurement. The serial measurements need to be performed on separate rolls (from the same production series), in order to obtain reliable results. The sample rolls need to be pre-conditioned, and measurements need to be carried out in accordance with the standard norm ISO187:1985.

The term "structured ply" is, hence, used to refer to a ply manufactured from a web that has undergone a treatment to increase its performance and is used to distinguish it from conventional pressed plies. Specifically, shaping fabrics are engineered for selective densification and creation of a strength network, to create structured plies. In particular, web shaping is performed on the tissue (when still wet), and the tissue is dried, with hydrogen bonding taking place to form the "structure". The manufacturing processes for structured plies may be used to improve softness, bulk, and absorbency at higher strengths, as compared to conventional pressed tissue plies.

TAD plies are manufactured, for example, by using woven knuckles to selectively densify the web and partially define unpressed pockets that preserve initial bulk. When manufacturing a TAD ply, a wet uncompacted web may be dewatered using vacuum boxes, up until reaching about 25-30% solid material (as opposed to about 38-42% when dealing with conventional pressing processes). A molding step may be used to mold the wet web into the 3D topography of the TAD fabric. If dry creping is used, this implies that the yankee surface contact area for creping adhesion is reduced as compared to non-structured manufacturing processes (e.g., 18-30% contact area), so that the drying capacity of the yankee dryer is reduced in comparison to the case of using non-structured tissue. Some TAD plies are manufactured using a one-dryer layout, others using a two-dryer layout. Another option is to use multiple smaller dryers in series. Fabric sanding is frequently used to create a surface for increased yankee contact.

UCTAD is a variant of TAD, wherein "UC" stands for uncreped tissue. The manufacturing process for UCTAD allows eliminating the yankee dryer. However, the absence of creping is a potential weakness for high softness grades. Compensating technologies of fabric crepe, fabric design, and chemistry are employed to boost the softness of the uncreped sheet.

eTAD is another variant of TAD, wherein the "e" stands for energy efficiency, as through air-drying is avoided. A wet web is pressed against a small dryer and then wet creped and/or rush transferred to a TAD type fabric with about 30-60% solid material, before it is dried with a yankee dryer and creped. No air is blown through the web during the drying process.

ATMOS (Advanced Tissue Molding System) is an alternative structured tissue technology. Molding is started at a low solid content using a web topography generated using a structured forming wire. A high-tension permeable belt press is used to dewater the sheet under steam or hot exhaust air showers that are drawn to a vacuum box below the belt. Web solids lie in a range of about 15-35% during this phase. After that, the dewatered sheet is molded and rush transferred on a TAD-like shaping fabric, and then transferred to a yankee dryer (with a content of solids of about 35%). ATMOS technology may be used to lower energy consumption during manufacturing associated with a TAD drum operation.

NTT plies share similarities to the ATMOS plies. Laser engraving on an NTT belt is used, to create a structured pattern. The laser engraving process offers greater flexibility than a woven TAD fabric to create interesting consumer patterns for desirable properties. According to the NTT technology, initial compaction of the sheet in pressing may be avoided.

According to some embodiments, the tissue paper product has a (sheet) caliper of at least 0.35 mm, for some embodiments at least 0.40 mm, and for some embodiments even at least 0.45 mm. These lower thresholds on the caliper may, to an increasing degree with the increasingly larger values indicated as the lower threshold for the caliper, lead to good customer satisfaction, as customers expect a tissue paper product to have a minimum caliper in order to feel a good sensation when dealing with the tissue paper product.

Turning back to coreless rolls in accordance with the present disclosure, and to the tissue paper product, in particular, the first ply may comprise first embossments with a first height (h1), the first height (h1) being in a range of 0.2 mm to 2.0 mm.

The second ply may comprise second embossments with a second height (h2), the second height (h2) being in a range of 0.2 mm to 2.0 mm.

The adhesive, such as lamination glue, may be applied to tips of the first embossments of the first ply and/or to tips of the second embossments of the second ply.

The first ply may comprise third embossments with a third height (h3) smaller than the first height h1 (h1>h3). In other words, adhesive may be applied to tips of the higher embossments (i.e., those with a larger embossing height). The third height (h3) may lie in a range of 0.1 mm to 1.2 mm.

The third embossments (if present) may have been formed by the same heated embossing roll that was used to form the first embossments or, alternatively, by a different (heatable or non-heatable) embossing roll.

According to some embodiments, the second embossments have been formed by a second heated embossing roll. If the embossing is performed with the second heated embossing roll, i.e., if heat-embossing is performed, this may promote higher tensile strength, and/or higher absorption capacity without (or while hardly) lowering the softness of the tissue paper product as compared to a reference product manufactured analogously but without heat-embossing (i.e., embossing without a heated embossing roll).

According to some embodiments, the third embossments have been formed by a third heated embossing roll. If the embossing is performed with the third heated embossing roll, i.e., if heat-embossing is performed, this may promote higher tensile strength, and/or higher absorption capacity without (or while hardly) lowering the softness of the tissue paper product as compared to a reference product manufactured analogously but without heat-embossing (i.e., embossing without a heated embossing roll).

According to some embodiments, the first ply has been moistened, prior to having been embossed, with an amount of liquid, such as water, in the range of 2% to 12% of the basis weight of the first ply, or optionally 4% to 10% of the basis weight of the first ply, wherein the liquid optionally is provided with one or several additives, or wherein the first ply has not been moistened with a liquid prior to having been embossed.

A geometrical mean tensile strength of tissue paper products of the coreless roll comprising two plies may lie in a range of 70 N/m to 210 N/m, optionally 90 N/m to 210 N/m, or 110 N/m to 210 N/m. The geometrical mean tensile (GMT) strength refers to the square root of the product of the machine direction tensile strength (MDT) strength and the cross-directional tensile (CDT) strength. Whenever reference is made to a "tensile strength" in this text, the tensile strengths in question can be measured and compared as dry tensile strengths following the standard EN ISO 12625-4: 2016 or as wet tensile strengths following the standard ISO 12625-5:2017.

The dry strength is determined according to EN ISO 12625-4: 2016, Tissue Paper and Tissue Products, Part 4:

Determination of width-related breaking strength, elongation at break and tensile energy absorption. For exemplary purposes, the tensile tester used for the measurement featured two clamps of 50 mm width. Each clamp can grip the test piece firmly, but without damage, along a straight line across the full width of the test piece (the clamping line). The distance between the clamping lines was set at 100 mm. For special tests, the distance is reduced if the available length of the sample is lower than 100 mm (e.g., toilet tissue in cross direction). The tissue paper product to be measured, i.e., two sheets of a single-ply or multi-ply product, was cut into test pieces of 50 mm wide with parallel edges. Each sheet was cut into two different types of test pieces by cutting in the machine direction and in the cross direction. The obtained test pieces were then conditioned in an atmosphere of 23° C., 50% RH (Relative Humidity) for at least 4 hours. The test piece to be measured was placed between the clamps without any strain, and such that any observable slack is eliminated. At the beginning, a pre-tensile force of 25 cN is applied (zero of stretch) then the elongation rate between the clamps was kept constant at 5 cm/min. The maximum tensile force required to break the test piece was obtained. The measurement was repeated with six test pieces and the values obtained were averaged. The dry tensile strength was calculated by means of the following formula: Mean dry tensile strength [N/m]=(mean maximum tensile force [N]/initial width of the test piece [mm])×10<3.

The wet strength was determined according to EN ISO 12625-5:2016 Tissue Paper and Tissue Products, Part 5: determination of width-related wet load at break, 2016. (optionally the following description which follows the principles of the DIN NORM). For exemplary purposes, when experimentally verifying the wet strength of a product, the tensile test was accordingly performed by means of an electronic tensile test apparatus (Model 1122, Instron Corp., Canton, Mass., USA) with a constant rate of elongation of 50 mm/min using a Finch device. To prepare the test strips, 6 samples each having a length of 150 mm and a width of 50 mm were cut from the raw tissue (single ply) prepared in such a manner that the longitudinal direction of the test strips coincided with the machine direction (MD) or cross-direction (CD). The free clamping length when using the Finch clamp was about 50 mm. The test strip was secured with both ends in a clamp of the test apparatus. The other end (loop) formed in this way was placed around a pin and treated at 23° C. with distilled water until complete saturation. The depth of immersion of the loop formed by the test strip is at least 20 mm. The soaking duration (immersion time) is 15 s, the rate of elongation is set to a constant (50±2) mm/min, the measurement of the breaking strength is performed on the sample immersed in distilled water. Six test strips at a time were measured, the result being indicated as an arithmetic mean. To ensure that the wet strength of the samples has fully developed, which is particularly necessary in the case of samples in which additional wet-strength agents were used to boost wet strength, e.g., by their addition in the mass, the samples to be tested were always artificially aged before conducting the tensile test. Aging was effected by heating the samples in an air-circulating drying cabinet to (80±1) ° C. for a period of 30 min. Six test strips at a time were measured, the result being indicated as an arithmetic mean.

Another aspect of the above-mentioned object is achieved by a coreless roll of a tissue paper product, such as toilet paper, with three plies, in accordance with the present disclosure. The coreless roll is made of a spirally wound continuous web of tissue paper product having a first end and a second end. The web of tissue paper product is wound such as to define an axially extending inner hole centrally positioned relative to the coreless roll and such that the first end is located on the outer side of the coreless roll and the second end is located at the inner hole.

The coreless roll has an outer diameter in the range of 95 to 150 mm. A diameter of the inner hole is in the range of 20 to 50 mm. A density of the coreless roll is in a range of 90 to 150 kg/m³.

A caliper ratio of the roll is in a range of 20% to 60%. If the caliper ratio is lower than 20%, the radial compression strength of the coreless roll may not be satisfactory. If the caliper ratio is higher than 60%, the embossing load needed to manufacture the coreless roll may have a negative impact on the tensile strength of the tissue paper product.

The tissue paper product comprises three plies: a first ply, a second ply, and a third ply, wherein the first ply is one of the outermost plies of the tissue paper product. In other words, a total number of plies of the tissue paper product is three. Put differently, the tissue paper product consists of three plies. However, the latter statement does not imply that the tissue paper product cannot comprise other constituents (other than plies), such as adhesive, additives, etc. It means only that the number of plies is three. At least one of the three plies is an embossed ply. One of the three, two of the three, or all three plies may be embossed plies.

The three plies are ply-bonded. According to some embodiments, they may be bonded with an adhesive, such as lamination glue, and/or with mechanical bonding, such as edge embossing.

The grammage of the tissue paper product is in a range of 34 g/m² to 65 g/m², optionally 40 g/m² to 63 g/m², or 45 g/m² to 60 g/m².

The first ply is made of Conventional Wet Press (CWP paper) that has been embossed with a heated embossing roll. This may promote higher tensile strength, and/or larger caliper of the tissue paper product without (or while hardly) lowering the softness of the tissue paper product as compared to a reference product manufactured analogously but without heat-embossing (i.e., embossing without a heated embossing roll).

The second ply is a structured ply, such as a ply made of TAD, UCTAD, eTAD, Atmos, or NTT.

The coreless rolls with a tissue paper product made of three plies described above may have lower densities than comparative products manufactured without using a heated embossing roll to emboss any of the plies (and keeping the other manufacturing parameters the same). The caliper ratio is nevertheless comparatively high, so that the coreless rolls described above are robust, for example, in terms of their handling and storage properties.

The coreless rolls with a tissue paper product made of three plies described above may have a particularly high radial compression strength. Specifically, the radial compression strength of such rolls may be 20 N or more, or even 25N or more, or even 30N. These are robust and meet the requirements, e.g., for toilet paper rolls. This property may be increasingly promoted by the increasingly narrower ranges of grammage specified for the three-ply tissue paper product.

The tissue paper product may have a (sheet) caliper of at least 0.40 mm, optionally at least 0.45 mm, or at least 0.50 mm. These lower thresholds on the caliper may, to an increasing degree with the higher values for the lower threshold, lead to good customer satisfaction, as customers expect a minimum caliper.

The first ply may comprise first embossments with a first height (h1), the first height (h1) being in a range of 0.2 mm to 2.0 mm.

The second ply may comprise second embossments with a second height (h2), the second height (h2) being in a range of 0.2 mm to 2.0 mm.

The adhesive, such as lamination glue, may be applied to tips of the first embossments of the first ply and/or tips of the second embossments of the second ply.

The first ply may comprise third embossments with a third height (h3) smaller than the first height h1 (h1>h3). The third height (h3) may be in a range of 0.1 mm to 1.2 mm.

According to some embodiments, the third ply has not been embossed prior to ply-bonding. Sometimes, the third ply (the middle ply) may be referred to as an unembossed ply. With "unembossed", it is meant that the third ply is not pre-embossed prior to the final ply-bonding being carried out. That is, the third ply may no longer be flat after the ply-bonding, but has not beforehand been embossed using an embossing roll. According to some embodiments, the third ply is partially embossed at locations where it is ply-bonded with the first ply or the second ply.

The third ply may be made of Conventional Wet Press (CWP) paper or a structured paper ply, such as such as a ply made of TAD, UCTAD, eTAD, Atmos, or NTT.

According to some embodiments, the first ply and the third ply have been embossed together to form the first embossments on the first ply and the third ply.

According to some embodiments, the third embossments have been formed only on the first ply, but not on the third ply. According to other embodiments, the first ply and the third ply have been embossed together to form the third embossments on the first ply and the third ply.

The third ply (i.e., the middle ply) may comprise fourth embossments with a fourth height (h4), the fourth height (h4) being in a range of 0.2 mm to 2.0 mm. The third ply may have been embossed separately from the first ply and the second ply. According to some embodiments, the fourth embossments have been formed by a fourth heated embossing roll.

The third embossments (if present) may have been formed by the same heated embossing roll that was used to form the first embossments, or, alternatively, by a different (heatable or non-heatable) embossing roll.

According to some embodiments, the second embossments have been formed by a second heated embossing roll. If the embossing is performed with the second heated embossing roll, i.e., if heat-embossing is performed, this may promote higher tensile strength, and/or higher absorption capacity without (or while hardly) lowering the softness of the tissue paper product as compared to a reference product manufactured analogously but without heat-embossing (i.e., embossing without a heated embossing roll).

According to some embodiments, the third embossments have been formed by a third heated embossing roll. If the embossing is performed with the third heated embossing roll, i.e., if heat-embossing is performed, this may promote higher tensile strength, and/or higher absorption capacity without (or while hardly) lowering the softness of the tissue paper product as compared to a reference product manufactured analogously but without heat-embossing (i.e., embossing without a heated embossing roll).

A geometrical mean tensile strength of tissue paper products of the coreless roll comprising three plies may lie in a range of 100 N/m to 280 N/m, optionally 120 N/m to 280 N/m, or 140 N/m to 280 N/m.

The coreless rolls with a tissue paper product made of three plies described above may have a particularly high radial compression strength. Specifically, the radial compression strength of such rolls may be 20 N or more, or even 25N or more, or even 30N. These are robust and meet the requirements, e.g., for toilet paper rolls. In particular, they may achieve customer satisfaction for coreless rolls.

Another aspect of the above-mentioned object is achieved by a coreless roll of a tissue paper product, such as toilet paper, with four plies, in accordance with the present disclosure. The coreless roll is made of a spirally wound continuous web of tissue paper product having a first end and a second end. The web of tissue paper product is wound such as to define an axially extending inner hole centrally positioned relative to the coreless roll and such that the first end is located on the outer side of the coreless roll and the second end is located at the inner hole.

The coreless roll has an outer diameter in the range of 95 to 150 mm. A diameter of the inner hole is in the range of 20 to 50 mm. A density of the coreless roll is in a range of 110 to 150 kg/m³.

A caliper ratio of the roll is in a range of 12% to 40%. If the caliper ratio is lower than 12%, the radial compression strength of the coreless roll may not be satisfactory. If the caliper ratio is higher than 30%, the embossing load needed to manufacture the coreless roll may have a negative impact on the tensile strength of the tissue paper product.

The tissue paper product comprises four plies: a first ply, a second ply, a third ply, and a fourth ply, wherein the first ply is one of the outermost plies. In other words, a total number of plies of the tissue paper product is four. Put differently, the tissue paper product consists of four plies. However, the latter statement does not imply that the tissue paper product cannot comprise other constituents (other than plies), such as adhesive, additives, etc. It means only that the number of plies is four. At least one of the four plies is an embossed ply. One of the four may be an embossed ply, or two of the four, three of the four, or all four plies may be embossed plies.

The four plies are ply-bonded. According to some embodiments, they may be bonded with an adhesive, such as lamination glue, and/or with mechanical bonding, such as edge embossing.

The grammage of the tissue paper product is in a range of 55 g/m² to 95 g/m², or optionally 60 g/m² to 80 g/m².

The first ply is made of Conventional Wet Press (CWP paper) that has been embossed with a heated embossing roll. This may promote higher tensile strength, and/or larger caliper of the tissue paper product without (or while hardly) lowering the softness of the tissue paper product as compared to a reference product manufactured analogously but without heat-embossing (i.e., embossing without a heated embossing roll).

The second ply is a structured ply, such as a ply made of TAD, UCTAD, eTAD, Atmos, or NTT.

The coreless rolls with a tissue paper product made of four plies described above may have lower densities than comparative products manufactured without using a heated embossing roll to emboss any of the plies (and keeping the other manufacturing parameters the same). The caliper ratio is nevertheless comparatively high, so that the coreless rolls described above are robust, for example, in terms of their handling and storage properties.

The coreless rolls with a tissue paper product made of four plies described above may have a particularly high radial compression strength. Specifically, the radial compression strength of such rolls may be 20 N or more, or even 25N or more, or even 30N. These are robust and meet the requirements, e.g., for toilet paper rolls. This property may be increasingly promoted by the increasingly narrower ranges of grammage specified for the four-ply tissue paper product.

The tissue paper product may have a (sheet) caliper of at least 0.55 mm, optionally at least 0.60 mm, or at least 0.65 mm. These lower thresholds on the caliper may, to an increasing degree with the higher values for the lower threshold, lead to good customer satisfaction, as customers expect a minimum caliper in a tissue paper product.

The second ply may be one of the outermost plies, so that the first ply and the second ply are in that case the outermost plies, and that the third ply and the fourth ply are, hence, located between the first ply and the second ply.

The first ply may comprise first embossments with a first height (h1), the first height (h1) being in a range of 0.2 mm to 2.0 mm.

The second ply may comprise second embossments with a second height (h2), the second height (h2) being in a range of 0.2 mm to 2.0 mm.

The adhesive, such as lamination glue, may be applied to tips of the first embossments of the first ply and/or tips of the second embossments of the second ply.

The first ply may comprise third embossments with a third height (h3) smaller than the first height h1 (h1>h3). The third height (h3) may be in a range of 0.1 mm to 1.2 mm.

The first ply and the third ply may have been embossed together to form the first embossments on the first ply and the third ply.

According to some embodiments, the fourth ply is unembossed.

According to some embodiments, the fourth ply may have been embossed separately from the first ply, the second ply, and the third ply.

According to some embodiments, the third embossments have optionally been formed only on the first ply but not on the third ply. According to other embodiments, the first ply and the third ply have been embossed together to form the third embossments on the first ply and the third ply.

According to some embodiments, the first ply, the third ply, and the fourth ply have been embossed together to form the first embossments on the first ply, the third ply, and the fourth ply.

According to some embodiments, the first ply, the third ply, and the fourth ply have been embossed together to form the third embossments on the first ply, the third ply, and the fourth ply.

According to some embodiments, the third embossments have been formed on the first ply and the third ply, but not on the fourth ply.

According to some embodiments, the third embossments have been formed on the first ply, but not on the third ply and the fourth ply.

According to some embodiments, the third ply and the fourth ply have been embossed together separately from the first ply and the second ply. According to other embodiments, one of the third ply and the fourth ply has been separately embossed from the first ply and the second ply, and the other one of the third ply and the fourth ply is unembossed. According to yet other embodiments, the third ply and the fourth ply are unembossed.

According to some embodiments, the first ply and the third ply have been embossed together to form the first embossments on the first ply and the third ply. In addition thereto or as an alternative thereto, the fourth ply and the second ply have been embossed together to form the second embossments on the fourth ply and the second ply.

According to some embodiments, the first ply and the third ply have been embossed together to form the third embossments on the first ply and the third ply. According to other embodiments, the third embossments have been formed only on the first ply but not on the third ply.

The first embossments may have been formed by the heated embossing roll. In addition thereto or as an alternative thereto, the second embossments may have been formed by a second heated embossing roll. In addition thereto or as an alternative thereto, the third embossments may have been formed by the heated embossing roll or a third heated embossing roll.

The coreless rolls with a tissue paper product made of four plies described above may have a particularly high radial compression strength. Specifically, the radial compression strength of such rolls may be 20 N or more, or even 25N or more, or even 30N. These are robust and meet the requirements, e.g., for toilet paper rolls.

A geometrical mean tensile strength of tissue paper products of the coreless roll comprising four plies may lie in a range of 170 N/m to 370 N/m, optionally 200 N/m to 370 N/m, or 220 N/m to 370 N/m.

According to some embodiments, the third ply is made of Conventional Wet Press (CWP) paper and the fourth ply is made of Conventional Wet Press (CWP) paper.

According to some embodiments, the third ply is a structured paper ply, such as a ply made of TAD, UCTAD, eTAD, Atmos, or NTT, and the fourth ply is made of Conventional Wet Press (CWP) paper.

According to some embodiments, the third ply is made of Conventional Wet Press (CWP) paper and the fourth ply is a structured paper ply, such as a ply made of TAD, UCTAD, eTAD, Atmos, or NTT.

According to some embodiments, the third ply is a structured paper ply, such as a ply made of TAD, UCTAD, eTAD, Atmos, or NTT, and the fourth ply is a structured paper ply, such as a ply made of TAD, UCTAD, eTAD, Atmos, or NTT.

The first embossments may cover between 1% and 20% of a total surface of the first ply, optionally between 2% and 10%, or between 3% and 6%. The first embossments may be provided with a density of 15 dots/cm² or less, optionally 10 dots/cm² or less.

A density of the third embossments (if present) may be in a range of 25 to 120 embossments/cm², optionally 40 to 100 embossments/cm², or 50 to 80 embossments/cm².

The grammage of the first ply may be in a range of 15 to 30 g/m², optionally 16 to 25 g/m², or 18 to 22 g/m².

The grammage of the second ply may be in a range of 12 to 30 g/m², optionally 14 to 25 g/m², or 15 to 23 g/m².

Any one of the above-described embodiments of a coreless roll comprising two, three, or four plies, may have a radial compression strength of 20N or more, optionally of 25N or more, or of 30N or more.

Another aspect of this disclosure relates to a coreless roll of a tissue paper product, such as toilet paper, that is structured as follows. The coreless roll is made of a spirally wound continuous web of tissue paper product having a first end and a second end. The web of tissue paper product is wound such as to define an axially extending inner hole centrally positioned relative to the coreless roll and such that the first end is located on the outer side of the coreless roll and the second end is located at the inner hole.

The tissue paper product comprises at least two plies, including at least a first ply and a second ply, the first ply being one of the outermost plies of the tissue paper product. A total number of plies of the tissue paper product is between 2 and 4. The between 2 and 4 plies are ply-bonded, optionally with an adhesive, such as lamination glue, and/or mechanical bonding, such as edge embossing, to form the tissue paper product.

The coreless roll has an outer diameter in the range of 95 to 150 mm. A diameter of the inner hole is in the range of 20 to 50 mm. A density of the coreless roll being in a range of 80 to 150 kg/m³.

A caliper ratio of the roll is in a range of 30%-80% if the total number of plies is 2, the caliper ratio of the roll is in a range of 20%-60% if the total number of plies is 3, and the caliper ratio of the roll is in a range of 12%-30% if the total number of plies is 4. The caliper ratio $(c_s-c_t)/c_t$ is obtained by dividing a difference between a standard caliper $c_s$ of the tissue paper product as defined by the standard ISO-12625-3:2014 and a theoretical caliper $c_t$ of the tissue paper product by the theoretical caliper $c_t$. The theoretical caliper $c_t$ is defined as a ratio between a grammage of the tissue paper product and the density of the roll.

The coreless roll has a radial compression strength of 20N or more, optionally of 25N or more, or of 30N or more.

The first ply is made of Conventional Wet Press (CWP paper) that has been embossed with a heated embossing roll. This may promote higher tensile strength, and/or larger caliper of the tissue paper product without (or while hardly) lowering the softness of the tissue paper product as compared to a reference product manufactured analogously but without heat-embossing (i.e., embossing without a heated embossing roll).

The second ply is a structured ply, such as a ply made of TAD, UCTAD, eTAD, Atmos, or NTT.

The coreless rolls with a tissue paper product described above may have lower densities than comparative products manufactured without using a heated embossing roll to emboss any of the plies (and keeping the other manufacturing parameters the same). The caliper ratio is nevertheless comparatively high, so that the coreless rolls described above are robust, for example, in terms of their handling and storage properties.

In the case of any embodiment (or any combination of embodiments, in so far the features of the different embodiments are not incompatible) of a tissue paper product described above (irrespective of the number of plies, etc., and irrespective of which of all of the above-described aspects is chosen), at least a part of an innermost circumvolution, optionally the entire innermost circumvolution, of the absorbent material of the coreless roll at the second end may comprise a stabilizing coating composition. This may aid in promoting good radial and/or axial stability of the coreless roll.

The coating composition may comprise at least one of the following list: a polymer including oxygen and/or nitrogen atoms, a non-ionic polymer such as a non-ionic cellulose ether, polyether polyol.

The coating composition may comprise water.

When the coating composition comprises a nonionic polymer, the ionic demand may be in a range of from −1000 to +100 µeq/g, or −500 to +50 µeq/g, or −50 to 0 µeq/g.

The coating composition may be applied to only one side of the innermost turn. This one side may be side oriented towards the axially extending inner hole.

Another aspect of this disclosure relates to a method of manufacturing a coreless roll of a tissue paper product, such as toilet paper, the tissue paper product being made of two plies. The method comprises the steps of:

providing a first ply of Conventional Wet Press paper (CWP) and a second ply, the second ply being a structured paper ply, such as a ply made of TAD, UCTAD, eTAD, Atmos, or NTT;

embossing the first ply with a heated embossing roll;

ply-bonding the two plies, optionally with an adhesive, such as a lamination glue, or with mechanical bonding, such as edge embossing, to form a tissue paper product with a grammage in a range of 24 $g/m^2$ to 50 $g/m^2$, and a caliper ratio in a range of 30% to 80%;

spirally winding up the tissue paper product on a mandrel to form a coreless roll and to define an axially extending inner hole facing the mandrel, with a first end of the tissue paper product being located on the outer side of the coreless roll and the second end being located at the inner hole; and withdrawing the mandrel;

wherein the coreless roll comprises an outer diameter in the range of 95 to 150 mm and a diameter of the inner hole is in the range of 20 to 50 mm, and the density of the coreless roll lies in a range of 80 to 150 $kg/m^3$.

The caliper ratio may be adjusted by adjusting the embossing pressure during the manufacturing process.

The coreless rolls manufactured by the method may have the same benefits as the coreless rolls with two plies described above. In other words, features of the coreless rolls of any of the embodiments described above translate into corresponding features of an embodiment of the method, and vice versa. For the sake of conciseness, benefits which may be associated with particular features of an embodiment of the product will not be discussed for the corresponding method claims, but reference is instead made on a general basis now to the respective passage of the description relating to embodiments of the product.

The caliper of the manufacture tissue paper may be at least 0.35 mm, or at least 0.40 mm, or at least 0.45 mm.

According to some embodiments, the method comprises the steps of:

embossing the first ply with the heated embossing roll with first embossing protrusions to form first embossments with a first height (h1) in a range of 0.2 mm to 2.0 mm; and embossing the second ply with a second embossing roll with second embossing protrusions to form second embossments with a second height (h2) in a range of 0.2 mm to 2.0 mm.

According to some embodiments, the heated embossing roll also comprises third embossing protrusions, and the step of embossing the first ply forms first and third embossments on the first ply. According to other embodiments, the method comprises a step of embossing the first ply with a third embossing roll with third embossing protrusions to form third embossments. In other words, a second type of embossments may be formed on the first ply either with one and the same embossment roll as used for the first embossments, or they may be formed with another embossing roll. Analogous statements hold for yet further types of embossments (different types referring to embossments with different shapes and/or different embossment heights, etc.). The third embossing protrusions may be formed with a height (h3) in range of 0.1 mm to 1.2 mm.

Another aspect of this disclosure relates to a method of manufacturing a coreless roll of a tissue paper product, such as toilet paper, the tissue paper product being made of three plies. The method comprises the steps of:

providing three plies, being a first ply, a second, ply, and a third ply, the first ply being a ply made of Conventional Wet Press (CWP) paper, the second ply being a structured paper ply, such as a ply made of TAD, UCTAD, eTAD, Atmos, or NTT;

embossing the first ply with a heated embossing roll;

ply-bonding the three plies, optionally with an adhesive, such as a lamination glue, or with mechanical bonding, such as edge embossing, to form a tissue paper product with the first ply being one of the outermost plies, and with a grammage in a range of 34 $g/m^2$ to 65 $g/m^2$, optionally 40 $g/m^2$ to 63 $g/m^2$, or 45 $g/m^2$ to 60 $g/m^2$ and a caliper ratio in a range of 20% to 60%;

spirally winding up the tissue paper product on a mandrel to form a coreless roll and to define an axially extending inner hole facing the mandrel, with a first end of the tissue paper product being located on the outer side of the coreless roll and the second end being located at the inner hole; and withdrawing the mandrel;

wherein the coreless roll comprises an outer diameter in the range of 95 to 150 mm and a diameter of the inner hole is in the range of 20 to 50 mm, and the density of the coreless roll lies in a range of 90 to 150 $kg/m^3$.

The caliper ratio may be adjusted by adjusting the embossing pressure during the manufacturing process.

The tissue paper products manufactured by the method may have analogous benefits as the tissue paper products with three plies described above. In other words, features of the tissue paper products of any of the embodiments described above translate into corresponding features of an embodiment of the method, and vice versa. For the sake of conciseness, benefits which may be associated with particular features of an embodiment of the product will not be discussed for the corresponding method claims, but reference is instead made on a general basis now to the respective passage of the description relating to embodiments of the product.

The caliper of the manufactured tissue paper may be at least 0.40 mm, or at least 0.45 mm, or at least 0.50 mm.

According to some embodiments, the method comprises the steps of:

embossing the first ply with the heated embossing roll with first embossing protrusions to form first embossments with a first height (h1) in a range of 0.2 mm to 2.0 mm; and embossing the second ply with a second embossing roll with second embossing protrusions to form second embossments with a second height (h2) in a range of 0.2 mm to 2.0 mm;

wherein the first, second, and third plies are ply-bonded.

According to some embodiments, the heated embossing roll also comprises third embossing protrusions, and the step of embossing the first ply forms first and third embossments on the third ply. The third embossing embossments may have a height (h3) in range of 0.1 mm to 1.2 mm. According to other embodiments, the method comprises a step of embossing the first ply with a third embossing roll with third embossing protrusions to form third embossments. the third embossing embossments may have a height (h3) in range of 0.1 mm to 1.2 mm. In other words, a second type of embossments may be formed on the first ply either with one and the same embossment roll as used for the first embossments, or they may be formed with another embossing roll. Analogous statements hold for yet further types of embossments (different types referring to embossments with different shapes and/or different embossment heights, etc.).

The third ply may, according to some embodiments, not be embossed. In other words, the third ply may be a flat ply in the sense of not being (pre-)embossed by an embossing roll prior to the ply-bonding taking place. It need not be flat after the ply-bonding in the sense that the ply-bonding may remove flatness of the third ply.

The first ply and the third ply may be embossed together using the first embossing roll to form the first embossments on the first ply and the third ply.

According to some embodiments, the third embossments are formed only on the first ply but not on the third ply. According to other embodiments, the first ply and the third ply are embossed together to form the third embossments on the first ply and the third ply.

The second embossments on the second ply may be formed by a second heated embossing roll.

The third embossments may be formed by the heated embossing roll or a third heated embossing roll.

The method may comprise a step of forming fourth embossments with a fourth height (h4) on the third ply with a fourth embossing roll, the fourth height (h4) being in a range of 0.2 mm to 2.0 mm, wherein the third ply is embossed separately from the first ply and the second ply.

The fourth embossments may be formed by a fourth heated embossing roll.

Another aspect of this disclosure relates to a method of manufacturing a coreless roll of a tissue paper product, such as toilet paper, the tissue paper product being made of four plies. The method comprises the steps of:

providing four plies, the four plies being a first ply, a second ply, a third ply, and a fourth ply, the first ply being a ply made of Conventional Wet Press (CWP) paper, the second ply being a structured paper ply, such as a ply made of TAD, UCTAD, eTAD, Atmos, or NTT;
  embossing the first ply with a heated embossing roll;
  ply-bonding the four plies, optionally with an adhesive, such as a lamination glue, or with mechanical bonding, such as edge embossing, to form a tissue paper product with a grammage in a range of 55 g/m$^2$ to 95 g/m$^2$, or optionally 60 g/m$^2$ to 80 g/m$^2$, and a caliper ratio in a range of 12% to 40%;
  spirally winding up the tissue paper product on a mandrel to form a coreless roll and to define an axially extending inner hole facing the mandrel, with a first end of the tissue paper product being located on the outer side of the coreless roll and the second end being located at the inner hole; and
  withdrawing the mandrel;
  wherein the coreless roll comprises an outer diameter in the range of 95 to 150 mm and a diameter of the inner hole is in the range of 20 to 50 mm, and the density of the coreless roll lies in a range of 110 to 150 kg/m$^3$.

The caliper ratio may be adjusted by adjusting the embossing pressure during the manufacturing process.

The tissue paper products manufactured by the method may have the same benefits as the tissue paper products with four plies described above. In other words, features of the tissue paper products of any of the embodiments described above translate into corresponding features of an embodiment of the method, and vice versa. For the sake of conciseness, benefits which may be associated with particular features of an embodiment of the product will not be discussed for the corresponding method claims, but reference is instead made on a general basis now to the respective passage of the description relating to embodiments of the product.

The caliper of the manufacture tissue paper may be at least at least 0.55 mm, or at least 0.60 mm, or at least 0.65 mm According to some embodiments, the method comprises the steps of:

embossing the first ply with the heated embossing roll with first embossing protrusions to form first embossments with a first height (h1) in a range of 0.2 mm to 2.0 mm; and
  embossing the second ply with a second embossing roll with second embossing protrusions to form second embossments with a second height (h2) in a range of 0.2 mm to 2.0 mm.

According to some embodiments, the heated embossing roll also comprises third embossing protrusions, and the step of embossing the first ply forms first and third embossments on the third ply. According to other embodiments, the method comprises a step of embossing the first ply with a third embossing roll with third embossing protrusions to form third embossments. In other words, a second type of embossments may be formed on the first ply either with one and the same heated embossment roll as used for the first embossments, or they may be formed with another embossing roll. Analogous statements hold for yet further types of embossments (different types referring to embossments with different shapes and/or different embossment heights, etc.).

The method may comprise the step of embossing the first ply and third ply together using the heated embossing roll to form the first embossments on the first ply and the third ply. According to some embodiments, the third embossments are formed only on the first ply but not on the third ply. According to other embodiments, the first ply and the third ply are embossed together to form the third embossments on the first ply and the third ply.

The first ply and the third ply may be embossed together to form the first embossments on the first ply and the third ply.

According to some embodiments, the fourth ply is not embossed. According to other embodiments, the fourth ply is embossed separately from the first ply, the third ply, and the second ply.

The third embossments may be formed only on the first ply but not on the third ply. Alternatively, the first ply and the third ply may be embossed together to form the third embossments on the first ply and the third ply.

The first ply, the third ply, and the fourth ply may be embossed together to form the first embossments on the first ply, the third ply, and the fourth ply.

The first ply, the third ply, and the fourth ply may be embossed together to form the third embossments on the first ply, the third ply, and the fourth ply.

According to some embodiments, the third embossments are formed on the first ply and the third ply, but not on the fourth ply.

According to some embodiments, the third embossments are optionally formed on the first ply, but not on the third ply and the fourth ply.

The third ply and the fourth ply may be embossed together separately from the first ply and the second ply.

One of the third ply and the fourth ply may be separately embossed from the first ply and the second ply, and the method may not comprise a step of embossing the other one of the third ply and the fourth ply.

The method may not comprise a step of embossing the third ply and may not comprise a step of embossing the fourth ply.

According to some embodiments, the first ply and the third ply are embossed together using the heated embossing roll to form the first embossments on the first ply and the third ply, wherein the fourth ply and the second ply are embossed together to form the second embossments on the fourth ply and the second ply.

According to some embodiments, the first ply and the third ply are embossed together using the heated embossing roll to form the third embossments on the first ply and the third ply. Alternatively, the third embossments are formed only on the first ply but not on the third ply.

The second embossments on the second ply may be formed by a second heated embossing roll.

The third embossments may be formed by the heated embossing roll or a third heated embossing roll.

The first embossments may be formed on an area of the first ply constituting between 1% and 20% of a total surface of the first ply, and/or the third embossments may be formed with a density in a range of 25 to 120 embossments/cm$^2$, optionally 40 to 100 embossments/cm$^2$, or 50 to 80 embossments/cm$^2$.

Any embodiment of the method in accordance with the present disclosure may comprise a step of coating at least a part of an innermost circumvolution, optionally the entire innermost circumvolution, of the tissue paper product of the coreless roll at the second end with a stabilizing coating composition. The coating step may be carried out prior to the step of winding up the tissue paper product on a mandrel.

According to some embodiments, the heated embossing roll may be heated to a temperature in the range of 80° C. to 170°, optionally 100° C. to 165°, 110° C. to 165°, 120° C. to 160°, or 130° C. to 155°, from the inside or outside by a heating means. The heating means may comprise heat carrying fluid and/or rely on induction and/or infrared heating.

In accordance with any one of the above-described embodiments (or any combination thereof, in so far not incompatible) of the method, irrespective of the total number of plies of the tissue paper product of the coreless roll manufactured, at least a part of the first ply or the second ply, or, more generally, the tissue paper product which is to be an innermost circumvolution of the coreless roll, or even the entire innermost circumvolution, of the tissue paper product of the coreless roll at the second end is provided with a stabilizing coating composition. This may aid in promoting good radial and/or axial stability of the coreless roll.

The coating composition may comprise at least one of the following list: a polymer including oxygen and/or nitrogen atoms, a non-ionic polymer such as a non-ionic cellulose ether, polyether polyol. The coating composition may comprise water. When the coating composition comprises a nonionic polymer, the ionic demand may be in a range of from −1000 to +100 μeq/g, or −500 to +50 μeq/g, or −50 to 0 μeq/g.

The coating composition may be applied to only one side of the innermost turn. This one side may be side oriented towards the axially extending inner hole.

In accordance with any one of the above-described embodiments (or any combination thereof, in so far not incompatible) of the method, an embossing load of 1 to 50 kg/cml, or optionally of 5 to 40 kg/cml may be used for heat-embossing a ply.

In accordance with any one of the above-described embodiments (or any combination thereof, in so far not incompatible) of the method, a ply may be micro-embossed (and, in particular, micro-heat-embossed with embossments heights in a range of 0.2 mm to 2.0 mm.

In accordance with any one of the above-described embodiments (or any combination thereof, in so far not incompatible) of the method, the first ply may be moistened, prior to being embossed, with a liquid, such as water optionally provided with one or several additives. The first ply may be moistened with an amount of liquid in the range of 2% to 12% of the basis weight of the first ply, or optionally 4% to 10% of the basis weight of the first ply. Analogous statements hold with respect to the second ply.

According to other embodiments, the first ply has not been moistened with a liquid prior to having been embossed. An analogous statement holds with respect to the second ply.

This disclosure also relates to coreless rolls of a tissue paper product manufactured according to any one (or any combination of, in so far not incompatible) embodiments of the method in accordance with the present disclosure.

Moreover, aspects of the above-mentioned object are achieved by a tissue paper product in accordance with the present disclosure.

One aspect of this disclosure relates to a tissue paper product, such as toilet paper or household towel, wherein the tissue paper product comprises between two and four plies. These two, three, or four plies include at least a first ply and a second ply, and the two plies, three plies, or four plies are ply-bonded, optionally using an adhesive such as lamination glue or mechanical bonding, such as edge embossing, to form the tissue paper product. The first ply and the second ply are the outermost plies of the tissue paper product.

A grammage of the tissue paper product is in a range of 24 to 50 g/m$^2$ if a total number of plies of the tissue paper product is 2, in a range of 34 to 65 g/m$^2$ if a total number of plies of the tissue paper product is 3, and in a range of 55 to 95 g/m$^2$ if a total number of plies of the tissue paper product is 4.

Whenever reference is made to the "grammage" (or "basis weight") in this text, reference is made to the basis weight (grammage) as determined by a test method following the principles set forth in standard EN ISO 12625-6:2016 for determining the basis weight. Test pieces of 50 cm$^2$ are punched from the sample sheet. Test pieces are chosen randomly from the entire sample and should be free of folds, wrinkles and any other deviating distortions. The pieces are conditioned at 23° C., 50% RH (Relative Humidity) for at least 2 hours. A pile of 20 pieces is weighed on a calibrated balance. The basis weight (grammage) is the weighed mass divided by the total area 1000 cm$^2$ (20×50 cm$^2$) and recorded as mean value with standard deviations.

The first ply is made of Conventional Wet Press (CWP) paper. The first ply has been embossed with a heated embossing roll. The first ply may be the top ply or the bottom ply, depending on the embodiment of the tissue paper product.

The second ply is a structured paper ply, such as a ply made of TAD, UCTAD, eTAD, Atmos, or NTT.

The embossing of the first ply with a heated embossing roll may be advantageous as the embossments may have a better shape memory, i.e., they may be more resilient against shape deformation when the tissue paper product is wet. That is, the embossments being less affected when the ply is wet. This means that the tissue paper product may have a better absorption capacity than a comparable tissue paper product which does not comprise at least one ply that was embossed using a heated embossing roll. Moreover, as compared to a product without a ply that was embossed using a heated embossing roll with a certain thickness and strength (tensile strength), a higher thickness may be reached while retaining the same tensile strength. In other words, the tissue paper product in accordance with the present disclosure has high thickness and good absorption properties, as well as a high tensile strength. In particular, with the same embossing load during a manufacturing process, a higher thickness of the tissue product may be reached.

Whenever reference is made to the "absorption capacity" in this text, reference is made to an absorption capacity measured as follows. The measurements are carried out using the basket immersion method. A test sample with a defined width and total mass is placed in a cylindrical basket which is dropped from a defined height over a water surface with deionized water in accordance with ISO 14487 (conductivity≤0.25 mS/m at 25 C). The time is measured between when the basket is dropped until the test sample is fully wet. The average time recorded for a number of samples is the equated to the water absorption time. The amount of absorbed water is determined from the dry and wet weight of the test sample. Previous to the measurement, the test samples are to be conditioned a sufficient time under 23° C. and 50% relative humidity (see ISO 187-standard atmosphere for conditioning and testing tissue). The resulting water absorption capacity is reported in grams water per gram test piece to the nearest 0.1 g/g. The method is carried out in accordance with ISO 12625-8:2011 (water-absorption time and water-absorption capacity, basket-immersion test method).

Whenever reference is made to the "thickness" in this text, reference is made to the thickness as obtained in accordance with the norm ISO 12625-3:2014 using the Frank Thickness Gauge equipment (Model 16502) or the like. The tissue paper sheet to be measured is cut into pieces of minimum 80 mm in any direction and the pieces are conditioned at 23° C., 50% RH (Relative Humidity) for at least 2 hours. During measurement a sample piece is placed between a fixed bottom plate and a pressure foot. The pressure foot is then lowered at a speed of 2.0 mm/s. The thickness value for the sheet is then read after the pressure value is stabilized. The Essity Internal diameter of the pressure foot is 35.7 mm. The lower plate dimension is minimum 20% bigger. The pressure applied is 2.0 kPa during the measurement.

Whenever reference is made to a "tensile strength" in this text, the tensile strengths in question can be measured and compared as dry tensile strengths following the standard EN ISO 12625-4:2016 or as wet tensile strengths following the standard ISO 12625-5:2016.

The dry strength is determined according to EN ISO 12625-4: 2016, Tissue Paper and Tissue Products, Part 4: Determination of width-related breaking strength, elongation at break and tensile energy absorption. For exemplary purposes, the tensile tester used for the measurement featured two clamps of 50 mm width. Each clamp can grip the test piece firmly, but without damage, along a straight line across the full width of the test piece (the clamping line). The distance between the clamping lines was set at 100 mm. For special tests, the distance is reduced if the available length of the sample is lower than 100 mm (e.g., toilet tissue in cross direction). The tissue paper product to be measured, i.e., two sheets of a single-ply or multi-ply product, was cut into test pieces of 50 mm wide with parallel edges. Each sheet was cut into two different types of test pieces by cutting in the machine direction and in the cross direction. The obtained test pieces were then conditioned in an atmosphere of 23° C., 50% RH (Relative Humidity) for at least 4 hours. The test piece to be measured was placed between the clamps without any strain, and such that any observable slack is eliminated. At the beginning, a pre-tensile force of 25 cN is applied (zero of stretch) then the elongation rate between the clamps was kept constant at 5 cm/min. The maximum tensile force required to break the test piece was obtained. The measurement was repeated with six test pieces and the values obtained were averaged. The dry tensile strength was calculated by means of the following formula: Mean dry tensile strength [N/m]=(mean maximum tensile force [N]/initial width of the test piece [mm])×10<3.

The tissue paper products in accordance with the present disclosure may have similarly high thicknesses as comparative products, in which the CWP ply is replaced by another structured paper ply that was not heat-embossed (but which are otherwise manufactured analogously), due to the fact that the CWP has been heat-embossed, while they may at the same time be cheaper to manufacture. In other words, the heat-embossed CWP ply may add less costs to the production of the tissue paper product than another structured ply.

The tissue paper product may in particular be a toilet paper. However, also other tissue paper products are covered, for example, hand towels, napkins, facial tissues, toilet paper, etc.

If ply-bonding with an adhesive is used, the adhesive may, e.g., be a polyvinyl alcohol and/or a methyl cellulose based adhesives. An adhesive may, for example, be applied based on spraying equipment.

The first ply may comprise two types of embossments and may have been processed using "double height embossing" whereby one or several rolls with embossing protrusions having different heights were used. Double height embossing may not only serve to provide bulk to the fibrous product but also to provide an improved optical appearance to the product. The optical appearance can be improved by combining embossing and coloring steps. Another reason for embossing is to generate higher absorbency or improved perceived softness.

Tissue paper products in particular for use as hygiene or wiping products primarily include all kinds of dry-creped tissue paper, wet-creped paper, TAD-paper (Through Air Drying), tissue paper based on structured technologies such as ATMOS®, NTT, UCTAD and cellulose or pulp-wadding, or combinations, laminates or mixtures thereof. Typical properties of these hygiene and wiping products include the ability to absorb tensile stress energy, their drapability, good textile-like flexibility, properties which are frequently referred to as bulk softness, a high surface softness and a high specific volume with a perceptible thickness. A liquid absorbency as high as possible and, depending on the application, a suitable wet and dry strength as well as an appealable visual appearance of the outer product's surfaces are desired. These properties, among others, allow these hygiene and wiping products to be used, for example, as cleaning wipes such as windscreen cleaning wipes, industrial wipes, kitchen paper or the like; as sanitary products such as, for example, bathroom tissue, handkerchiefs, household towels, towels and the like; as cosmetic wipes such as for example facials and as serviettes or napkins, etc. Furthermore, the hygiene and wiping products can be dry, moist, wet, printed or pre-treated in any manner. In addition, the hygiene and wiping products may be folded, interleaved or individually placed, stacked or rolled, connected or not, in any suitable manner.

According to some embodiments, the first ply comprises micro-embossments with a micro-embossment height in a range of 0.1 mm to 1.2 mm.

According to some embodiments, the first ply comprises macro-embossments with a macro-embossment height in a range of 0.2 mm to 2.0 mm, optionally 0.8 mm to 1.4 mm. The first ply may, in particular, comprise micro-embossment and macro-embossments. The density of the total number of embossments of the first ply may be in a range of from 25 to 120 dots/cm$^2$, optionally 40 to 100 dots/cm$^2$, or 50 to 80 dots/cm$^2$. These densities may, to an increasing degree for narrower ranges, promote high tensile strength and good absorption capacities of the respective tissue paper product.

According to embodiments, an embossing density may be measured, e.g., using 3D tomography (for example, using Alicona Infinite Focus SL with the software IF-Measure-Suite Version 5.1). Alicona Infinite Focus SL with the software IF-MeasureSuite Version 5.1 may also be used to measure a surface area that has been embossed and/or an embossment height. The embossment height may be defined as a distance from a bottom of the ply to a top of the ply in sectional view.

The macro-embossments may cover between 1% and 20% of a total surface of the first ply, optionally between 2% and 10%, or between 3% and 6%. The macro-embossments may be provided with a density of 15 dots/cm$^2$ or less, optionally 10 dots/cm$^2$ or less.

According to some embodiments, the first ply has been embossed with a heated first embossing roll heated to a temperature in the range of 80° C. to 170°, optionally 100° C. to 165°, 110° C. to 165°, 120° C. to 160°, or 130° C. to 155°.

The first embossing roll that was used to emboss the first ply may be heatable to a surface temperature in the range of 80° C. to 170°, optionally 100° C. to 165°, 110° C. to 165°, 120° C. to 160°, or 130° C. to 155°. These temperature ranges may to an increasing degree with narrower ranges promote the manufacturing of a tissue paper product with good shape memory and/or large thickness, high machine direction (MD) and/or cross direction (CD) tensile strength, and good absorption properties.

The references to the temperatures of the heatable embossing roll(s) in this text are references, in particular, to surface temperatures of the embossing roll. These may be measured, for example, using an infrared thermometer. Moreover, the temperature values refer to temperatures in the steady state of the manufacturing apparatus, i.e., not while running and while plies are in contact with the embossing rolls. In particular, the surface temperature of the heatable embossing roll may drop during manufacturing, due to various effects such as heat conduction to the ply in contact with the roll, etc. For example, a surface temperature of 170° C. might be measured in the steady state (when the embossing roll is not in contact with a ply), and this temperature might decrease to a temperature in the range of 100° C. to 130° C. during manufacturing, etc. In other words, while the manufacturing is taking place, there may be variations in temperature.

To summarize regarding the indicating of temperatures used to heat-emboss the first ply, the temperatures may thus be referred to as "steady-state" temperatures, i.e., temperatures pertaining to a state in which the embossing roll is heated, but manufacturing is not running (the embossing roll is not in contact with a ply).

According to some embodiments, the second ply has been embossed with a non-heated embossing roll. According to other embodiments, the second ply may not have been embossed in the sense of not having been pre-embossed prior to the prior ply bonding having been carried out.

According to some embodiments, the first ply has been moistened, prior to the step of embossing the first ply, with a liquid, such as water with or without one or several additives. The first ply may be moistened with an amount of liquid in the range of 2% to 12% of the basis weight of the first ply, or optionally 4% to 10% of the basis weight of the first ply, prior to being embossed. Analogous statements hold with respect to the second ply.

The first ply may be moistened with an amount of liquid in the range of 2% to 12% of the basis weight of the first ply, or optionally 4% to 10% of the basis weight of the first ply. Analogous statements hold with respect to the second ply.

According to some embodiments, the first ply has not been moistened with a liquid prior to the step of embossing. In these cases, the first ply may also be referred to as a dry heat-embossed ply.

Some embodiments of the tissue paper product comprise exactly two plies. In the following, these will be referred to as the first ply and the second ply.

The tissue paper product comprises two plies. In fact, a total number of plies of the tissue paper product is two. Put differently, the tissue paper product consists of two plies. However, the latter statement does not imply that the tissue paper product cannot comprise other constituents (other than plies), such as adhesive, additives, etc. It means only that the number of plies is two. At least one of the two plies is an embossed ply. However, both plies may be embossed plies.

The (heat-embossed) first ply comprises first embossments with a first height (h1). The first height (h1) is in a range of 0.2 mm to 2.0 mm.

The second ply may comprise second embossments with a second height (h2). The second height (h2) is in a range of 0.2 mm to 2.0 mm.

The adhesive, such as lamination glue, may have been applied to tips of the first embossments of the first ply and/or to tips of the second embossments of the second ply.

The first ply may comprise third embossments with a third height (h3) smaller than the first height (h1) (h1>h3).

The second ply may comprise fourth embossments with a fourth height (h4) smaller than the second height (h2) (h2>h4).

Some embodiments of the tissue paper product comprise exactly three plies. These will in the following be referred to as the first ply and the second ply and a third ply, located between the first ply and the second ply.

The tissue paper product comprises three plies. In fact, a total number of plies of the tissue paper product is three. Put differently, the tissue paper product consists of three plies. However, the latter statement does not imply that the tissue paper product cannot comprise other constituents (other than plies), such as adhesive, additives, etc. It means only that the number of plies is three. At least one of the three plies is an embossed ply. One of the three, two of the three, or all three plies may be embossed plies.

The third ply may be made of Conventional Wet Press (CWP) paper, or a structured paper ply, such as such as a ply made of TAD, UCTAD, eTAD, Atmos, or NTT.

The first ply may comprise first embossments with a first height (h1), the first height (h1) being in a range of 0.2 mm to 2.0 mm. The adhesive, such as lamination glue, may be applied to tips of the first embossments of the first ply.

The second ply may comprise second embossments with a second height (h2), the second height (h2) being in a range of 0.2 mm to 2.0 mm.

The first ply may comprise third embossments with a third height (h3) smaller than the first height h1 (h1>h3).

The second ply may comprise fourth embossments with a fourth height (h4) smaller than the second height h2 (h2>h4).

According to some embodiments, the third ply has not been embossed prior to ply bonding. Sometimes, the third ply (the middle ply) may be referred to as an unembossed ply. With "unembossed", it is meant that the third ply is not pre-embossed prior to the final ply-bonding being carried out. That is, the third ply may no longer be flat after the ply-bonding, but has not beforehand been embossed using an embossing roll.

The adhesive, such as lamination glue, may have been applied to the third ply at parts bonded to tips of the first embossments of the first ply and/or to tips of the second embossments of the second ply, and/or the adhesive, such as lamination glue, may have been applied to tips of the first embossments of the first ply and/or to tips of the second embossments of the second ply.

According to some embodiments, the first ply and the third ply have been embossed together to form the first embossments on the first ply and the third ply.

According to some embodiments, the third embossments have been formed only on the first ply but not on the third ply. According to other embodiments, the first ply and the third ply have been embossed together to form the third embossments on the first ply and the third ply.

Some embodiments of the tissue paper product comprise exactly four plies. These will be referred to in the following as the first ply and the second ply, and a third ply and a fourth ply. The third ply and the fourth ply are located between the first ply and the second ply. The third ply may be made of Conventional Wet Press (CWP) paper or a structured paper ply, such as such as a ply made of TAD, UCTAD, eTAD, Atmos, or NTT, and/or the fourth ply may be made of Conventional Wet Press (CWP) paper or a structured paper ply, such as such as a ply made of TAD, UCTAD, eTAD, Atmos, or NTT.

The tissue paper product comprises four plies. In fact, a total number of plies of the tissue paper product is four. Put differently, the tissue paper product consists of four plies. However, the latter statement does not imply that the tissue paper product cannot comprise other constituents (other than plies), such as adhesive, additives, etc. It means only that the number of plies is four. At least one of the four plies is an embossed ply. One of the four may be an embossed ply, or two of the four, three of the four, or all four plies may be embossed plies.

The first ply may comprise first embossments with a first height (h1), the first height (h1) being in a range of 0.2 mm to 2.0 mm.

The second ply may comprise second embossments with a second height (h2), the second height (h2) being in a range of 0.2 mm to 2.0 mm.

The first ply may comprise third embossments with a third height (h3) smaller than the first height h1 (h1>h3).

The second ply may comprise fourth embossments with a fourth height (h4) smaller than the second height h2 (h2>h4).

The adhesive, such as lamination glue, may have been applied to the third ply and/or the fourth ply at parts bonded to tips of the first embossments of the first ply and/or to tips of the second embossments of the second ply, and/or the adhesive, such as lamination glue, may have been applied to tips of the first embossments of the first ply and/or to tips of the second embossments of the second ply.

The first ply and the third ply may have been embossed together to form the first embossments on the first ply and the third ply.

According to some embodiments, the fourth ply has not been embossed prior to ply-bonding or has been embossed separately from the first ply and the third ply.

According to some embodiments, the third embossments are formed only on the first ply but not on the third ply. According to other embodiments, the first ply and the third ply have been embossed together to form the third embossments on the first ply and the third ply.

According to some embodiments, the first ply, the third ply, and the fourth ply have been embossed together to form the first embossments on the first ply, the third ply, and the fourth ply.

According to some embodiments, the first ply, the third ply, and the fourth ply have been embossed together to form the third embossments on the first ply, the third ply, and the fourth ply.

According to some embodiments, the third embossments have been formed on the first ply and the third ply, but not on the fourth ply.

According to some embodiments, the third embossments have been formed on the first ply, but not on the third ply and the fourth ply.

According to some embodiments, the third ply and the fourth ply have been embossed together separately from the first ply and the second ply. According to other embodiments, one of the third ply and the fourth ply has been separately embossed from the first ply and the second ply, and the other one of the third ply and the fourth ply is unembossed. According to yet other embodiments, the third ply and the fourth ply are unembossed. With "unembossed", reference is made to a ply that was not pre-embossed prior to the final ply-bonding.

The first embossments may be provided on an area constituting between 1% and 20% of a total surface of the first ply, and/or a density of the third embossments may be in a range of 25 to 120 embossments/cm$^2$, optionally 40 to 100 embossments/cm$^2$, or 50 to 80 embossments/cm$^2$.

The grammage of each of the plies of any one of the above-described embodiments of the tissue paper products may be in a range of 13 to 30 g/m$^2$, optionally 16 to 28 g/m$^2$, or 18 to 24 g/m$^2$.

According to some embodiments, the first ply may include one or two types of embossments, being decorative embossments with an embossing height in a range of 0.2 mm to 2.0 mm, optionally 0.8 mm to 1.4 mm, and/or micro-embossments with an embossing height in a range of 0.1 mm to 1.2 mm. The decorative embossments may be provided with a density of 15 dots/cm$^2$ or less, optionally 10 dots/cm$^2$ or less.

According to some embodiments, the second ply may include one or two types of embossments, being decorative embossments with an embossing height in a range of 0.2 mm to 2.0 mm, optionally 0.8 mm to 1.4 mm, and/or micro-embossments with an embossing height in a range of 0.1 mm to 1.2 mm. The decorative embossments may be provided with a density of 15 dots/cm$^2$ or less, optionally 10 dots/cm$^2$ or less.

Micro-embossments and/or decorative embossments may be in the form of lines or dots or other shapes. In the case that the decorative embossments are dot-shaped, the density may be lower than 10 embossments/cm$^2$ for the decorative embossments.

One aspect of this disclosure relates to a tissue paper product, such as toilet paper or household towel, wherein the tissue paper product comprises between two and four plies, including at least a first ply and a second ply, the two plies, three plies, or four plies being ply-bonded, optionally using an adhesive such as lamination glue or mechanical bonding, such as edge embossing, to form the tissue paper product, the first ply and the second ply being the outermost plies of the tissue paper product.

A grammage of each of the plies being in a range of 13 to 30 g/m$^2$, optionally 16 to 28 g/m$^2$, or 18 to 24 g/m$^2$. The first ply is made of Conventional Wet Press (CWP) paper. The second ply is a structured paper ply, such as a ply made of TAD, UCTAD, eTAD, Atmos, or NTT, and the first ply has been embossed with a heated embossing roll.

The embossing of the first ply with a heated embossing roll may be advantageous as the embossments may have a better shape memory, i.e., they may be more resilient against shape deformation when the tissue paper product is wet. That is, the embossments being less affected when the ply is wet. This means that the tissue paper product may have a better absorption capacity than a comparable tissue paper product which does not comprise at least one ply that was embossed using a heated embossing roll. Moreover, as compared to a product without a ply that was embossed using a heated embossing roll with a certain thickness and strength (tensile strength), a higher thickness may be reached while retaining the same tensile strength. In other words, the tissue paper product in accordance with the present disclosure has high thickness and good absorption properties, as well as a high tensile strength. In particular, with the same embossing load (as used for manufacturing a comparative product under the same conditions with the exception embossing without a heated embossing roll) during a manufacturing process, a higher thickness of the tissue product may be reached.

The tissue paper products in accordance with the present disclosure may have similarly high thicknesses as comparative products, in which the CWP ply is replaced by another structured paper ply that was not heat-embossed (but which are otherwise manufactured analogously), due to the fact that the CWP has been heat-embossed, while they may at the same time be cheaper to manufacture. In other words, the heat-embossed CWP ply may add less costs to the production of the tissue paper product than another structured ply.

Another aspect of this disclosure relates to a roll of tissue paper product made of a spirally wound continuous web of the tissue paper product of any one of the above-described embodiments.

The tissue paper product has a first end and a second end. The web of tissue paper product is wound such as to define an axially extending inner hole centrally positioned relative to the roll and such that the first end is located on the outer side of the roll and the second end is located at the inner hole.

A moisture content of a mother reel used to supply plies for manufacturing tissue paper products in accordance with the present disclosure may be in a range of 3% to 15%, optionally 3% to 10%, or optionally 4% to 7%.

According to some embodiments, the tissue paper product of the roll is provided with perforations for tearing off individual sheets.

A diameter of the roll may be in a range of 85 to 200 mm (including the boundaries). Such a roll is particularly suitable for household towels.

This disclosure also relates to a stack of unfolded sheets or a stack of folded sheets of the tissue paper product in accordance with any one or several of the above-described embodiments. In the case of some embodiments, the folded sheets may be separate individual folded sheets, or individual separate interfolded sheets. Alternatively, continuous sheets (with or without perforations for separating sheets) may be folded to form the stack. Optionally, the folded sheets may be multi-interfolded.

This disclosure also relates to a method of manufacturing a tissue paper product, such as toilet paper or household towel, comprising at least two plies. The method may be used to manufacture a tissue paper product in accordance with any one or several of the above-described embodiments of tissue paper product. Every one of the features of an embodiment of the tissue paper product translates into a feature of an embodiment of the method, and vice versa. These statements equally apply to embodiments of the method in accordance with the present disclosure for manufacturing tissue paper products comprising two plies, three plies, or four plies.

The method comprises the steps of:

feeding between two and four plies, including at least a first ply made of Conventional Wet Press (CWP) paper and a second ply being a structured paper ply, such as a ply made of TAD, UCTAD, eTAD, Atmos, or NTT, with each ply having a grammage in a range of 13 to 30 g/m$^2$, optionally 16 to 28 g/m$^2$, or 18 to 24 g/m$^2$;

embossing the first ply on a first embossing roll with first embossing protrusions with a first height (h1) to form first embossments on the first ply, embossing the second ply on a second embossing roll with second embossing protrusions with a second height (h2) to form second embossments on the second ply, ply-bonding the two plies, three plies, or four plies ply, optionally using an adhesive, such as a lamination glue, or mechanical bonding, such as edge embossing, to form the tissue paper product.

The step of embossing the first ply is performed using a heated first embossing roll.

With "edge embossing", reference is made to a technique of mechanically bonding plies on the edges. This may be done with wheels with lines of side embossing and a flat counter-cylinder, and the ply-bonding is effected by exerting mechanical pressure.

Each of the embossing rolls used for manufacturing the tissue paper product may be a roll comprising a hard material such as metal, especially steel. Alternatives comprise embossing rolls made of hard rubber or hard plastics materials. The embossing rolls can be a male roll having individual protrusions. Typical heights/depths of the engraved embossing patterns are between 0.2 and 2.0 mm. For the heated embossing, a heatable embossing roll is used.

The machinery used for performing the method may comprise an application system for adhesive consisting of applicator roll, adhesive transfer roll and adhesive bath can be designed as a so-called immersion roll system in which the adhesive transfer roll is partially immersed into the adhesive bath and transports adhesive by means of surface tension and adhesive forces out of the adhesive bath. By adjusting the gap between the adhesive transfer roll and the applicator or application roll, or by adjusting the relative speed of the transfer roll relative to the applicator roll, the amount of adhesive to be applied can be adjusted. Application rolls may be structured rolls. Additionally or as an alternative thereto, water can be used (instead of adhesive) for ply-bonding.

The at least one heatable roll may be heatable from the inside or outside by a heating means.

The heating means may comprise heat carrying fluid and/or rely on induction and/or infrared heating.

The heatable roll may be heatable to a surface temperature in the range of 80° C. to 170°, optionally 100° C. to 165°, 110° C. to 165°, 120° C. to 160°, or 130° C. to 155°. These temperature ranges may to an increasing degree with narrower ranges promote the manufacturing of a tissue paper product with good shape memory and/or large thickness, high machine direction (MD) and/or cross direction (CD) tensile strength, and good absorption properties.

The references to the temperatures of the heatable embossing roll(s) in this text are references, in particular, to surface temperatures of the embossing roll. These may be measured, for example, using an infrared thermometer. Moreover, the temperature values refer to temperatures in the steady state of the manufacturing apparatus, i.e., not while running and while plies are in contact with the embossing rolls. In particular, the surface temperature of the heatable embossing roll may drop during manufacturing, due to various effects such as heat conduction to the ply in contact with the roll, etc. For example, a surface temperature of 170° C. might be measured in the steady state (when the embossing roll is not in contact with a ply), and this temperature might decrease to a temperature in the range of 100° C. to 130° C. during manufacturing, etc.

The indicated temperature ranges may, to an increasing degree with increasingly narrower ranges, promote being able to produce tissue paper products with an increased (cross- and/or main direction) tensile strength as compared to reference products which are made the same way but without using heated embossing rolls. The strength increase may be in a range of about 5-25% or even 20-25%. In addition or alternative thereto, a gain in absorption capacity of about 15% and/or an increase in cross-directional (CD) tensile strength of about 5-10% may be achieved, while (for each case) the softness of the product may not be decreased or only insignificantly decreased with respect to the respective reference product.

The method may comprise a step of embossing the second ply using a non-heated second embossing roll.

The first ply may be moistened with a liquid, such as water with or without one or several additives. The first ply may be moistened with an amount of liquid in the range of 2% to 12% of the basis weight of the first ply, or optionally 4% to 10% of the basis weight of the first ply, prior to being embossed with a heated embossing roll, prior to the step of embossing the first ply.

To moisten the first ply, a manufacturing apparatus may include a wetting unit that is configured to provide a liquid, such as water or, for example, water provided with one or several additives such as softening agents and/or vitamins and/or scents, to the first ply. According to some embodiments, the wetting unit is configured to spray the liquid onto the respective ply. The wetting in these ranges may, to an increasing degree with increasingly narrower ranges, promote high tensile strength, good softness properties, and absorption capacity in the manufactured tissue paper products.

According to some embodiments, the apparatus does not comprise a wetting unit for providing a liquid to any of the plies. In other words, the apparatus may be configured to process the first ply without wetting it with a liquid. Such embodiments may promote high tensile strength, good softness properties, and absorption capacity in the manufactured products.

According to some embodiments, the first ply is, hence, not moistened with a liquid prior to the step of embossing the first ply. The first ply may in these cases be referred to as a dry heat-embossed ply.

Some embodiments of the method manufacture a tissue paper product comprising exactly two plies and having a grammage in a range of 24 to 50 $g/m^2$. These embodiments may comprise the steps of:

embossing the first ply with the heated first embossing roll with the first embossing protrusions to form the first embossments with a first height (h1) in a range of 0.2 mm to 2.0 mm; and embossing the second ply with the second embossing roll with the second embossing protrusions to form the second embossments with a second height (h2) in a range of 0.2 mm to 2.0 mm.

According to some embodiments, the first embossing roll also comprises third embossing protrusions, and the step of embossing the first ply forms first and third embossments on the first ply. According to other embodiments, the method comprises a step of embossing the first ply with a third embossing roll with third embossing protrusions to form third embossments. In other words, a second type of embossments may be formed on the first ply either with one and the same embossment roll as used for the first embossments, or they may be formed with another embossing roll.

Analogous statements hold for yet further types of embossments (different types referring to embossments with different shapes and/or different embossment heights, etc.).

The third embossments may have a third height (h3) smaller than the first height h1 (h1>h3).

According to some embodiments, the second embossing roll also comprises fourth embossing protrusions, and the step of embossing the second ply forms second and fourth embossments on the third ply. According to other embodiments, the method comprises a step of embossing the second ply with a fourth embossing roll with fourth embossing protrusions to form fourth embossments. In other words, a second type of embossments may be formed on the second ply either with one and the same embossment roll as used for the second embossments, or they may be formed with another embossing roll.

Analogous statements hold for yet further types of embossments (different types referring to embossments with different shapes and/or different embossment heights, etc.).

The height of the fourth embossments h4 may be smaller than the height of the second embossments h2 (h2>h4).

Some embodiments of the method manufacture a tissue paper product comprising exactly three plies and having a grammage in a range of 34 to 65 $g/m^2$. The three plies will in the following be referred to as the first ply, the second ply, and a third ply, located between the first ply and the second ply.

Embodiments of the method comprise the steps of:

embossing the first ply with the heated first embossing roll with the first embossing protrusions to form the first embossments with a first height (h1) in a range of 0.2 mm to 2.0 mm; and embossing the second ply with the second embossing roll with the second embossing protrusions to form the second embossments with a second height (h2) in a range of 0.2 mm to 2.0 mm.

According to some embodiments, the first embossing roll also comprises third embossing protrusions, and the step of embossing the first ply forms first and third embossments on the first ply. According to other embodiments, the method comprises a step of embossing the first ply with a third embossing roll with third embossing protrusions to form third embossments. In other words, a second type of embossments may be formed on the first ply either with one and the same embossment roll as used for the first embossments, or they may be formed with another embossing roll.

Analogous statements hold for yet further types of embossments (different types referring to embossments with different shapes and/or different embossment heights, etc.).

The third embossments may have a third height (h3) smaller than the first height h1 (h1>h3).

According to some embodiments, the second embossing roll also comprises fourth embossing protrusions, and the step of embossing the second ply forms second and fourth embossments on the third ply. According to other embodiments, the method comprises a step of embossing the second ply with a fourth embossing roll with fourth embossing protrusions to form fourth embossments. In other words, a second type of embossments may be formed on the second ply either with one and the same embossment roll as used for the second embossments, or they may be formed with another embossing roll.

Analogous statements hold for yet further types of embossments (different types referring to embossments with different shapes and/or different embossment heights, etc.).

The height of the fourth embossments h4 may be smaller than the height of the second embossments h2 (h2>h4).

Some embodiments of the method do not comprise a step of embossing the third ply. In other words, according to these embodiments, the third ply is not pre-embossed prior to the step of final ply-bonding of all three plies.

According to some embodiments, the method comprises a step of embossing the first ply and the third ply together to form the first embossments on the first ply and the third ply.

The first ply and the third ply may be embossed together to form also the third embossments on the first ply and the third ply.

Some embodiments of the method manufacture a tissue paper product comprising exactly four plies and having a grammage in a range of 55 to 95 $g/m^2$. The four plies will in the following be referred to as the first ply, the second ply, as well as a third ply and a fourth ply, the third ply and the fourth ply being located between the first ply and the second ply.

The third ply may be made of Conventional Wet Press (CWP) paper, or a structured paper ply, such as such as a ply made of TAD, UCTAD, eTAD, Atmos, or NTT.

The fourth ply may be made of made of Conventional Wet Press (CWP) paper, or a structured paper ply, such as such as a ply made of TAD, UCTAD, eTAD, Atmos, or NTT.

According to some embodiments, the method comprises the steps of:

embossing the first ply with the heated first embossing roll with the first embossing protrusions to form the first embossments with a first height (h1) in a range of 0.2 mm to 2.0 mm;

embossing the second ply with the second embossing roll with the second embossing protrusions to form the second embossments with a second height (h2) in a range of 0.2 mm to 2.0 mm.

The first embossing roll may also comprise third embossing protrusions, and the step of embossing the first ply forms the first and third embossments on the first ply, the third embossments having a third height (h3) smaller than the first height (h1) (h1>h3).

Some embodiments of the method comprise a step of embossing the first ply with a third embossing roll with third embossing protrusions to form third embossments on the first ply, the third embossments having a third height (h3) smaller than the first height (h1) (h1>h3). Analogous statements hold for yet further types of embossments (different types referring to embossments with different shapes and/or different embossment heights, etc.).

According to some embodiments, the second embossing roll also comprises fourth embossing protrusions, and the step of embossing the second ply forms second and fourth embossments on the second ply. According to other embodiments, the method comprises a step of embossing the second ply with a fourth embossing roll with fourth embossing protrusions to form fourth embossments. In other words, a second type of embossments may be formed on the second ply either with one and the same embossment roll as used for the second embossments, or they may be formed with another embossing roll. Analogous statements hold for yet further types of embossments (different types referring to embossments with different shapes and/or different embossment heights, etc.).

Embodiments of the method may comprise the step of embossing the first ply and the third ply together to form the first embossments on the first ply and the third ply.

The method may not comprise a step of embossing the fourth ply. In other words, the fourth ply may not be pre-embossed prior to the final ply-bonding being carried out. According to other embodiments, the fourth ply is embossed separately from the first ply and the third ply.

According to some embodiments, the third embossments are formed only on the first ply but not on the third ply. According to other embodiments, the first ply and the third ply are embossed together to form the third embossments on the first ply and the third ply.

The first ply, the third ply, and the fourth ply may be embossed together to form the first embossments on the first ply, the third ply, and the fourth ply.

The first ply, the third ply, and the fourth ply may be embossed together to form the third embossments on the first ply, the third ply, and the fourth ply. Alternatively, the third embossments may be formed on the first ply and the third ply, but not on the fourth ply. Yet alternatively, the third embossments may be formed on the first ply, but not on the third ply and the fourth ply.

According to some embodiments, the third ply and the fourth ply are embossed together separately from the first ply.

The method may not comprise a step of (pre-)embossing the third ply. The method may also not comprise a step of (pre-)embossing the fourth ply.

According to some embodiments, the first embossments are formed on an area of the first ply constituting between 1% and 20% of a total surface of the first ply, and/or the third embossments are formed with a density in a range of 25 to 120 embossments/$cm^2$, optionally 40 to 100 embossments/$cm^2$, or 50 to 80 embossments/$cm^2$.

An embossing load during the embossing of the first ply may be in a range of from to 1 to 50 kg/cml, or optionally 5 to 40 kg/cml.

This disclosure further relates to a tissue paper product manufactured according to any of the above-mentioned embodiments of the method in accordance with the present disclosure. Such a tissue paper product may have a good shape memory in terms of the resilience of the embossments after having been wet. The statements about shape memory for the respective embodiments of the tissue paper product are equally applicable to the tissue paper product manufactured in accordance with the method of the present disclosure.

This disclosure also relates to a roll of a tissue paper product, such as toilet paper or household towel, made of a spirally wound continuous web of the tissue paper product having a first end and a second end, the web of the tissue paper product being wound such as to define an axially extending inner hole centrally positioned relative to the roll and such that the first end is located on the outer side of the roll and the second end is located at the inner hole, the tissue paper product being the tissue paper product manufactured in accordance with an embodiment of the method in accordance with the present disclosure.

This disclosure also relates to a stack of unfolded sheets or of folded sheets of tissue paper product manufactured in accordance with an embodiment of the method in accordance with the present disclosure.

Additional advantages and features of the present disclosure, that can be realized on their own or in combination with one or several features discussed above, insofar as the features do not contradict each other, will become apparent from the following description of particular embodiments.

BRIEF DESCRIPTION OF THE DRAWINGS

For a better understanding of the present disclosure and to show how the same may be carried into effect, reference will now be made, by way of example only, to the accompanying drawings, in which:

The description is given with reference to the accompanying drawings, in which:

FIG. 1 is a schematic representation of a coreless roll 1 in accordance with the present disclosure.

Figure 1:
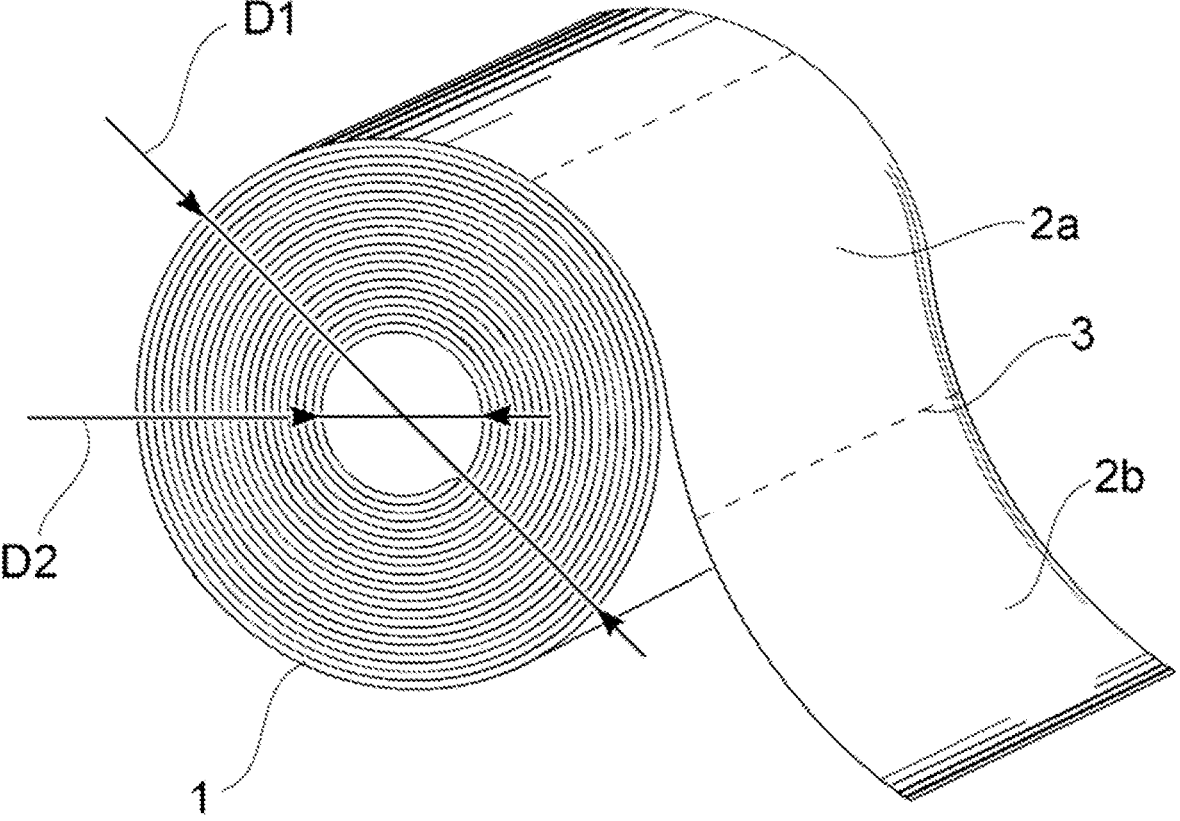
FIG. 1 is a perspective view of a coreless roll in accordance with the present disclosure.

The coreless roll 1 of FIG. 1 represents embodiments with a different tissue paper products with two, three, four, five, or six plies. All of the plies of these embodiments comprise at least one ply made of Conventional Wet Press (CWP) paper), and at least another ply made of CWP paper or at least one structured paper ply, such as a ply made of TAD, UCTAD, eTAD, Atmos, or NTT.

The embodiments of FIG. 1 are toilet paper rolls comprising a tissue paper product that comprises different sheets 2a, 2b which can be easily separated along a perforation line 3. However, other embodiments may not comprise such perforation lines.

The coreless roll 1 of FIG. 1 is made of a spirally wound continuous web of tissue paper product having a first end and a second end, the web of tissue paper product being wound such as to define an axially extending inner hole centrally positioned relative to the coreless roll 1 and such that the first end is located on the outer side of the coreless roll 1 and the second end is located at the inner hole.

The outer diameter D1 of the coreless roll 1 is in a range of 95 to 150 mm. The diameter D2 of the inner hole of the roll 1 is in a range of 20 to 50 mm. The density of the coreless roll 1 is in a range of 80 to 150 kg/m³ (narrower ranges for the respective numbers of plies of the tissue paper products are indicated above).

The tissue paper product of the embodiments of FIG. 1 is ply-bonded using an adhesive (a lamination glue). However, this is by no means limiting. In the case of other embodiments, the plies may, e.g., be ply-bonded using mechanical bonding, such as edge embossing. In other words, there is no need to use an adhesive, and other embodiments may be "glueless". A further alternative is that both an adhesive as well as mechanical bonding are used.

The grammage of the tissue paper products depends on the numbers of plies. It is in a range of 24 to 95 g/m² (narrower ranges for the respective numbers of plies are indicated above).

A caliper ratio of the roll is in a range of 12% to 80% (narrower ranges for the respective numbers of plies are indicated above), wherein the caliper ratio $(c_s-c_t)/c_t$ is obtained by dividing a difference between a standard caliper $c_s$ of the tissue paper product as defined by the standard ISO-12625-3:2014 and a theoretical caliper $c_t$ of the tissue paper product by the theoretical caliper $c_t$, and the theoretical caliper $c_t$ being defined as a ratio between a grammage of the tissue paper product and the density of the roll. The caliper ratio can be varied conveniently by varying the embossing pressure during manufacturing of the respective tissue paper product.

The radial compression strength of the coreless rolls 1 of FIG. 1 is at least 30 N or more. However, according to other embodiments, it is at least 20 N or more or at least 25 N or more. This provides robustness to a toilet paper roll (e.g., to achieve customer satisfaction, but also for packing purposes, etc.) and is achieved despite the fact the roll 1 is coreless. As the roll is coreless, waste is reduced, and the roll in question may be considered as environment-friendly.

The (sheet) caliper of the roll 1 is at least 0.35 mm.

Figure 2:
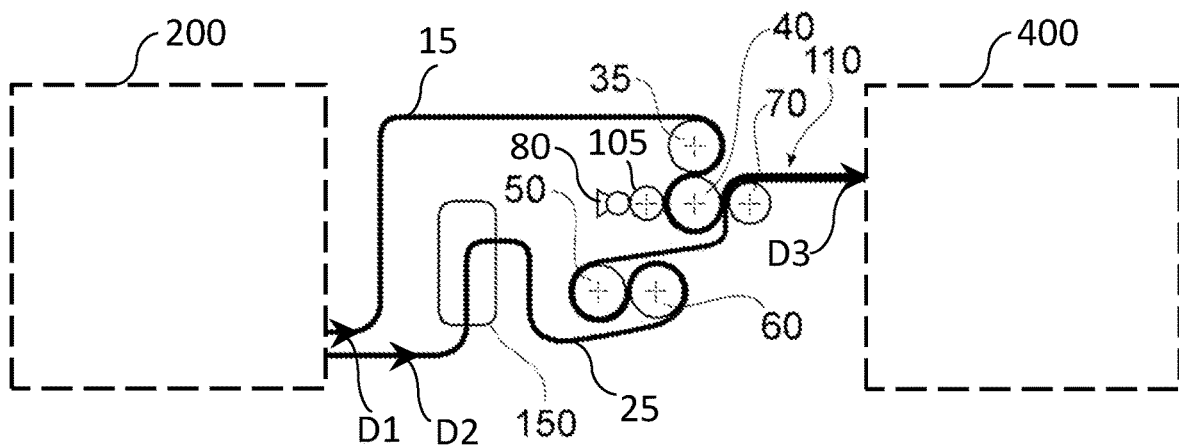
FIG. 2 is a schematic representation of (a part of) an embodiment of a manufacturing apparatus for manufacturing a coreless roll in accordance with the present disclosure with a first embodiment of a method in accordance with the present disclosure.

FIG. 2 is a schematic representation of (a part of) and embodiment of a manufacturing apparatus for manufacturing a coreless roll in accordance with the present disclosure using a first embodiment of a method in accordance with the present disclosure.

The box 200 in FIG. 2 schematically represents any constituents of the manufacturing apparatus that are used prior to those illustrated in FIG. 2 in more detail. For example, the box 200 may involve unwinding rolls for unwinding a first ply 15 and a second ply 25.

According to an embodiment of the method in accordance with the present disclosure relying on the manufacturing apparatus of FIG. 2, the first ply 15 is supplied at a processing speed D1, and the second ply 25 is supplied at a processing speed D2.

The first ply 15 is a structured paper ply made of TAD, UCTAD, eTAD, Atmos, or NTT. The second ply 25 made of Conventional Wet Press (CWP) paper.

The CWP paper ply 25 is, in the case of the embodiment of FIG. 2, moistened in a wetting unit 150 with water and then heat-embossed between an embossing roll 50 and a counter roll 60. The heatable embossing roll 50 is heated to a steady-state temperature in the range of 80° C. to 170° C.

The TAD paper ply 15 is embossed between a non-heatable embossing roll 40 and a counter roll 35. An adhesive supplying unit with a glue chamber 80 is provided adjacent to the roll 40. An applicator roll 105 is used to homogeneously transfer adhesive (dosed by cavities engraved in an anilox roll positioned between the glue chamber 80 and the applicator roll 105) to the first ply 15 prior to ply-bonding being carried out.

The structured (TAD) ply 15 and the heat-embossed CWP ply 25 are then ply-bonded between the embossing roll 40 and a marrying roll 70. The ply-bonded tissue paper product 110 comprising (at least two plies) is then conveyed further at a processing speed D3.

The box 400 represents any components of the manufacturing apparatus of FIG. 2 used subsequently to those described in more detail above. In particular, the box 400 may comprise a winding unit for winding up the manufactured tissue paper product 110, as well as further units for manufacturing a coreless roll.

Figure 3:
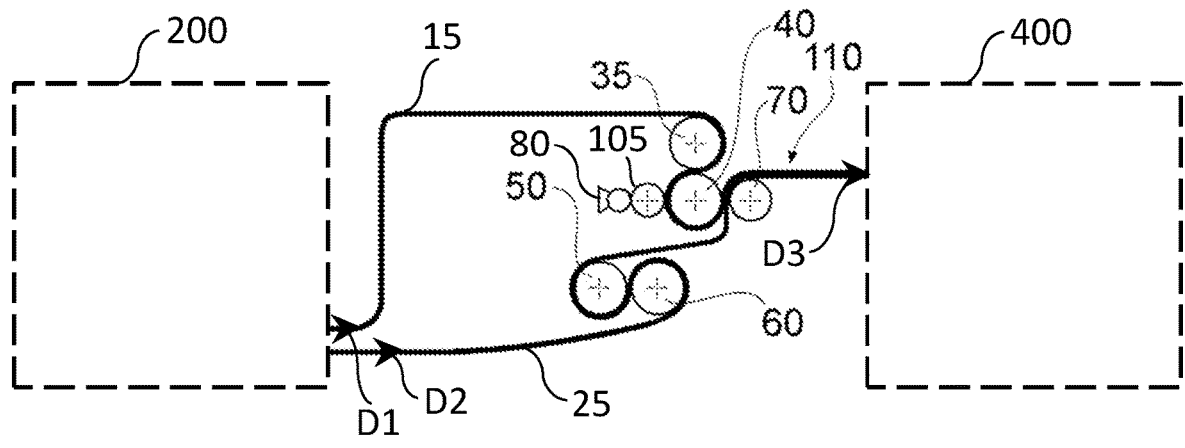
FIG. 3 is a schematic representation of (a part of) an embodiment of a manufacturing apparatus for manufacturing a coreless roll in accordance with the present disclosure with a second embodiment of a method in accordance with the present disclosure.

FIG. 3 is a schematic representation of (a part of) and embodiment of a manufacturing apparatus for manufacturing a coreless roll in accordance with the present disclosure using a second embodiment of a method in accordance with the present disclosure.

The box 200 in FIG. 3 schematically represents any constituents of the manufacturing apparatus that are used prior to the later stages illustrated in more detail. For example, the box 200 may involve unwinding rolls for unwinding a first ply 15 and a second ply 25.

According to an embodiment of the method in accordance with the present disclosure relying on the apparatus of FIG. 3, the first ply 15 is supplied at a processing speed D1, and the second ply 25 is supplied at a processing speed D2.

The difference between the apparatus of FIG. 2 and the one of FIG. 3, is that the one of FIG. 3 does not comprise a wetting unit. In other words, the CWP ply 25 is, in the case of using the apparatus of FIG. 3, not pre-moistened prior to the heat-embossing step been carried out between the heatable roll 50 and the counter roll 60.

The structured ply 15 is conveyed towards the rolls 35 and 40 and can be heat-embossed. The roll 35 is a counter roll, whereas the roll 40 is a heatable embossing roll. An adhesive supplying unit with a glue chamber 80 is provided adjacent to the roll 40. An applicator roll 105 is used to homogeneously transfer adhesive (dosed by cavities engraved in an anilox roll positioned between the glue chamber 80 and the applicator roll 105) to the structured ply 15 prior to ply-bonding being effected.

The CWP ply 25 is conveyed towards the rolls 50 and 60 and is heat-embossed between the counter roll 50 and the heatable embossing roll 60.

Ply-bonding of the first ply 15 and the second ply 25 is carried out between the embossing roll 40 and a marrying roll 70. The ply-bonded tissue paper product 110 is then conveyed further at a processing speed D3.

The box 400 represents any components of the manufacturing apparatus of FIG. 3 used later on. In particular, the box 400 may comprise a winding unit for winding up the produced tissue paper product 110, as well as further units for manufacturing a coreless roll.

Figure 4:
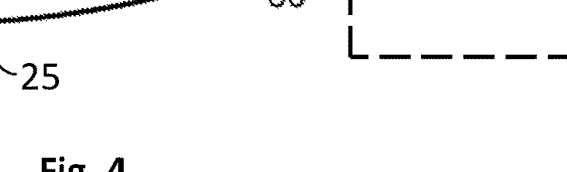
FIG. 4 is a schematic representation of (a part of) an embodiment of a manufacturing apparatus for manufacturing a coreless roll in accordance with the present disclosure with a third embodiment of a method in accordance with the present disclosure.

FIG. 4 depicts an apparatus used for carrying out a method in accordance with the present disclosure for manufacturing a coreless roll including a tissue paper product comprising (at least) three plies.

Most of what is shown is analogous to what was explained above with respect to FIG. 3. Reference is thus made to the corresponding explanations. A difference is that a third ply 120 (represented by a dotted line in FIG. 4) is additionally supplied. It is received and conveyed by another roll 130 and is then led to the embossing roll 40, where it is conveyed further together with the first ply 15. The first ply 15 and the third ply 120 are then ply-bonded together with the second ply 25 between the embossing roll 40 and the marrying roll 70.

In each of the cases of FIGS. 2 to 4, the respective embodiments corresponding to the figure in question may comprise one or more heatable embossing rolls.

FIGS. 5 to 25 depict a number of embodiments of tissue paper products which are spirally wound up to form coreless rolls in accordance with the present disclosure.

Figure 5:
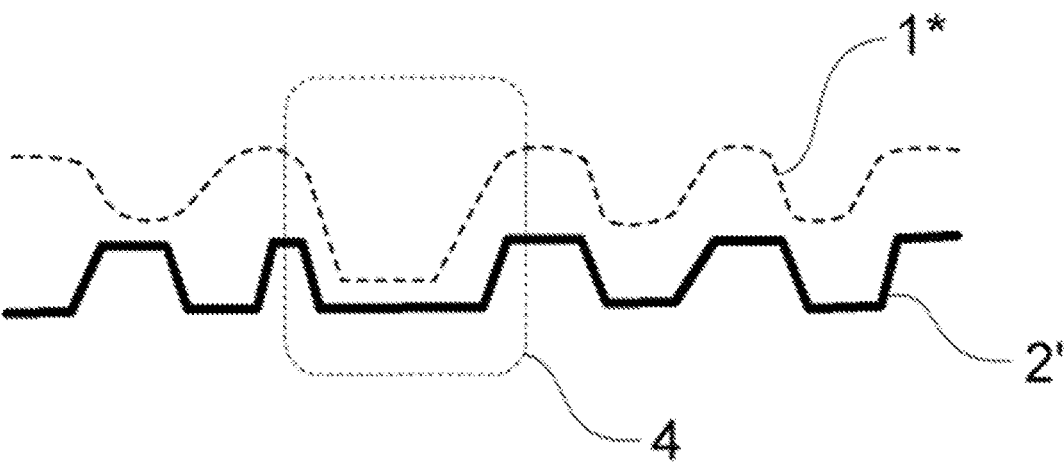
FIGS. 5-27 depict embodiments of tissue paper products which are constituents of coreless rolls in accordance with the present disclosure.
Figure 6:
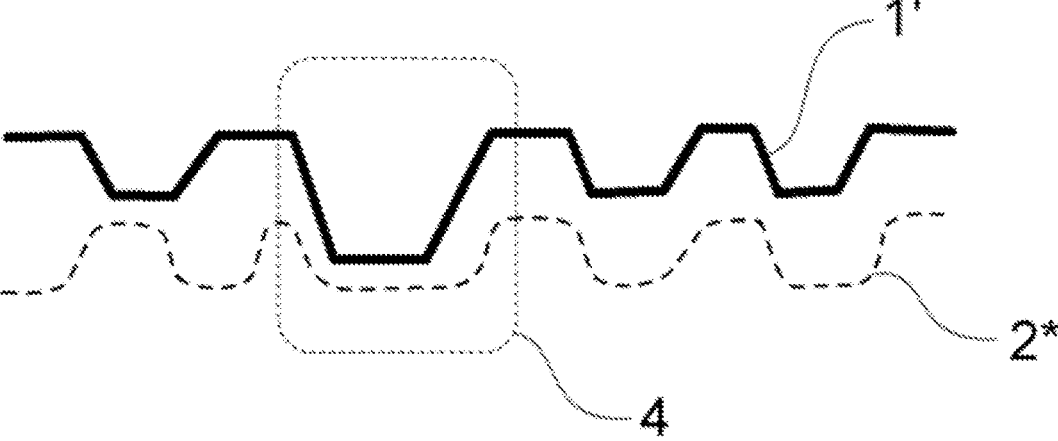

The embodiments of a tissue paper product of FIGS. 5 and 6 each comprise two plies: a top ply 1*, 1' and a bottom ply 2*, 2'.

The top ply 1*, 1" is in both cases double-height embossed, i.e., it comprises two types of embossments with different heights. The bottom ply 2*, 2' is embossed with one type of embossments (but could alternatively be unembossed prior to ply-bonding).

The top ply 1* and the bottom ply 2' of the embodiment of FIG. 5 have been ply-bonded. An example of where they are ply-bonded is shown in FIG. 5 as region 4. In the case of the embodiment of FIG. 5, they have been ply-bonded using an adhesive (lamination glue). The adhesive is present in tips of the embossments of the first ply 1 with a larger height (amongst two types of embossments of the double-embossed ply 1*). However, according to other embodiments, the ply-bonding could, e.g., have been effected using mechanical bonding such as edge embossing.

The top ply 1* of FIG. 5 is a structured paper ply made of TAD, UCTAD, eTAD, Atmos, or NTT. It has in this case been embossed with a non-heated embossing roll. However, embossing it with a heated embossing roll would be an alternative option. The top ply 1* is in the case of the embodiment of FIG. 5 an example of a "second ply" in the sense of the appended claims.

The bottom ply 2' of FIG. 5 is made of Conventional Wet Press (CWP) paper and constitutes an example of a "first ply" in the sense of the appended claims). The bottom ply 2' has been embossed using a heated embossing roll, i.e., with a heated first embossing roll heated to a temperature in the range of 80° C. to 170°. It is illustrated with a thickened line, in order to illustrate that it has been heat-embossed. This distinction between thicker and thinner lines will be maintained throughout the figures. The thicker lines represent plies that were heat-embossed, whereas the thinner lines represent plies that were embossed without heating. Structured plies are illustrated using dashed lines.

The embodiment of FIG. 6 differs from the one of FIG. 5 in that the top ply 1' of FIG. 6 is a ply made of Conventional Wet Press (CWP) paper (an example of a "first ply") and the bottom ply 2* of FIG. 6 is a structured paper ply made of TAD, UCTAD, eTAD, Atmos, or NTT (an example of a "second ply"). The bottom ply 2* has either not been embossed (not pre-embossed) or has been embossed with a non-heated embossing roll. The top ply 1' has been embossed using a heated embossing roll, i.e., with a heated first embossing roll heated to a temperature in the range of 80° C. to 170°. It is illustrated with a thickened line, in order to illustrate that it has been heat-embossed. Again, the ply-bonding has been effected at regions including tips of the higher (deeper) embossments of the double-embossed first ply A grammage of the tissue paper product of FIG. 5 and of FIG. 6 is in a range of 24 to 50 g/m², respectively.

The embodiments of FIGS. 7 to 10 are embodiments comprising exactly three plies.

Figure 7:
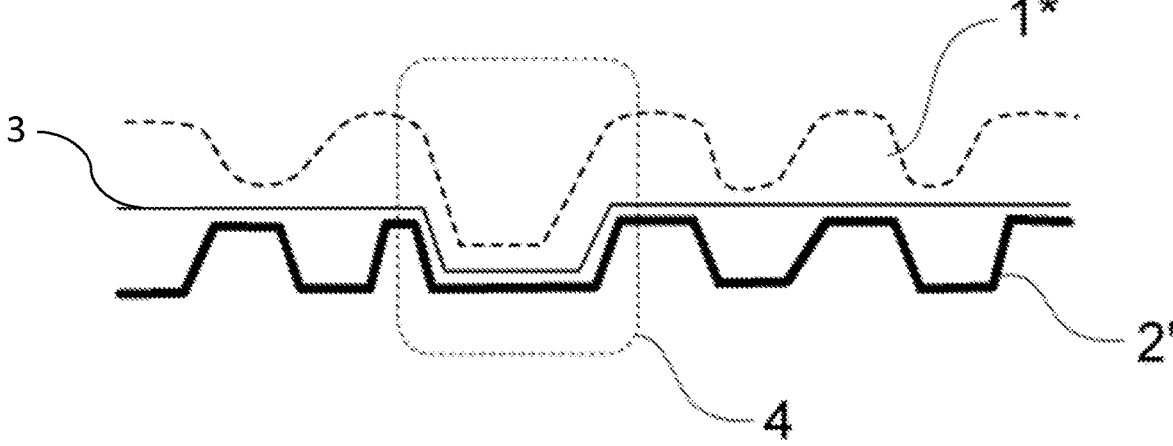

The top ply 1* of the embodiment of FIG. 7 is a structured paper ply made of TAD, UCTAD, eTAD, Atmos, or NTT (an example of a "second ply"). It was embossed using a non-heated embossing roll. The middle ply 3 of FIG. 3 is a ply made of Conventional Wet Press (CWP) paper and it was not pre-embossed (prior to the final ply-bonding). The bottom ply 2' of the embodiment of FIG. 7 is a ply made of Conventional Wet Press (CWP) paper (an example of a "first ply"). It was embossed using a heated embossing roll heated to a temperature in the range of 80° C. to 170°. It is illustrated with a thickened line, in order to illustrate that it has been heat-embossed.

Figure 8:
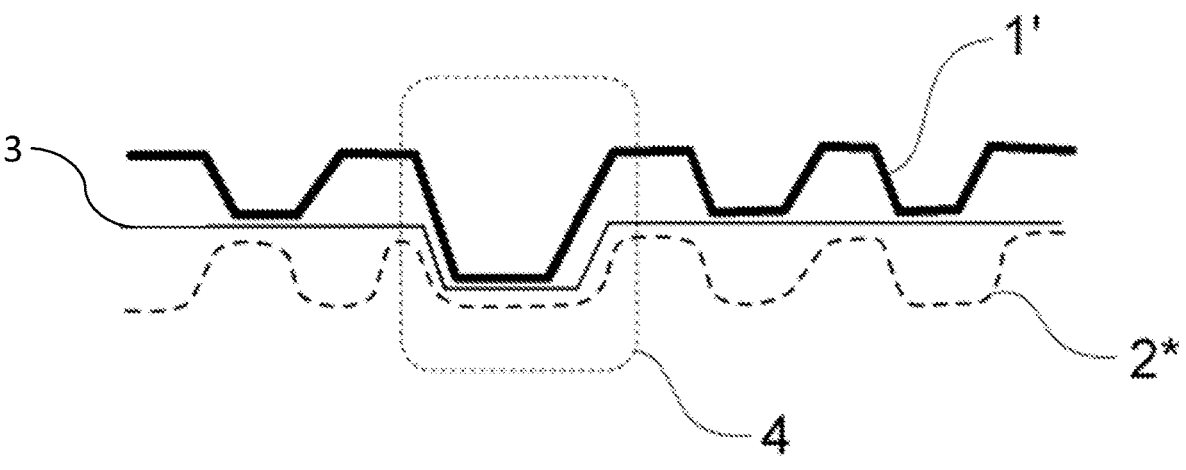

The top ply 1' of the embodiment of FIG. 8 is a ply made of Conventional Wet Press (CWP) paper. It was double-height embossed (i.e., embossed to form embossments of two different heights) using a heated embossing roll heated to a temperature in the range of 80° C. to 170°. It is illustrated with a thickened line, in order to illustrate that it has been heat-embossed. The middle ply 7 of FIG. 8 is a ply made of Conventional Wet Press (CWP) paper and it was not pre-embossed (prior to the final ply-bonding). The bottom ply 2* of the embodiment of FIG. 8 is a structured paper ply made of TAD, UCTAD, eTAD, Atmos, or NTT. It was either not embossed (not pre-embossed) or embossed using a non-heated embossing roll.

Figure 9:
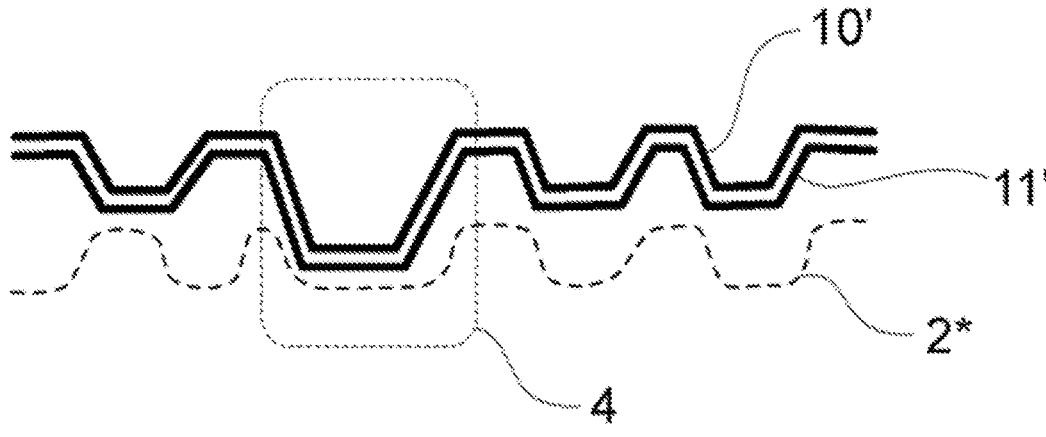

In the case of the embodiment of FIG. 9, the top ply 10' and the neighboring ply 11' are both made of Conventional Wet Press (CWP) paper and have been double-height heat-embossed together using an embossing roll heated to a temperature in the range of 80° C. to 170°. The bottom ply 2* of FIG. 9 is a structured paper ply made of TAD, UCTAD, eTAD, Atmos, or NTT. It was either not embossed (not pre-embossed) or embossed using a non-heated embossing roll.

Figure 10:
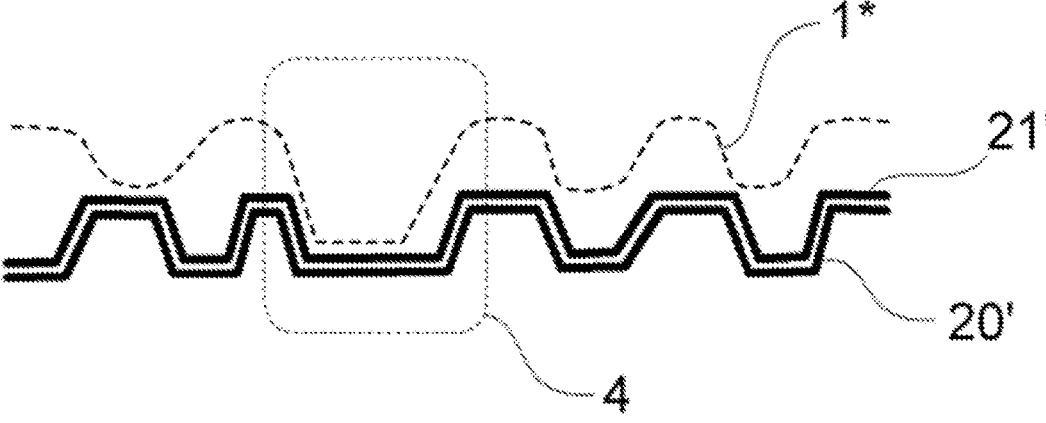

The embodiment of FIG. 10 differs from the one of FIG. 9 in that the top ply 1* is a structured paper ply made of TAD, UCTAD, eTAD, Atmos, or NTT, that was embossed using a non-heated embossing roll, and that the bottom ply 20' and the neighboring ply 21' are made of Conventional Wet Press (CWP) paper and have been double-height heat-embossed together using an embossing roll heated to a temperature in the range of 80° C. to 170°.

The grammage of each of the tissue paper products of FIGS. 7, 9, 9, and 10 is in a range of 34 to 65 g/m².

FIGS. 11-27 depict embodiments of a tissue paper product with four plies.

Figure 11:
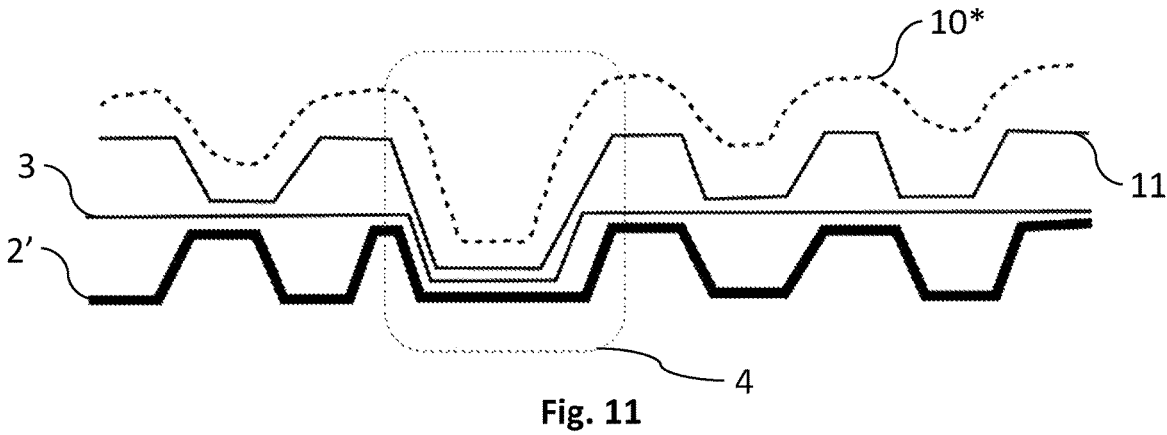

The top ply 10* (a second ply in the sense of the appended claims) of the embodiment of FIG. 11 is a structured paper ply made of TAD, UCTAD, eTAD, Atmos, or NTT. The bottom ply 2' (a first ply in the sense of the appended claims) as well as the inner plies 3 (a third ply) and 10 (a fourth ply) of the embodiment of FIG. 14 are plies made of CWP.

The top ply 10* has been double-embossed (with two types of embossments) together with the inner ply 11, using a non-heated embossing roll. The third ply 3 is a flat middle ply in the sense of not having been pre-embossed prior to the final ply-bonding. Finally, the bottom ply 2' of the embodiment of FIG. 11 has been embossed by a heated embossing roll (i.e., heat-embossed).

Figure 12:
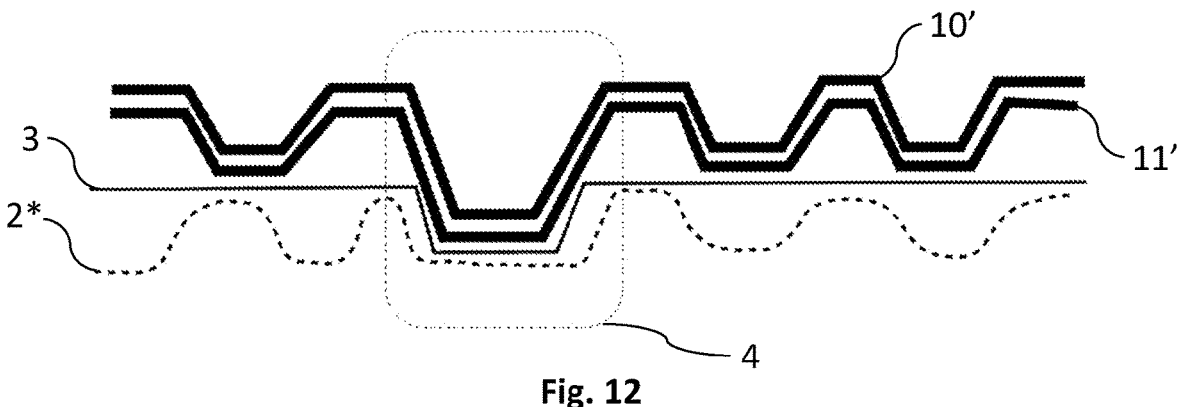

The embodiment of FIG. 12 differs from the one of FIG. 11 in that the top ply 10' (a first ply in the sense of the appended claims) and the adjacent third ply 11' have been double-height embossed together with a heated embossing roll, whereas the bottom ply 2* (s second ply in the sense of the appended claims) was embossed with a non-heated embossing roll. The bottom ply 2* is a structured paper ply made of TAD, UCTAD, eTAD, Atmos, or NTT. The inner fourth ply 3 has not been embossed prior to final ply-bonding and is made of CWP.

Figure 13:
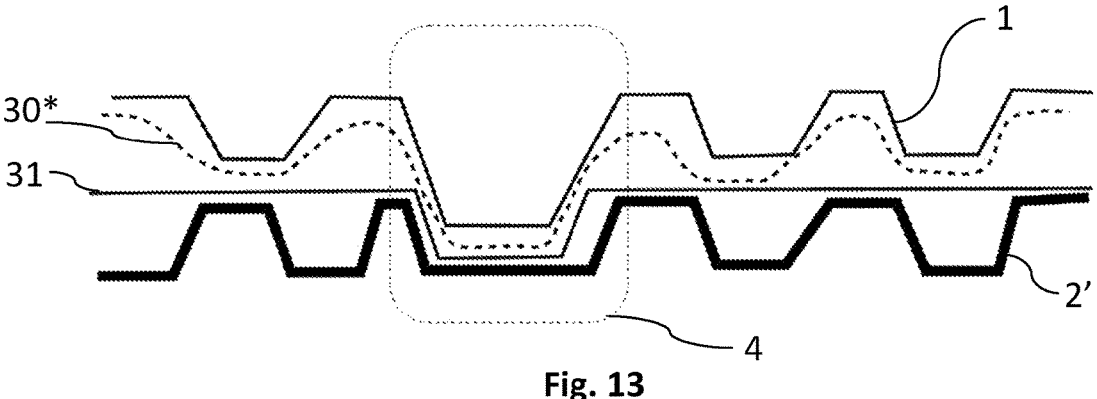
Figure 14:
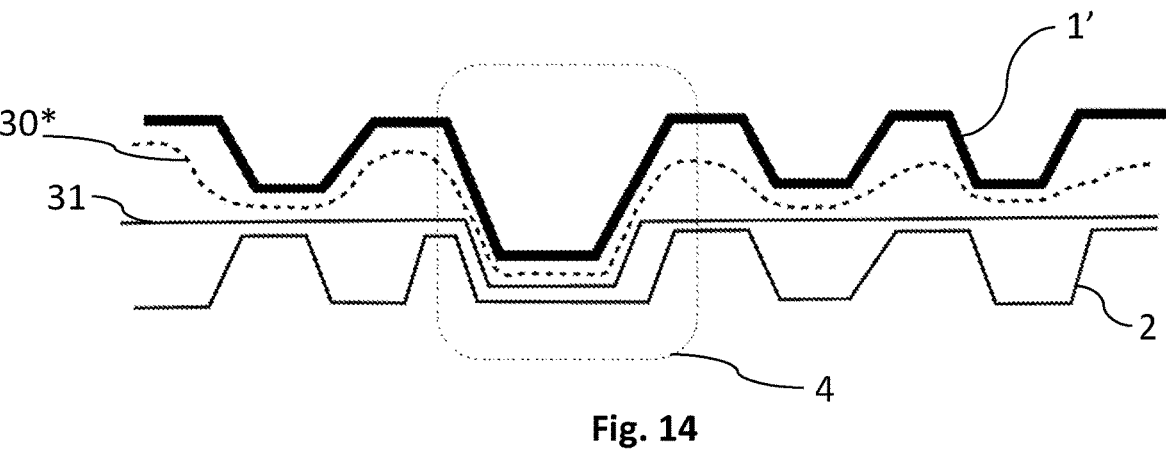
Figure 15:
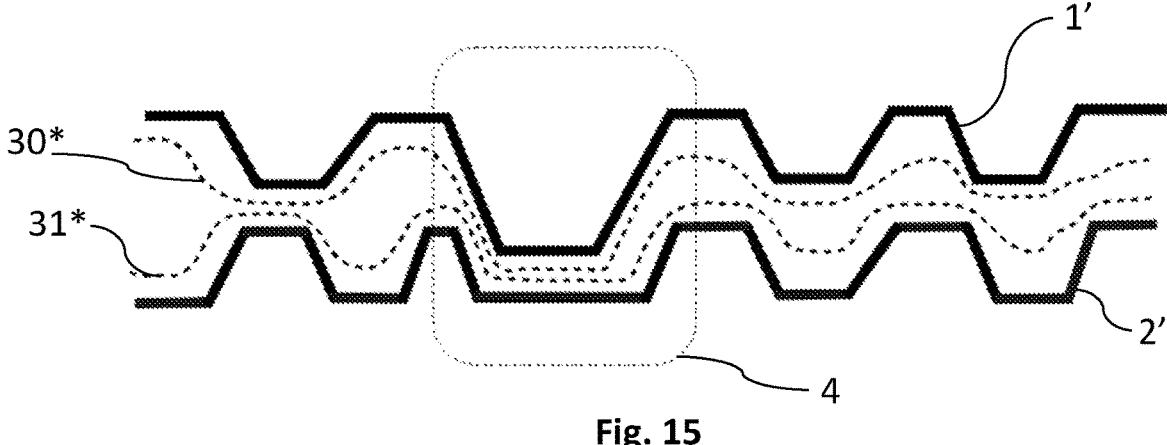

FIGS. 13, 14, and 15 show further embodiments of tissue paper products with four plies. The difference with respect to the ones of FIGS. 11 and 12, is that the two middle plies 30* and 31 were in each case not embossed (i.e., they are flat plies in the sense of not having been pre-embossed prior to the final ply-bonding).

The embodiment of FIG. 13 has a first ply 1 made of CWP that was double-embossed using a non-heated embossing roll and a second ply 2' (made of CWP) that was heat-embossed with a heated embossing roll. The third ply 30* is a structured paper ply made of TAD, UCTAD, eTAD, Atmos, or NTT, and the fourth ply 31 is in the case of the embodiment of FIG. 13 made of CWP.

The embodiment of FIG. 14 has a first ply 1' (made of CWP) that was double-embossed using a heated embossing roll (heat-embossed) and a second ply 2 (made of CWP) that was embossed with a non-heated embossing roll. Also in the case of the embodiment of FIG. 14, the third ply 30* is a structured paper ply made of TAD, UCTAD, eTAD, Atmos, or NTT, and the fourth ply 31 is made of CWP.

The embodiment of FIG. 15 comprises both a first ply 1' (top ply) that was double-embossed using a heated embossing roll (heat-embossed) as well as a second ply 2' (bottom ply) that was heat-embossed with a heated embossing roll. Both middle plies 30* and 31* are structured paper plies made of TAD, UCTAD, eTAD, Atmos, or NTT. Both of them have not been embossed prior to final ply-bonding.

Figure 16:
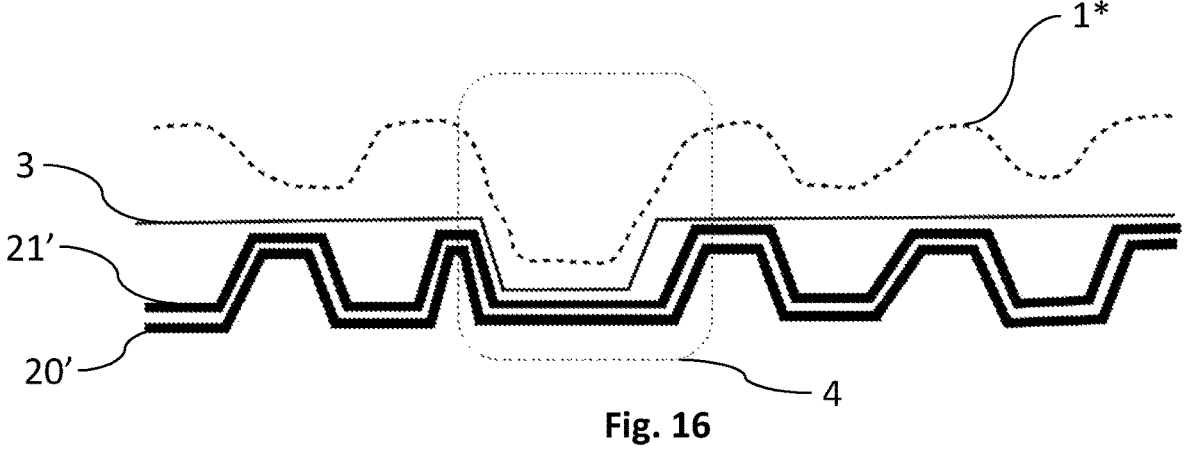
Figures 17, 18, 19:
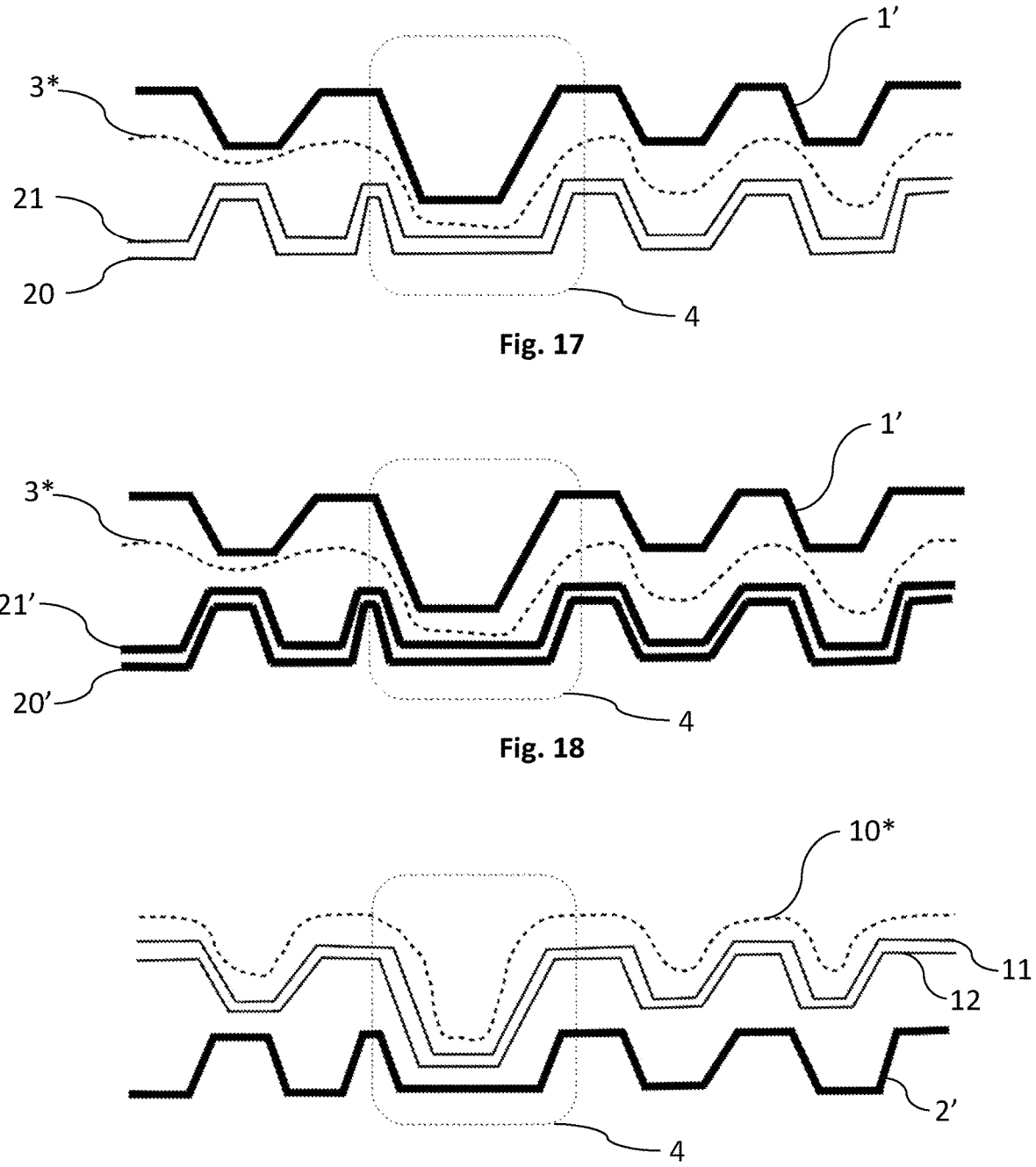

The embodiments of FIGS. 16, 17, and 18 comprise a first ply 1* (which is in the case of the embodiment of FIG. 16 a structured paper ply made of TAD, UCTAD, eTAD, Atmos, or NTT)/1' (which is in the case of the embodiments of FIGS. 17 and 18 a CWP ply that has been heat-embossed), a flat middle ply 3 (which is in the case of the embodiment of FIG. 16 a CWP ply), 3* (which is in the case of the embodiments of FIGS. 17 and 18 a structured paper ply made of TAD, UCTAD, eTAD, Atmos, or NTT), and a second ply 20, 20' that was embossed together with another ply 21, 21,'.

Figure 20:
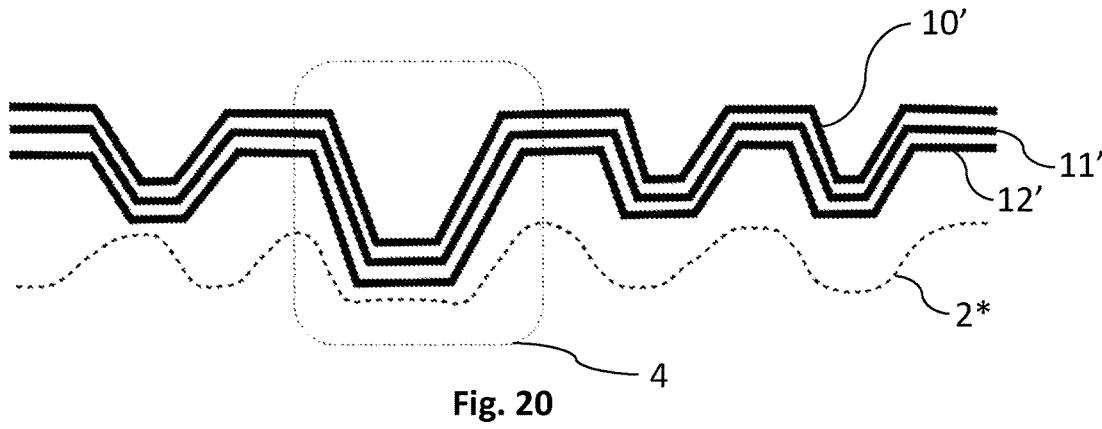

In the case of the embodiments of FIGS. 16 and 18, the second ply 20' and the third ply 21' are CWP plies that were heat-embossed. In the case of the embodiment of FIG. 17, the second ply 20 and the third ply 21 are CWP plies that have been embossed with a non-heated embossing roll FIGS. 19 and 20 show further embodiments of tissue paper products comprising a total of our plies. In each case, three of the plies were embossed together.

The top ply 10* of the embodiment of FIG. 19 (a structured ply made of TAD, UCTAD, eTAD, Atmos, or NTT) and the two adjacent plies 11 and 12 (both of which are CWP plies) of the embodiment of FIG. 19 were double-embossed together using a non-heated embossing roll. The bottom ply 2' (the bottom ply) was embossed using a heated embossing roll (i.e., heat-embossed).

The first ply 10' and the two adjacent plies 11' and 12' (all three of which are CWP plies) of the embodiment of FIG. 20 were double-embossed together using a heated embossing roll (heat-embossed). The second ply 2* (a structured paper ply made of TAD, UCTAD, eTAD, Atmos, or NTT) was embossed using a non-heated embossing roll.

Figure 21:
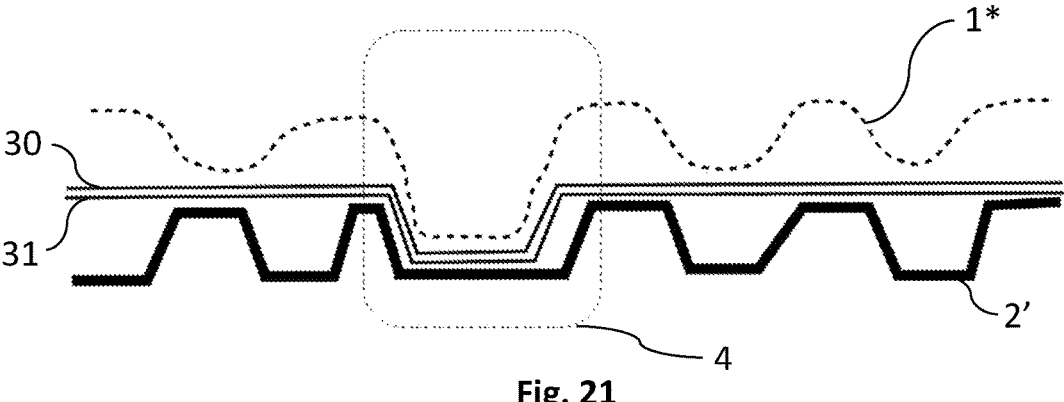

FIG. 21 shows an embodiment of a tissue paper product comprising four plies, wherein the top ply 1* is a structured paper ply made of TAD, UCTAD, eTAD, Atmos, or NTT that has been double-embossed (i.e., embossed with two embossing heights using a non-heated embossing roll). The two middle plies 30 and 31 are made of CWP and are flat plies (i.e., they have not been embossed prior to the final ply-bonding). Moreover, the bottom ply 2"(a first ply in the sense of the appended claims) is made of CWP and has been heat-embossed using a heated embossing roll.

Figure 22:
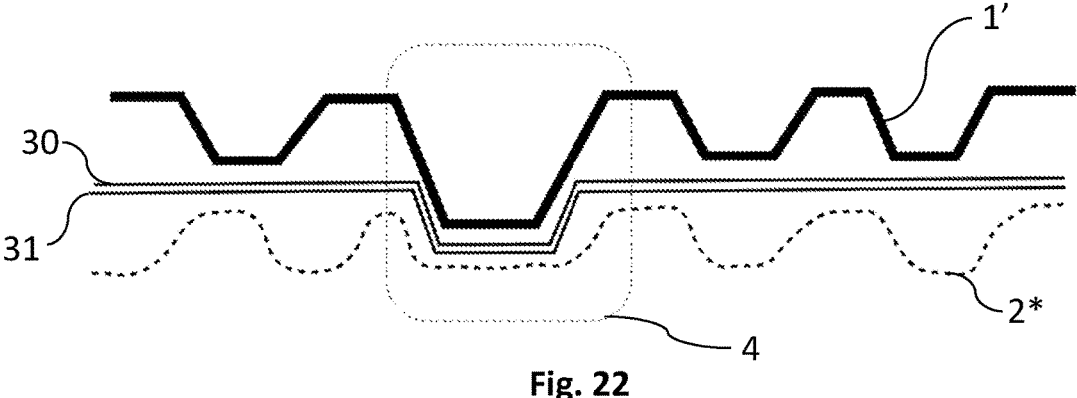

FIG. 22 shows an embodiment of a tissue paper product comprising four plies, wherein the bottom ply 2* is a structured paper ply made of TAD, UCTAD, eTAD, Atmos, or NTT that has been embossed using a non-heated embossing roll). The two middle plies 30 and 31 are made of CWP and are flat plies (i.e., they have not been embossed prior to the final ply-bonding). Moreover, the top ply 1" (a first ply in the sense of the appended claims) is made of CWP and has been heat-embossed using a heated embossing roll.

Figure 23:
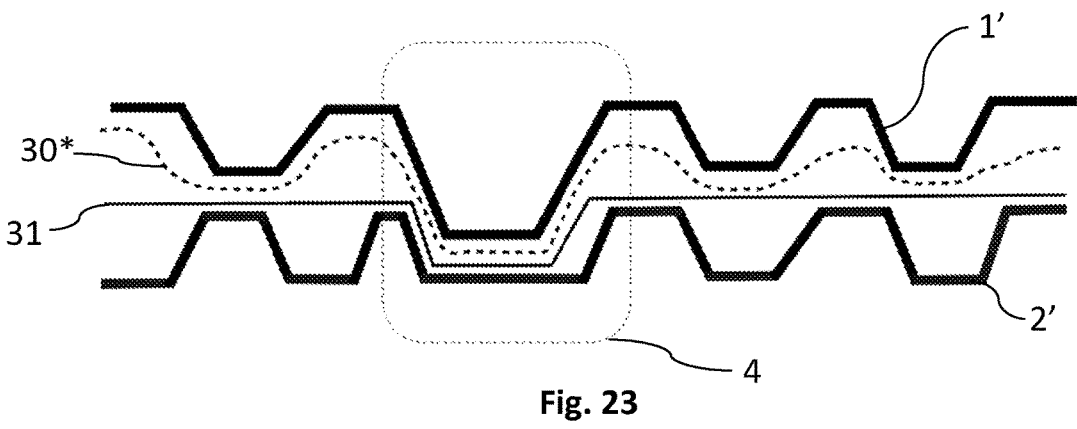

FIG. 23 shows an embodiment of a tissue paper product comprising four plies, wherein the top ply 1" as well as the bottom ply 2' are plies made of CWP that have been heat-embossed using a heated embossing roll. One of the two middle plies 30* is a structured paper ply made of TAD, UCTAD, eTAD, Atmos, or NTT, and the other middle ply 31 is in the case of this embodiment made of CWP. The two middle plies 30* and 31 are flat plies (i.e., they have not been embossed prior to the final ply-bonding).

Figure 24:
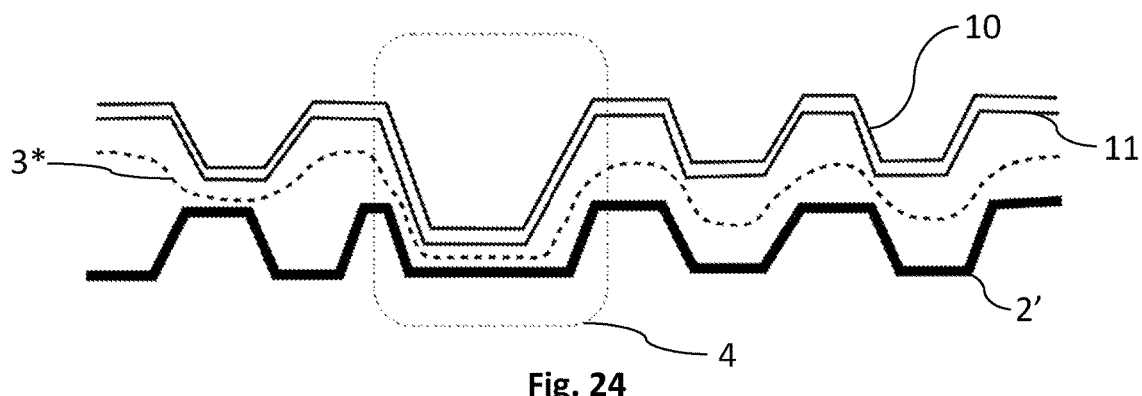

FIG. 24 shows an embodiment of a tissue paper product comprising four plies, wherein the top ply 10 and the adjacent ply 11 are CWP plies that have been double-embossed together (i.e., embossed together to form embossments of two different heights) using a non-heated embossing roll. The middle ply 3* is a structured paper ply made of TAD, UCTAD, eTAD, Atmos, or NTT that has not been embossed. The bottom ply 2'(a first ply in the sense of the appended claims) is made of CWP and has been heat-embossed using a heated embossing roll.

Figure 25:
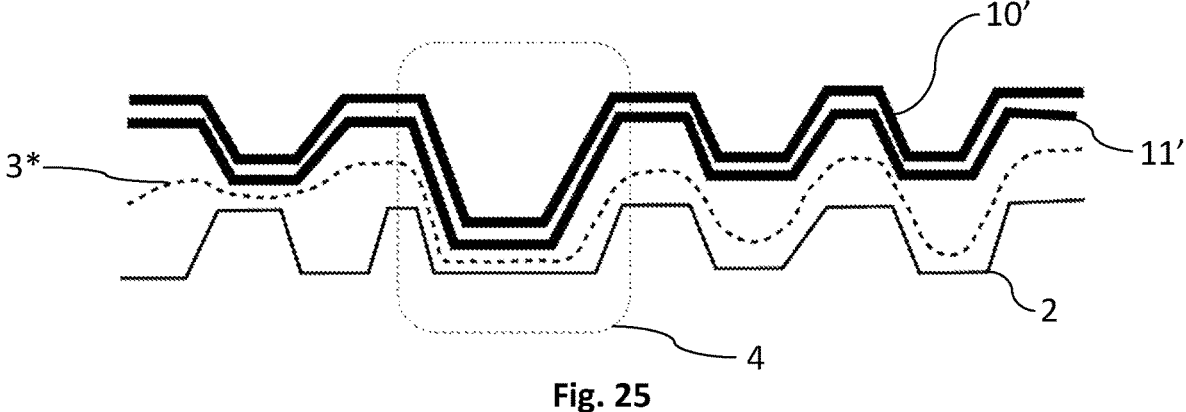

FIG. 25 shows an embodiment of a tissue paper product comprising four plies, wherein the top ply 10' (an example of a first ply in the sense of the appended claims) and the adjacent ply 11' are CWP plies that have been double-heat-embossed together (i.e., embossed together to form embossments of two different heights) using a heated embossing roll. The middle ply 3* (a "second ply") is a structured paper ply made of TAD, UCTAD, eTAD, Atmos, or NTT that has not been embossed. The bottom ply 2 is made of CWP and has been embossed using a non-heated embossing roll.

Figures 26, 27:
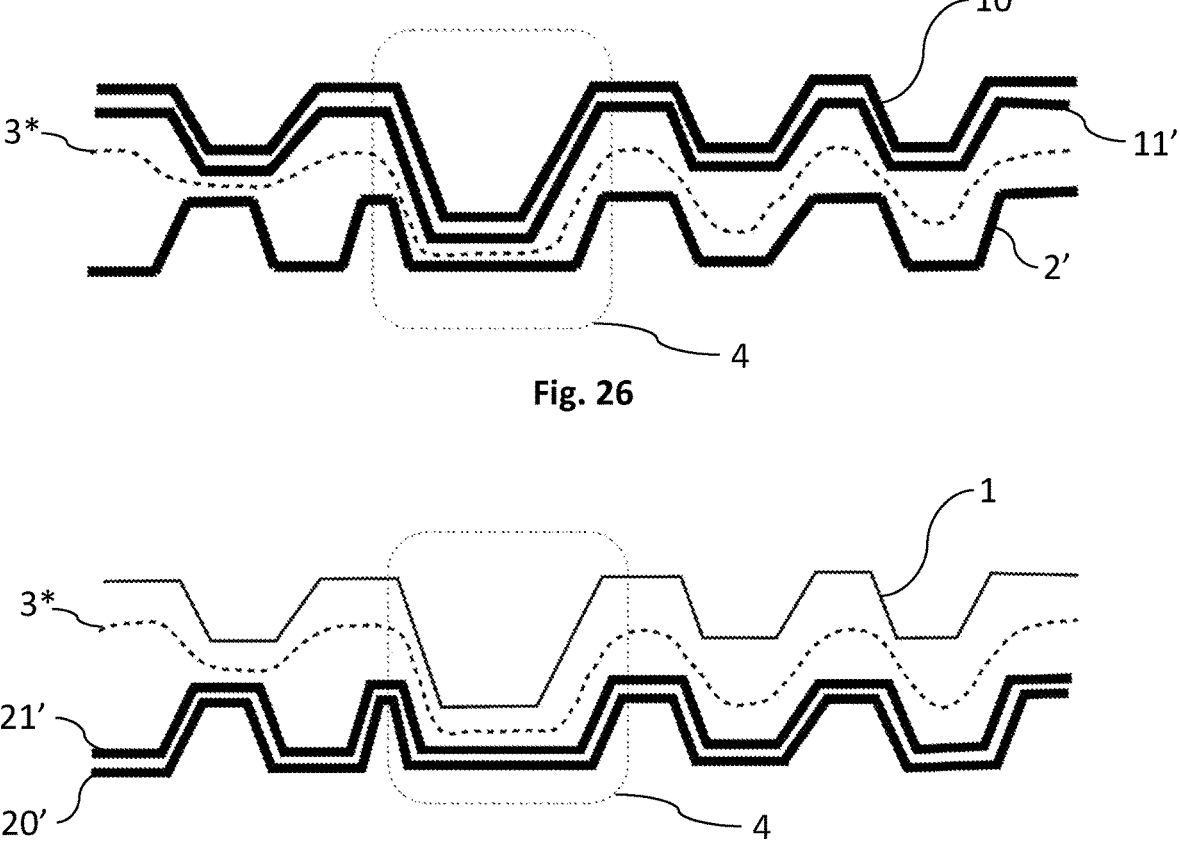

FIG. 26 shows an embodiment of a tissue paper product comprising four plies, wherein the top ply 10' and the adjacent ply 11' are CWP plies that have been double-heat-embossed together (i.e., embossed together to form embossments of two different heights) using a heated embossing roll. The middle ply 3* is a structured paper ply made of TAD, UCTAD, eTAD, Atmos, or NTT that has not been embossed. The bottom ply 2' is made of CWP and has been heat-embossed using a heated embossing roll.

FIG. 27 shows an embodiment of a tissue paper product comprising four plies, wherein the top ply 1 is a CWP ply that has been double-embossed (forming embossments of two different heights) using a non-heated embossing roll. The middle ply 3* is a structured paper ply made of TAD, UCTAD, eTAD, Atmos, or NTT that has not been embossed. The bottom ply 20'(a first ply in the sense of the appended claims) as well as the adjacent inner ply 21" are made of CWP and have been heat-embossed together using a heated embossing roll.

The grammage of the tissue paper products of FIGS. 11 to 27 is in a range of 55 g/m$^2$ to 95 g/m$^2$, and, more specifically, it may even be in a range of 60 g/m$^2$ to 80 g/m$^2$.

Figure 28:
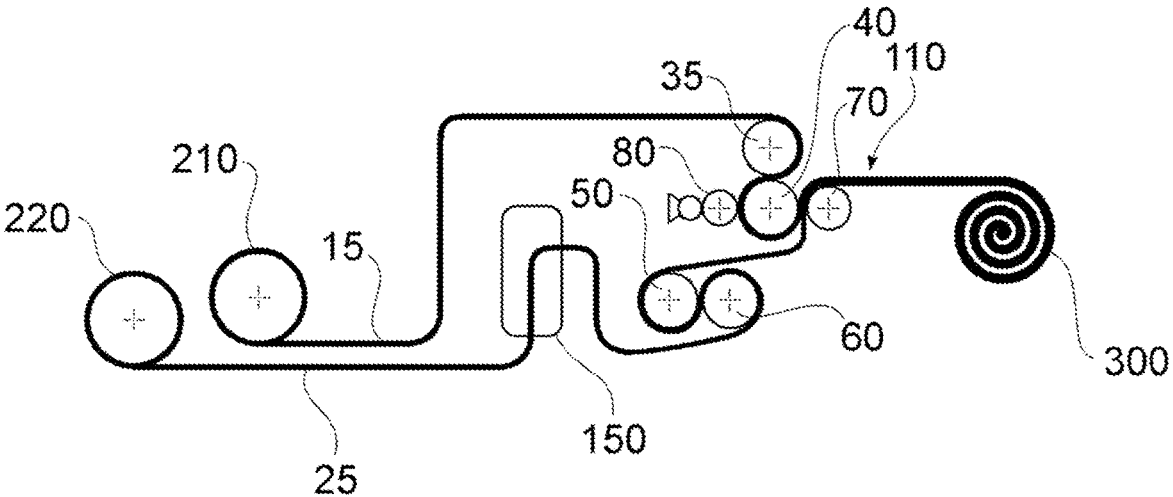
FIG. 28 is a schematic representation of (a part of) an embodiment of a manufacturing apparatus for manufacturing a tissue paper product in accordance with the present disclosure with an embodiment of a method in accordance with the present disclosure.

FIG. 28 is a schematic representation of (a part of) and embodiment of a manufacturing apparatus for manufacturing further tissue paper products in accordance with the present disclosure using an embodiment of a method in accordance with the present disclosure. In the following, it will be described how the first embodiment of the method is carried out using the apparatus illustrated in FIG. 28.

A first ply 15, being a structured paper ply made of TAD, UCTAD, eTAD, Atmos, or NTT, is provided. It is unwound from a first unwinding roll 210. A second ply 25 made of Conventional Wet Press (CWP) paper is provided. It is unwound from a second unwinding roll 220.

The CWP paper ply 25 is moistened in a wetting unit 150 with water and then heat-embossed between an embossing roll 50 and a counter roll 60. The heatable embossing roll 50 is heated to a steady-state temperature in the range of 80° C. to 170° C.

The TAD paper ply 15 is embossed between a non-heatable embossing roll 40 and a counter roll 35. It is also provided with adhesive using a transfer roll 80.

The structured (TAD) ply 15 and the heat-embossed ply 25 are then ply-bonded between the embossing roll 40 and a marrying roll 70. The two-ply tissue paper product 110 is then wound-up on the winding roll 300.

Figure 29:
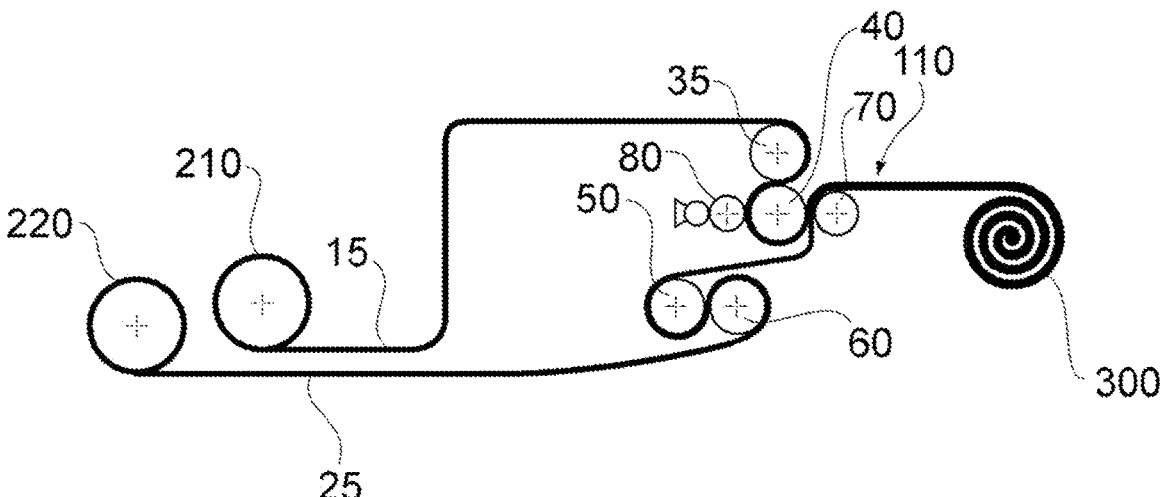
FIG. 29 is a schematic representation of (a part of) and embodiment of a manufacturing apparatus for manufacturing a tissue paper product in accordance with the present disclosure with an embodiment of a method in accordance with the present disclosure.

The only difference between the apparatus of FIG. 28 and the one of FIG. 29, is that the one of FIG. 29 does not comprise a wetting unit. In other words, the CWP ply 25 is, in the case of using the apparatus of FIG. 29, not pre-moistened prior to the heat-embossing step been carried out between the heatable roll 50 and the counter roll 60.

Tissue paper products manufactured using the apparatus of FIG. 28 or FIG. 29 have a high absorption capacity, a large thickness (as compared to conventional products with a similar strength), and a high (tensile) strength (as compared to conventional products with a similar thickness). Specifically, the tissue paper products have a good wetness shape memory, i.e., the embossments disappear less than in comparable conventional products when the product has been wet.

In the following, a number of experimental results obtained on the basis of coreless rolls according to an embodiment of the present disclosure will be discussed.

Examples of Coreless Rolls Made of Two-Ply Tissue Product

Coreless rolls of a tissue paper product with two plies comprising one structured ply (TAD) and one CWP ply were manufactured (using a manufacturing apparatus of the type shown in FIG. 2 or 3). An outer diameter of the coreless rolls was 115 mm. In particular, examples in accordance with the present disclosure were manufactured, wherein the CWP ply was heat-embossed using a heated embossing roll, and comparative examples were manufactured, wherein the CWP ply was embossed with a non-heated embossing roll. Moreover, further comparative examples were manufactured using two TAD plies.

During a first set of trials, a TAD ply having a grammage of 20 g was used as a top ply, and a CWP ply having a grammage of 20 g was used as a bottom ply, both for manufacturing coreless rolls in accordance with the present disclosure, as well as for manufacturing comparative coreless rolls without relying on heat-embossing. Moreover, further comparative examples were manufactured using two TAD plies (with a grammage of 20 g each).

The following table 1 summarizes the results of the first set of trials. It includes data on two examples (examples 1 and 2) manufactured using the heated embossing roll, and four examples (comparative examples 1-4) manufactured using a non-heated embossing roll and using one CWP ply and one TAD ply, as well as three examples (comparative examples 5-7) manufactured using a non-heated embossing roll and two TAD plies. Table 1 indicates the values of the grammage (the units gsm stands for g/m$^2$), the density of the roll, the caliper ratio of the manufactured coreless roll, the main directional tensile strength ("MD Tensile"), the cross directional tensile strength ("CD Tensile"), the geometrical mean tensile strength ("GMT"), the theoretical caliper ("ct"), and the radial compression strength.

average, considerably lower than the roll densities of the comparative examples. This means that less material suffices to manufacture robust coreless rolls that can withstand handling and storage, and the manufacturing costs can, hence, be lowered.

TABLE 1

| Example | Grammage (gsm) | Roll density (kg/m3) | Caliper ratio | Thickness (mm) | MD Tensile | CD Tensile | GMT | Theoretical caliper ct (mm) | Radial compression strength (N) |
|---|---|---|---|---|---|---|---|---|---|
| 1 | 38.6 | 121 | 32% | 0..42 | 202 | 111 | 150 | 0.32 | 35 |
| 2 | 38.5 | 95 | 33% | 0.54 | 187 | 102 | 138 | 0.41 | 38 |
| Comp. 1 | 38.7 | 153 | 34% | 0.34 | 201 | 109 | 148 | 0.25 | 29 |
| Comp. 2 | 38.8 | 166 | 33% | 0.31 | 202 | 112 | 151 | 0.23 | 35 |
| Comp. 3 | 38.4 | 140 | 35% | 0.37 | 190 | 110 | 144 | 0.27 | 28 |
| Comp. 4 | 38.4 | 137 | 32% | 0.37 | 195 | 107 | 144 | 0.28 | 29 |
| Comp. 5 | 38.9 | 138 | 31% | 0.37 | 255 | 169 | 208 | 0.28 | 35 |
| Comp. 6 | 39.5 | 150 | 36% | 0.36 | 285 | 185 | 229 | 0.26 | 45 |
| Comp. 7 | 38.7 | 125 | 29% | 0.40 | 263 | 170 | 212 | 0.31 | 27 |

As can be seen from table 1, the caliper ratios of the examples in accordance with the present disclosure are comparable to those of the comparative examples (manufactured without relying on heat-embossing). However, the roll densities of the examples are considerably lower than the roll densities of the comparative examples 1-4 (manufacturing using one CWP ply and one TAD ply). This means that less material suffices to manufacture robust coreless rolls that can withstand handling and storage, and the manufacturing costs can, hence, be lowered. The roll densities even tend to be lower than the ones of the comparative products 5-7 (manufactured using two TAD plies). Thus, the replacement of a TAD ply with a CWP ply (which lowers the manufacturing costs) is possible, while even promoting technical benefits of the coreless rolls. The radial compression strength of the products in accordance with the present disclosure is high.

During a second set of trials, a TAD ply having a grammage of 20 g was used as a top ply, and a CWP ply having a grammage of 15 g was used as a bottom ply. Table 2 summarizes the results of the second set of trials. It includes data on three examples (examples 1, 2, and 3) manufactured using the heated embossing roll, and two examples (comparative examples 1 and 2) manufactured using a non-heated embossing roll.

Examples of Coreless Rolls Made of Three-Ply Tissue Product

Coreless rolls of a tissue paper product with three plies comprising one structured ply (TAD) and two CWP plies were manufactured (using a manufacturing apparatus of the type shown in FIG. 4). An outer diameter of the coreless rolls was 133 mm. In particular, examples in accordance with the present disclosure were manufactured, wherein one of the CWP plies (the bottom ply in the tissue paper product) was heat-embossed using a heated embossing roll, and comparative examples were manufactured, wherein the bottom CWP ply was embossed with a non-heated embossing roll.

During a first set of trials, a TAD ply having a grammage of 19.5 g was used as a top ply, a CWP ply having a grammage of 15.4 g was used as a middle ply, and a CWP ply having a grammage of 20 g was used as a bottom ply, both to manufacture products in accordance with the present disclosure, as well as comparative products with the same type of plies, but without using heat-embossing. Moreover, a comparative product was manufactured using one CWP ply with a grammage of 15.4 gsm and two TAD plies, each with a grammage of 19.5 gsm.

TABLE 2

| Example | Grammage (gsm) | Roll density (kg/m3) | Caliper ratio | Thickness (mm) | MD Tensile | CD Tensile | GMT | Theoretical caliper ct (mm) | Radial compression strength (N) |
|---|---|---|---|---|---|---|---|---|---|
| 1 | 33.5 | 103 | 35% | 0.44 | 237 | 110 | 161 | 0.33 | 48 |
| 2 | 38.8 | 95 | 35% | 0.48 | 209 | 106 | 149 | 0.36 | 48 |
| 3 | 33.3 | 118 | 31% | 0.37 | 257 | 119 | 175 | 0.28 | 30 |
| Comp. 1 | 34.8 | 141 | 34% | 0.33 | 271 | 122 | 182 | 0.25 | 28 |
| Comp. 2 | 34.0 | 116 | 12% | 0.33 | 247 | 116 | 169 | 0.29 | 23 |

As can be seen from table 2, the caliper ratios of the examples in accordance with the present disclosure are, with respect to one case, comparable to and, with respect to another case, higher than those of the comparative examples (manufactured without relying on heat-embossing). However, the roll densities of the examples are, at least on The following table 1 summarizes the results of the first set of trials. It includes data on five examples (examples 1, 2, 3, 4, and 5) manufactured using the heated embossing roll, and four comparative examples. Comparative example 1 was manufactured using one CWP ply with a grammage of 15.4 gsm and two TAD plies with grammages of 19.5 gsm each, and comparative products 2-4 were manufactured using one TAD ply with a grammage of 19.5 gsm, one CWP ply with a grammage of 15.4 gsm, and one CWP ply with a grammage of 20 gsm. All comparative examples 1-4 were manufactured using only non-heated embossing rolls. Table 1 indicates the values of the grammage (the units gsm stands for $g/m^2$), the density of the roll, the caliper ratio of the manufactured coreless roll, the main directional tensile strength ("MD Tensile"), the cross directional tensile strength ("CD Tensile"), the geometrical mean tensile strength ("GMT"), the theoretical caliper ("ct"), and the radial compression strength.

disclosure will be compared with conventional tissue paper products. The following embodiments have been manufactured using manufacturing apparatuses, as depicted in FIGS. 28 and 29.

In order to evaluate the performance of tissue paper products in accordance with the present disclosure (manufactured in accordance with a method in accordance with the present disclosure), several reference products were manufactured. The reference products were manufactured without using any heat-embossing, i.e., without embossing a ply using a heated embossing roll.

TABLE 1

| Example | Grammage (gsm) | Roll density (kg/m3) | Caliper ratio | Thickness (mm) | MD Tensile | CD Tensile | GMT | Theoretical caliper ct (mm) | Radial compression strength (N) |
|---|---|---|---|---|---|---|---|---|---|
| 1 | 54.6 | 132 | 41% | 0.52 | 263 | 159 | 204 | 0.41 | 41 |
| 2 | 53.7 | 119 | 45% | 0.55 | 250 | 157 | 198 | 0.45 | 37 |
| 3 | 54.2 | 121 | 45% | 0.55 | 246 | 165 | 201 | 0.45 | 36 |
| 4 | 54.1 | 99 | 55% | 0.66 | 241 | 144 | 187 | 0.55 | 35 |
| 5 | 53.4 | 94 | 57% | 0.69 | 234 | 148 | 186 | 0.57 | 36 |
| Comp. 1 | 55.1 | 137 | 40% | 0.49 | 347 | 182 | 251 | 0.40 | 39 |
| Comp. 2 | 55.3 | 134 | 41% | 0.49 | 257 | 152 | 198 | 0.41 | 34 |
| Comp. 3 | 55.2 | 146 | 38% | 0.47 | 263 | 158 | 204 | 0.38 | 42 |
| Comp. 4 | 53.7 | 120 | 45% | 0.52 | 247 | 157 | 197 | 0.45 | 31 |

As can be seen from table 1, the caliper ratios of the examples in accordance with the present disclosure are comparable to (or even higher than) those of the comparative examples (manufactured without relying on heat-embossing). However, the roll densities of the examples are, at least on average, considerably lower than the roll densities of the comparative examples 2-4. This means that less material suffices to manufacture robust coreless rolls that can withstand handling and storage, and the manufacturing costs can, hence, be lowered. The roll densities even tend to be lower than the one of the comparative product 1 (manufactured using two TAD plies). Thus, the replacement of a TAD ply with a CWP ply (which lowers the manufacturing costs) is possible, while even promoting technical benefits of the coreless rolls.

During a second set of trials, a TAD ply having a grammage of 20 g was used as a top ply, a CWP ply having a grammage of 22 g was used as a middle ply, and a CWP ply having a grammage of 22 g was used as a bottom ply. Table 2 summarizes the results of the second set of trials. It includes data on four examples (examples 1, 2, 3, and 4) manufactured using the heated embossing roll.

Reference Products A (Two TAD Plies)

A first reference product ("reference A") consisted of two structured TAD plies. Both structured paper plies made of TAD were provided with a grammage of about 20 $g/m^2$. The top ply was embossed with a single height embossing design, and the bottom ply was not embossed. Lamination glue was applied to the top ply, and the two plies were then ply-bonded to manufacture a two-ply product.

The embossing pressure used when embossing the top ply was adjusted such that the embossing design was visible on the top ply.

Reference Product B1 (Two CWP Plies)

A second reference product ("reference B1") was manufactured with two CWP plies. Both CWP plies were provided with a grammage of about 20 $g/m^2$. The top ply was embossed with a double height embossing design comprising some micro-embossing dots. Glue was applied to the top ply at tips of the embossments with the larger height. The bottom ply was embossed with a micro-embossing design

TABLE 2

| Example | Grammage (gsm) | Roll density (kg/m3) | Caliper ratio | Thickness (mm) | MD Tensile | CD Tensile | GMT | Theoretical caliper ct (mm) | Radial compression strength (N) |
|---|---|---|---|---|---|---|---|---|---|
| 1 | 61.4 | 133 | 46% | 0.57 | 386 | 175 | 260 | 0.46 | 49 |
| 2 | 61.2 | 131 | 47% | 0.56 | 385 | 173 | 258 | 0.47 | 46 |
| 3 | 60.7 | 134 | 45% | 0.56 | 384 | 155 | 244 | 0.45 | 39 |
| 4 | 60.2 | 132 | 45% | 0.57 | 373 | 172 | 254 | 0.45 | 44 |

Also table 2 reveals desirably low roll densities, while the caliper ratio remains high (comparatively high as in the cases of the products of table 1).

Experimental Results on Further Tissue Paper Products

In the following, further experimental examples of embodiments (examples) in accordance with the present having around 80 dots/$cm^2$. Finally, the two plies were ply-bonded together with a marrying roll.

The CWP paper used for reference product was selected such that the softness level was similar to that of the TAD ply used for reference product A.

The embossing pressure between the rubber rollers and the embossing rollers was adjusted to achieve a product thickness of about 0.41 mm.

Reference Product B2 (Two CWP Plies)

Reference product B2 was manufactured almost identically to reference product B1. The difference is that the embossing pressures were adjusted in order to achieve the same product thickness as in the case of reference product A, i.e., a thickness of 0.45 mm.

Reference Product C1 (CWP ply+TAD ply)

Reference product C1 was manufactured with a top ply being a CWP ply with a grammage of around 20 $g/m^2$ and a bottom ply being a TAD ply with a grammage of around 20 $g/m^2$. The top ply was embossed (with a non-heated embossing roll), while the bottom ply was not embossed. The embossing pressure of the top ply was adjusted so that the product thickness was about the same as the one of reference product A.

Reference Product C2 (CWP ply+TAD ply)

Reference product C1 was manufactured with a top ply being a TAD ply with a grammage of around 20 $g/m^2$ and a bottom ply being a CWP ply with a grammage of around 20 $g/m^2$. The top ply and the bottom ply were both embossed (with non-heated embossing rolls). The bottom ply was embossed with a micro-embossing design having around 80 $dots/cm^2$.

The embossing pressure for embossing the top ply was adjusted so that the embossing design was visible on the top ply. The embossing pressure for the bottom ply was adjusted such that the reference product C2 had about the same thickness as reference product A.

The following table summarizes measurement results for the basis weight (grammage), the thickness, the main directional tensile strength (MDT), the cross directional tensile strength (CDT), the geometrical mean tensile strength (i.e., the square root of the product of the MDT and the CDT), the absorption capacity, and the softness of the various reference products.

using two CWP plies, due to embossing each of the plies with a design including micro-embossing dots. However, the tensile strength is much lower than for reference product A (−47% in terms of CDT and −29% in terms of GMT). The absorption and the softness of reference product B2 are also noticeably lower than for reference product A.

Reference product C1 has about the thickness and the softness of reference product A, but the CD tensile strength, GM tensile strength, and the absorption are significantly lower than the ones of reference product A. Reference product C1 has a larger CD tensile strength and GM tensile strength, as well as higher absorption and softness as compared to reference product B2.

The top surface of reference product C2 is the same as the one of reference product A (a TAD ply as a top ply), but it nevertheless has a lower overall tensile strength than reference product C1.

For comparison to the reference products, the following products in accordance with the present disclosure were manufactured: exemplary products D1, D2, and D3 were manufactured including a step of moistening the bottom ply prior to embossing. The exemplary products D4, D5, and D6 were manufactured without any pre-moistening.

Exemplary Product D1 (TAD Ply+Wet Heat-Embossed CWP Ply)

Exemplary product was manufactured using a TAD ply with a grammage of around 20 $g/m^2$ as a top ply and a CWP ply of around 20 $g/m^2$ as a bottom ply. The top ply was embossed with a non-heated embossing roll.

The embossing pressure used for the top ply was adjusted such that the embossing design was visible on the top ply.

The bottom CWP ply was pre-moistened spraying some water onto it, using a rotor spraying system. The amount of water added to the bottom ply was around 1.2 $g/m^2$. The bottom ply was then heat-embossed by a heatable embossing roll to form a micro-embossing design with around 80 $dots/cm^2$. The embossing roll was heated to a steady-state temperature of around 150° C. While the manufacturing was running, the CWP ply was heated up to a temperature that was typically close to about 90° C.

| | Top ply paper | Bottom ply paper | Basis weight ($g/m^2$) | Thickness mm | MDT (N/m) | CDT (N/m) | geometrical mean tensile (N/m) | Absorption (g/g) | Softness |
|---|---|---|---|---|---|---|---|---|---|
| Reference A | TAD | TAD | 39.4 | 0.45 | 215 | 135 | 170 | 12.4 | 1.7 |
| Reference B1 | CWP | CWP | 39.2 | 0.41 | 213 | 77 | 128 | 8.4 | 1.6 |
| Reference B2 | CWP | CWP | 38.9 | 0.45 | 199 | 72 | 120 | 8.5 | 1.6 |
| Reference C1 | CWP | TAD | 39.4 | 0.45 | 195 | 113 | 149 | 11.5 | 1.7 |
| Reference C2 | TAD | CWP | 38.7 | 0.45 | 178 | 97 | 131 | 11.7 | 1.7 |

A comparison of the reference products shows that reference product B1 has only a slightly lower thickness (about 9% lower) as compared to the thickness of reference product A (as the structured ply lead to larger thickness), but the tensile strength (in particular, the CDT and the GM tensile strength) were significantly lower than for the reference product A. Also the softness of reference product B1 is lower than the softness of reference product A. Reference product A is, however, substantially more expensive to manufacture than reference product B1.

Reference product B2 is an example showing that the thickness of reference product A could be reached despite The embossing pressure for the bottom ply was adjusted to achieve a similar product thickness as for the reference product A.

Exemplary Product D2 (TAD Ply+Wet Heat-Embossed CWP Ply)

The embossing pressure for the top ply was adjusted such that the embossing design was visible on the top ply.

The embossing pressure for the bottom ply was adjusted such that the resulting product had about the same geometric mean tensile strength as the reference product C1.

Exemplary Product D3 (TAD ply+wet heat-embossed CWP ply)

The embossing pressure for the top ply was adjusted such that the embossing design was visible on the top ply.

The embossing pressure for the bottom ply was adjusted to the maximum supported by the embossing unit.

The following table summarizes measurement results for the basis weight (grammage), the thickness, the main directional tensile strength (MDT), the cross directional tensile strength (CDT), the geometrical mean tensile strength (i.e., the square root of the product of the MDT and the CDT), the absorption capacity, and the softness of the various reference products. The table also indicates the embossing load used for the step of heat-embossing the respective CWP plies.

| | Top ply paper | Bottom ply paper | Heated embossing load kg/cml | Basis weight (g/m²) | Thickness mm | MDT (N/m) | CDT (N/m) | geometrical mean tensile (N/m) | Absorption (g/g) | Softness |
|---|---|---|---|---|---|---|---|---|---|---|
| Example D1 | TAD | CWP | 22.0 | 38.5 | 0.46 | 214 | 107 | 151 | 11.4 | 1.7 |
| Example D2 | TAD | CWP | 31.0 | 37.8 | 0.51 | 208 | 101 | 145 | 12.2 | 1.7 |
| Example D3 | TAD | CWP | 42.0 | 37.6 | 0.54 | 197 | 93 | 135 | 12.8 | 1.7 |

Exemplary product D1 has about the same thickness as reference product C2, but a higher tensile strength (+20% in MDT, +10% in CDT and +15% in GMT). The absorption capacity and the softness are similar.

Compared to the reference product C1, exemplary product has a higher MD tensile strength (+10%), while the level of GM tensile strength, the absorption capacity, and the softness are similar.

Exemplary product D2 has a larger thickness, tensile strength, and absorption capacity as compared to reference product C2. Compared to reference product C1, the tensile strength and the softness appear to be similar, but the thickness and the absorption capacity are both larger. Compared to reference product A, exemplary product D2 has higher thickness (+13%), about the same absorption capacity and softness, and only tensile strength is lower than for comparative product A (with two TAD plies).

Exemplary product D3 achieves an even higher thickness than reference product A (+20%), while having comparable absorption capacity and softness.

It was thus found that the pre-moistening combined with the embossing using a heated embossing roll using one ply made of TAD and one ply made CWP allows to manufacture products with similar properties as comparative products made of two TAD plies, without relying on heat-embossing. However, the production costs of the exemplary products are lower.

Further exemplary products were made analogously as the exemplary products D1, D2, and D3, but leaving out the step of pre-moistening the CWP ply prior to the step of heat-embossing. In other words, the CWP ply was dry heat-embossed.

Exemplary Product D4 (TAD Ply+Dry Heat-Embossed CWP Ply)

Exemplary product D4 was manufactured exactly the same way as exemplary product D1, with the exception of omitting the step of moistening the CWP ply prior to the step of heat-embossing.

Exemplary Product D5 (TAD Ply+Dry Heat-Embossed CWP Ply)

Exemplary product D5 was manufactured exactly the same way as exemplary product D2, with the exception of omitting the step of moistening the CWP ply prior to the step of heat-embossing.

Exemplary Product D6 (TAD Ply+Dry Heat-Embossed CWP Ply)

Exemplary product D6 was manufactured exactly the same way as exemplary product D3, with the exception of omitting the step of moistening the CWP ply prior to the step of heat-embossing.

The following table shows the measurement results obtained for exemplary products D4, D5, and D6.

| | Top ply paper | Bottom ply paper | Heated embossing load kg/cml | Basis weight (g/m²) | Thickness mm | MDT (N/m) | CDT (N/m) | geometrical mean tensile (N/m) | Absorption (g/g) | Softness |
|---|---|---|---|---|---|---|---|---|---|---|
| Exemplary D4 | TAD | CWP | 22.0 | 39.2 | 0.46 | 193 | 107 | 144 | 11.6 | 1.7 |
| Exemplary D5 | TAD | CWP | 31.0 | 38.4 | 0.51 | 192 | 96 | 136 | 12.0 | 1.7 |
| Exemplary D6 | TAD | CWP | 42.0 | 38.1 | 0.54 | 198 | 94 | 136 | 12.5 | 1.7 |

Exemplary products D4, D5, and D6 have similar physical characteristics as the exemplary products D1 D2, and D3.

It will be apparent to those skilled in the art that various modifications and variations can be made in the disclosed devices and systems without departing from the scope of the disclosure. Other aspects of the disclosure will be apparent to those skilled in the art from consideration of the specification and practice of the features disclosed herein. It is intended that the specification and examples be considered as exemplary only. Many additional variations and modifications are possible and are understood to fall within the framework of the disclosure.

The invention claimed is:

1. A coreless roll of a tissue paper product, such as toilet paper, made of a spirally wound continuous web of tissue paper product having a first end and a second end, the web of tissue paper product being wound such as to define an axially extending inner hole centrally positioned relative to the coreless roll and such that the first end is located on the outer side of the coreless roll and the second end is located at the inner hole, wherein the tissue paper product comprises two plies, being a first ply and a second ply, the first ply and the second ply being ply-bonded, optionally using an adhesive such as lamination glue and/or mechanical bonding, such as edge embossing, to form the tissue paper product, and a grammage of the tissue paper product being in a range of 24 to 50 $g/m^2$, and wherein the first ply is made of Conventional Wet Press (CWP) paper, the second ply is a structured paper ply, such as a ply made of TAD, UCTAD, eTAD, Atmos, or NTT, and the first ply has been embossed with a heated embossing roll, the coreless roll has an outer diameter in the range of 95 to 150 mm, a diameter of the inner hole is in the range of 20 to 50 mm, and a density of the coreless roll is in a range of 80 to 150 $kg/m^3$, and a caliper ratio of the roll is in a range of 30% to 80%, the caliper ratio $(c_s-c_t)/c_t$ being obtained by dividing a difference between a standard caliper $c_s$ of the tissue paper product as defined by the standard ISO-12625-3:2014 and a theoretical caliper $c_t$ of the tissue paper product by the theoretical caliper $c_t$, and the theoretical caliper $c_t$ being defined as a ratio between a grammage of the tissue paper product and the density of the roll.

2. The coreless roll of a tissue paper product of claim 1, wherein the tissue paper product has a caliper of at least 0.35 mm, optionally at least 0.40 mm, or at least 0.45 mm.

3. The coreless roll of a tissue paper product of claim 1, the two plies being a first ply and a second ply, wherein the first ply comprises first embossments with a first height (h1), the first height (h1) being in a range of 0.2 mm to 2.0 mm, wherein the second ply comprises second embossments with a second height (h2), the second height (h2) being in a range of 0.2 mm to 2.0 mm, wherein the adhesive, such as lamination glue, is optionally applied to tips of the first embossments of the first ply and/or to tips of the second embossments of the second ply, and wherein the first ply optionally comprises third embossments with a third height (h3) smaller than the first height (h1) (h1>h3), the third height (h3) being in a range of 0.1 mm to 1.2 mm.

4. The coreless roll of a tissue paper product of claim 3, wherein the first embossments have been formed by the heated embossing roll and, optionally, the third embossments have been formed by the heated embossing roll, and/or wherein the second embossments have been formed by a second heated embossing roll, and/or wherein the third embossments have been formed by a third heated embossing roll, and/or wherein, optionally, the first ply has been moistened, prior to having been embossed, with an amount of liquid, such as water, in the range of 2% to 12% of the basis weight of the first ply, or optionally 4% to 10% of the basis weight of the first ply, wherein the liquid optionally is provided with one or several additives, or wherein the first ply has not been moistened with a liquid prior to having been embossed.

5. The coreless roll of a tissue paper product of claim 1, wherein a geometrical mean tensile strength of tissue paper product of the coreless roll lies in a range of 70 N/m to 210 N/m, optionally 90 N/m to 210 N/m, or 110 N/m to 210 N/m.

6. A coreless roll of a tissue paper product, such as toilet paper, made of a spirally wound continuous web of tissue paper product having a first end and a second end, the web of tissue paper product being wound such as to define an axially extending inner hole centrally positioned relative to the coreless roll and such that the first end is located on the outer side of the coreless roll and the second end is located at the inner hole, wherein the tissue paper product comprises three plies, the three plies being a first ply, a second ply, and a third ply, wherein the first ply is one of the outermost plies of the tissue paper product, and the three plies are ply-bonded, optionally using an adhesive such as lamination glue and/or mechanical bonding, such as edge embossing, to form the tissue paper product, and wherein the grammage of the tissue paper product is in a range of 34 $g/m^2$ to 65 $g/m^2$, optionally 40 $g/m^2$ to 63 $g/m^2$, or 45 $g/m^2$ to 60 $g/m^2$, and wherein the first ply is made of Conventional Wet Press (CWP) paper, the second ply is a structured paper ply, such as a ply made of TAD, UCTAD, eTAD, Atmos, or NTT, and the first ply has been embossed with a heated embossing roll, the coreless roll has an outer diameter in the range of 95 to 150 mm, a diameter of the inner hole is in the range of 20 to 50 mm, and a density of the coreless roll is in a range of 90 to 150 $kg/m^3$, and a caliper ratio of the roll is in a range of 20% to 60%, the caliper ratio $(c_s-c_t)/c_t$ being obtained by dividing a difference between a standard caliper $c_s$ of the tissue paper product as defined by the standard ISO-12625-3:2014 and a theoretical caliper $c_t$ of the tissue paper product by the theoretical caliper $c_t$, and the theoretical caliper $c_t$ being defined as a ratio between a grammage of the tissue paper product and the density of the roll.

7. The coreless roll of a tissue paper product of claim 6, wherein the tissue paper product has a caliper of at least 0.40 mm, optionally at least 0.45 mm, or at least 0.50 mm.

8. The coreless roll of a tissue paper product of claim 6, wherein the first ply comprises first embossments with a first height (h1), the first height (h1) being in a range of 0.2 mm to 2.0 mm, wherein the second ply comprises second embossments with a second height (h2), the second height (h2) being in a range of 0.2 mm to 2.0 mm, wherein the adhesive, such as lamination glue, is optionally applied to tips of the first embossments of the first ply and/or tips of the second embossments of the second ply, and wherein the first ply optionally comprises third embossments with a third height (h3) smaller than the first height (h1) (h1>h3), the third height (h3) being in a range of 0.1 mm to 1.2 mm.

9. The coreless roll of a tissue paper product of claim 8, wherein the third ply has not been embossed prior to ply-bonding, wherein the third ply is, optionally, only partially embossed at locations where it is ply-bonded with the first ply or the second ply, and/or the third ply is made of Conventional Wet Press (CWP) paper or the third ply is a structured paper ply, such as such as a ply made of TAD, UCTAD, eTAD, Atmos, or NTT.

10. The coreless roll of a tissue paper product of claim 8, wherein the first ply and the third ply have been embossed together to form the first embossments on the first ply and the third ply, and wherein, optionally, the third embossments have been formed only on the first ply but not on the third ply, or, wherein, optionally, the first ply and the third ply have been embossed together to form the third embossments on the first ply and the third ply.

11. The coreless roll of a tissue paper product of claim 8, wherein the third ply comprises fourth embossments with a fourth height (h4), the fourth height (h4) being in a range of 0.2 mm to 2.0 mm, and wherein the third ply has been embossed separately from the first ply and the second ply, wherein, optionally, the fourth embossments have been formed by a fourth heated embossing roll.

12. The coreless roll of a tissue paper product of claim 8, wherein the first embossments have been formed by the heated embossing roll, and/or, wherein the second embossments have been formed by a second heated embossing roll, and/or, wherein the third embossments have been formed by the heated embossing roll or a third heated embossing roll, and/or wherein, optionally, the first ply has been moistened, prior to having been embossed, with an amount of liquid, such as water, in the range of 2% to 12% of the basis weight of the first ply, or optionally 4% to 10% of the basis weight of the first ply, wherein the liquid optionally is provided with one or several additives, or wherein the first ply has not been moistened with a liquid prior to having been embossed.

13. The coreless roll of a tissue paper product of claim 6, wherein a geometrical mean tensile strength of tissue paper product of the coreless roll lies in a range of 100 N/m to 280 N/m, optionally 120 N/m to 280 N/m, or 140 N/m to 280 N/m.

14. A coreless roll of a tissue paper product, such as toilet paper, made of a spirally wound continuous web of tissue paper product having a first end and a second end, the web of tissue paper product being wound such as to define an axially extending inner hole centrally positioned relative to the coreless roll and such that the first end is located on the outer side of the coreless roll and the second end is located at the inner hole, wherein the tissue paper product comprises four plies, the four plies being a first ply, a second ply, a third ply, and a fourth ply, wherein the first ply is one of the outermost plies of the tissue paper product, and the four plies are ply-bonded, optionally using an adhesive such as lamination glue and/or mechanical bonding, such as edge embossing, to form the tissue paper product, and the grammage of the tissue paper product is in a range of 55 g/m² to 95 g/m², or optionally 60 g/m² to 80 g/m², and wherein the first ply is made of Conventional Wet Press (CWP) paper, the second ply is a structured paper ply, such as a ply made of TAD, UCTAD, eTAD, Atmos, or NTT, and the first ply has been embossed with a heated embossing roll, the coreless roll has an outer diameter in the range of 95 to 150 mm, a diameter of the inner hole is in the range of 20 to 50 mm, and a density of the coreless roll is in a range of 110 to 150 kg/m³, and a caliper ratio of the roll is in a range of 12% to 40%, the caliper ratio $(c_s-c_t)/c_t$ being obtained by dividing a difference between a standard caliper $c_s$ of the tissue paper product as defined by the standard ISO-12625-3:2014 and a theoretical caliper $c_t$ of the tissue paper product by the theoretical caliper $c_t$, and the theoretical caliper $c_t$ being defined as a ratio between a grammage of the tissue paper product and the density of the roll.

15. The coreless roll of a tissue paper product of claim 14, wherein the tissue paper product has a caliper of at least 0.55 mm, optionally at least 0.60 mm, or at least 0.65 mm.

16. The coreless roll of a tissue paper product of claim 14, wherein the first ply comprises first embossments with a first height (h1), the first height (h1) being in a range of 0.2 mm to 2.0 mm, wherein the second ply comprises second embossments with a second height (h2), the second height (h2) being in a range of 0.2 mm to 2.0 mm, wherein the adhesive, such as lamination glue, is optionally applied to tips of the first embossments of the first ply and/or tips of the second embossments of the second ply, and wherein the first ply optionally comprises third embossments with a third height (h3) smaller than the first height (h1) (h1>h3), the third height (h3) being in a range of 0.1 mm to 1.2 mm.

17. The coreless roll of a tissue paper product of claim 16, wherein the first ply and the third ply have been embossed together to form the first embossments on the first ply and the third ply, wherein the fourth ply is unembossed or has been embossed separately from the first ply, the second ply, and the third ply to form fourth embossments, the fourth embossments optionally having been embossed by a fourth heated embossing roll, and wherein the third embossments have optionally been formed only on the first ply but not on the third ply, or wherein the first ply and the third ply have been embossed together to form the third embossments on the first ply and the third ply.

18. The coreless roll of a tissue paper product of claim 16, wherein the first ply, the third ply, and the fourth ply have been embossed together to form the first embossments on the first ply, and the third ply, and the fourth ply, and wherein, optionally, the first ply, the third ply, and the fourth ply have been embossed together to form the third embossments on the first ply, the third ply, and the fourth ply, or wherein, optionally, the third embossments have been formed on the first ply and the third ply, but not on the fourth ply, or wherein, optionally, the third embossments have been formed on the first ply, but not on the third ply and the fourth ply.

19. The coreless roll of a tissue paper product of claim 16, wherein the third ply and the fourth ply have been embossed together separately from the first ply and the second ply, or wherein one of the third ply and the fourth ply has been separately embossed from the first ply and the second ply, and the other one of the third ply and the fourth ply is unembossed, or wherein the third ply and the fourth ply are unembossed.

20. The coreless roll of a tissue paper product of claim 16, wherein the first ply and the third ply have been embossed together to form the first embossments on the first ply and the third ply, wherein the fourth ply and the second ply have been embossed together to form the second embossments on the fourth ply and the second ply, and wherein, optionally, the first ply and the third ply have been embossed together to form the third embossments on the first ply and the third ply, or wherein the third embossments have been formed only on the first ply but not on the third ply.

21. The coreless roll of a tissue paper product of claim 16, wherein the first embossments have been formed by the heated embossing roll, and/or, wherein the second embossments have been formed by a second heated embossing roll, and/or, wherein the third embossments have been formed by the heated embossing roll or a third heated embossing roll, and/or, wherein, optionally, the first ply has been moistened, prior to having been embossed, with an amount of liquid, such as water, in the range of 2% to 12% of the basis weight of the first ply, or optionally 4% to 10% of the basis weight of the first ply, wherein the liquid optionally is provided with one or several additives, or wherein the first ply has not been moistened with a liquid prior to having been embossed.

22. The coreless roll of a tissue paper product of claim 14, wherein a geometrical mean tensile strength of tissue paper product of the coreless roll lies in a range of 170 N/m to 370 N/m, optionally 200 N/m to 370 N/m, or 220 N/m to 370 N/m.

23. The coreless roll of a tissue paper product of claim 14, wherein the third ply is made of Conventional Wet Press (CWP) paper and the fourth ply is made of Conventional Wet Press (CWP) paper; or wherein the third ply is a structured paper ply, such as a ply made of TAD, UCTAD, eTAD, Atmos, or NTT, and the fourth ply is made of Conventional Wet Press (CWP) paper; or wherein the third ply is made of Conventional Wet Press (CWP) paper and the fourth ply is a structured paper ply, such as a ply made of TAD, UCTAD, eTAD, Atmos, or NTT; or wherein the third ply is a structured paper ply, such as a ply made of TAD, UCTAD, eTAD, Atmos, or NTT, and the fourth ply is a structured paper ply, such as a ply made of TAD, UCTAD, eTAD, Atmos, or NTT.

24. The coreless roll of a tissue paper product of claim 3, wherein the first embossments cover between 1% and 20% of a total surface of the first ply, optionally between 2% and 10%, or between 3% and 6%, and/or wherein a density of the third embossments is in a range of 25 to 120 embossments/$cm^2$, optionally 40 to 100 embossments/$cm^2$, or 50 to 80 embossments/$cm^2$.

25. The coreless roll of a tissue paper product of claim 1, wherein the grammage of the first ply is in a range of 15 to 30 g/$m^2$, optionally 16 to 25 g/$m^2$, or 18 to 22 g/$m^2$, and/or wherein the grammage of the second ply is in a range of 12 to 30 g/$m^2$, optionally 14 to 25 g/$m^2$, or 15 to 23 g/$m^2$.

26. The coreless roll of a tissue paper product of claim 1, wherein the coreless roll has a radial compression strength of 20N or more, optionally of 25N or more, or of 30N or more.

\* \* \* \* \*